(12) United States Patent
Satori et al.

(10) Patent No.: US 7,450,314 B2
(45) Date of Patent: Nov. 11, 2008

(54) ZOOM LENS SYSTEM AND IMAGE PICKUP APPARATUS USING THE SAME

(75) Inventors: Tomoyuki Satori, Kawagoe (JP); Yuji Kamo, Hino (JP); Kenji Ono, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/732,426

(22) Filed: Apr. 2, 2007

(65) Prior Publication Data

US 2007/0229968 A1    Oct. 4, 2007

(30) Foreign Application Priority Data

Apr. 4, 2006    (JP)    ............. 2006-102735
Apr. 11, 2006   (JP)    ............. 2006-108782
Apr. 18, 2006   (JP)    ............. 2006-114127

(51) Int. Cl.
*G02B 15/14*    (2006.01)

(52) U.S. Cl. ............ 359/683; 359/676; 359/684; 359/685; 359/686; 359/714; 359/740; 359/766

(58) Field of Classification Search ............. 359/676, 359/683–687, 714, 740, 766
See application file for complete search history.

(56) References Cited

U.S. PATENT DOCUMENTS

| 5,659,426 A * | 8/1997 | Aoki ............ 359/683 |
| 7,177,092 B2 | 2/2007 | Satori et al. |
| 2006/0146418 A1* | 7/2006 | Aoki ............ 359/683 |

FOREIGN PATENT DOCUMENTS

JP    2003-255228    9/2003

* cited by examiner

*Primary Examiner*—Evelyn A. Lester
(74) *Attorney, Agent, or Firm*—Kenyon & Kenyon LLP

(57) ABSTRACT

A zoom lens system comprises, in order from an object side, a first lens unit having a positive refractive power; a second lens unit having a negative refractive power; a third lens unit having a positive refractive power; a fourth lens unit having a negative refractive power; and a fifth lens unit having a positive refractive power, and during magnification change from a wide-angle end to a telephoto end, each of the space between the respective lens units changes.

15 Claims, 40 Drawing Sheets

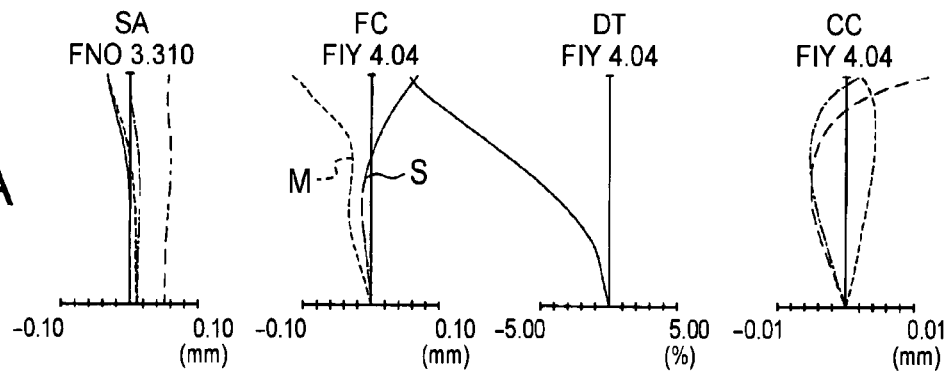
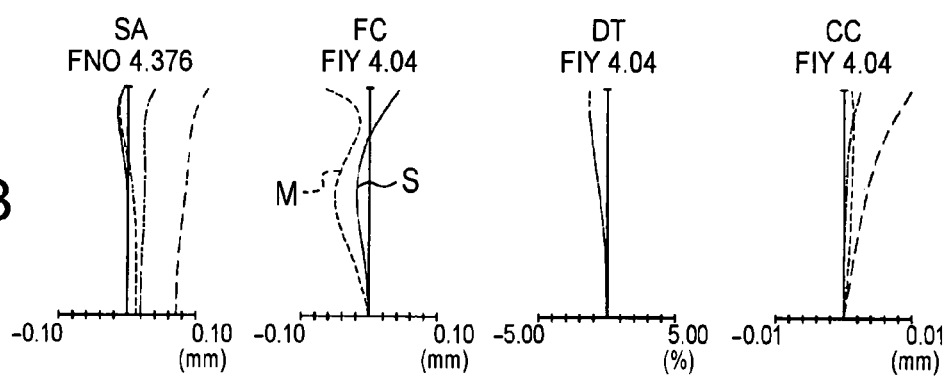
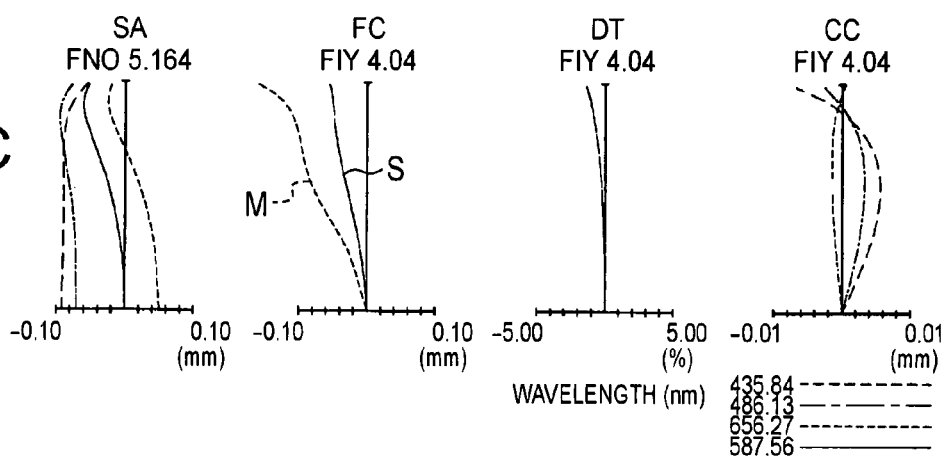

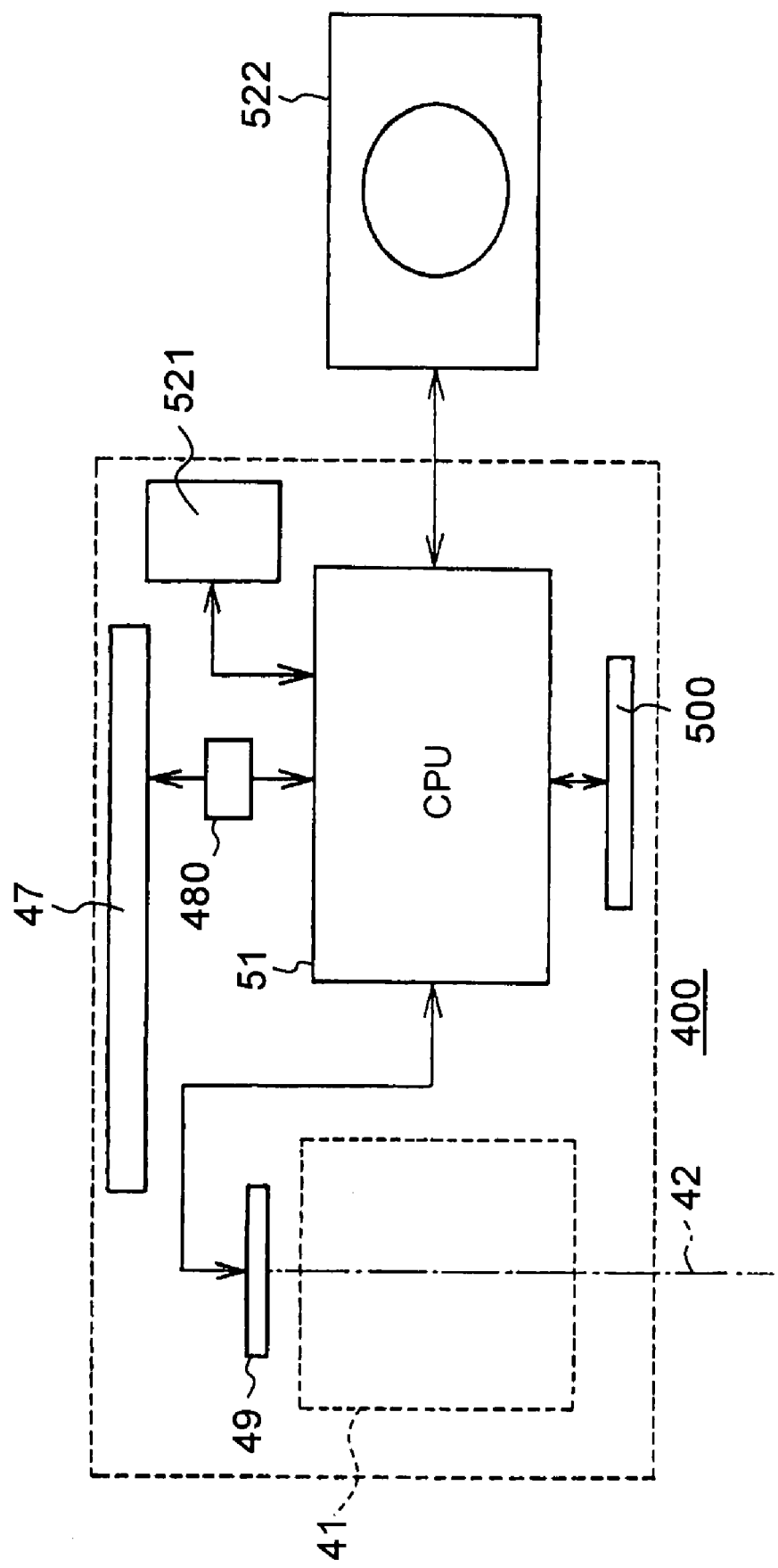

2

ZOOM LENS SYSTEM AND IMAGE PICKUP APPARATUS USING THE SAME

CROSS REFERENCE TO RELATED APPLICATIONS

This application claims benefit under 35 U.S.C. §119 of Japanese patent applications of No. 2006-102,735 filed on Apr. 4, 2006, No. 2006-108,782 filed on Apr. 11, 2006 and No. 2006-114,127 filed on Apr. 18, 2006, the contents of which are incorporated herein by reference.

BACKGROUND OF THE INVENTION

1. Field of the Invention

The present invention relates to a zoom lens system and an apparatus such as an electronic image pickup apparatus using the zoom lens system.

2. Description of the Related Art

Instead of a 35 mm film still camera, a digital camera has broadly spread, and the digital camera has a large number of categories in a broad range from a multi-function type for business use to a portable popular type. The present invention especially pays attention to the portable popular type of category, and aims to provide a technology of realizing a thin video camera and/or a thin digital camera while securing high image qualities.

Thinning of the camera in a depth direction is hampered most by a thickness of an optical system, especially the thickness of a zoom lens system from the surface closest to an object side to an image pickup surface. In recent years, it has been a mainstream to use a so-called collapsible lens barrel so that the optical system is projected from a camera body during photographing and stored in the camera body during carrying. Furthermore, to satisfy a demand that a user desires to enjoy a wide variety of photographing, a zoom lens system having a large angle of field in a wide-angle end and having a high zoom ratio is demanded. In Japanese Patent Application Laid-Open No. 2003-255228, there is disclosed a zoom lens system having a zoom ratio which is as large as about fivefold and having an angle of field which is as large as about 60° in the wide-angle end. In the zoom lens system, a position of an exit pupil is appropriately set. The zoom lens system is suitable for an electronic image sensor, and has a comparatively satisfactory optical performance.

The zoom lens system described in the above publication is a five-unit zoom lens system having a power layout of a positive, negative, positive, negative and positive type. The zoom lens system is advantageous in securing the zoom ratio and satisfactorily correcting aberrations.

BRIEF SUMMARY OF THE INVENTION

According to a first aspect, a zoom lens system according to the present invention comprises, in order from an object side:

a first lens unit having a positive refractive power;
a second lens unit having a negative refractive power;
a third lens unit having a positive refractive power;
a fourth lens unit having a negative refractive power; and
a fifth lens unit having a positive refractive power,
wherein during magnification change from a wide-angle end to a telephoto end,
each of the space between the respective lens units changes.
in the telephoto end as compared with the wide-angle end,
the space between the first lens unit and the second lens unit increases, and
the space between the second lens unit and the third lens unit decreases; and
the first lens unit includes one lens component;
the second lens unit includes a positive lens and a negative lens; and
the total number of the lenses constituting the first lens unit and the second lens unit is four or less, and
wherein the lens component is defined as a single lens or a combination of lenses which has only two air contact surfaces including an object-side surface and an image-side surface in an effective diameter.

According to a second aspect, a zoom lens system according to the present invention comprises, in order from an object side:

a first lens unit having a positive refractive power;
a second lens unit having a negative refractive power;
a third lens unit having a positive refractive power;
a fourth lens unit having a negative refractive power; and
a fifth lens unit having a positive refractive power,
wherein during magnification change from a wide-angle end to a telephoto end,
each of the space between the respective lens units changes.
in the telephoto end as compared with the wide-angle end,
the space between the first lens unit and the second lens unit increases, and
the space between the second lens unit and the third lens unit decreases;
the second lens unit is positioned closer to an image side in the telephoto end than in the wide-angle end;
the third lens unit is positioned closer to the object side in the telephoto end than in the wide-angle end; and
the following conditions are satisfied:

$$3.00 < Lw/fw < 9.90; \text{ and}$$

$$0.50 < Lt/ft < 2.25,$$

in which Lw and Lt are total lengths of the zoom lens system in the wide-angle end and the telephoto end, respectively, and fw and ft are focal lengths of the zoom lens system in the wide-angle end and the telephoto end, respectively.

According to a third aspect, a zoom lens system according to the present invention comprises, in order from an object side:

a first lens unit having a positive refractive power;
a second lens unit having a negative refractive power;
a third lens unit having a positive refractive power;
a fourth lens unit having a negative refractive power; and
a fifth lens unit having a positive refractive power,
wherein during magnification change from a wide-angle end to a telephoto end,
each of the space between the respective lens units changes;
the first lens unit moves so as to be disposed closer to the object side in the telephoto end than in the wide-angle end;
the fifth lens unit moves so as to be disposed closer to an image side in the telephoto end than in the wide-angle end; and
an axial space between the third lens unit and the fourth lens unit increases from the wide-angle end to an intermediate position, and decreases from the intermediate position to the telephoto end. Here, the intermediate position means any position between the wide-angle end and the telephoto end.

Other features and advantages of this invention will become apparent from the following detailed description of the examples when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a diagram showing a state in a wide-angle end, FIG. 1B is a diagram showing an intermediate position, and FIG. 1C is a diagram showing a state in a telephoto end;

FIGS. 2A to 2C are aberration diagrams showing a spherical aberration (SA), an astigmatism (FC), a distortion (DT) and a chromatic aberration of magnification (CC) of Example 1 when focused on an infinite object, FIG. 2A is a diagram showing the state in the wide-angle end, FIG. 2B is a diagram showing the intermediate position, and FIG. 2C is a diagram showing a state in the telephoto end;

FIG. 3A is a diagram showing a state in a wide-angle end, FIG. 3B is a diagram showing an intermediate position, and FIG. 3C is a diagram showing a state in a telephoto end;

FIG. 4A is a diagram showing the state in the wide-angle end, FIG. 4B is a diagram showing the intermediate position, and FIG. 4C is a diagram showing a state in the telephoto end;

FIG. 5A is a diagram showing a state in a wide-angle end, FIG. 5B is a diagram showing an intermediate position, and FIG. 5C is a diagram showing a state in a telephoto end;

FIG. 6A is a diagram showing the state in the wide-angle end, FIG. 6B is a diagram showing the intermediate position, and FIG. 6C is a diagram showing a state in the telephoto end;

FIG. 7A is a diagram showing a state in a wide-angle end, FIG. 7B is a diagram showing an intermediate position, and FIG. 7C is a diagram showing a state in a telephoto end;

FIG. 8A is a diagram showing the state in the wide-angle end, FIG. 8B is a diagram showing the intermediate position, and FIG. 8C is a diagram showing a state in the telephoto end;

FIG. 9A is a diagram showing a state in a wide-angle end, FIG. 9B is a diagram showing an intermediate position, and FIG. 9C is a diagram showing a state in a telephoto end;

FIG. 10A is a diagram showing the state in the wide-angle end, FIG. 10B is a diagram showing the intermediate position, and FIG. 10C is a diagram showing a state in the telephoto end;

FIG. 11A is a diagram showing a state in a wide-angle end, FIG. 11B is a diagram showing an intermediate position, and FIG. 11C is a diagram showing a state in a telephoto end;

FIG. 12A is a diagram showing the state in the wide-angle end, FIG. 12B is a diagram showing the intermediate position, and FIG. 12C is a diagram showing a state in the telephoto end;

FIG. 13A is a diagram showing a state in a wide-angle end, FIG. 13B is a diagram showing an intermediate position, and FIG. 13C is a diagram showing a state in a telephoto end;

FIG. 14A is a diagram showing the state in the wide-angle end, FIG. 14B is a diagram showing the intermediate position, and FIG. 14C is a diagram showing a state in the telephoto end;

FIG. 15A is a diagram showing a state in a wide-angle end, FIG. 15B is a diagram showing an intermediate position, and FIG. 15C is a diagram showing a state in a telephoto end;

FIG. 16A is a diagram showing the state in the wide-angle end, FIG. 16B is a diagram showing the intermediate position, and FIG. 16C is a diagram showing a state in the telephoto end;

FIG. 17A is a diagram showing a state in a wide-angle end, FIG. 17B is a diagram showing an intermediate position, and FIG. 17C is a diagram showing a state in a telephoto end;

FIG. 18A is a diagram showing the state in the wide-angle end, FIG. 18B is a diagram showing the intermediate position, and FIG. 18C is a diagram showing a state in the telephoto end;

FIG. 19A is a diagram showing a state in a wide-angle end, FIG. 19B is a diagram showing an intermediate position, and FIG. 19C is a diagram showing a state in a telephoto end;

FIG. 20A is a diagram showing the state in the wide-angle end, FIG. 20B is a diagram showing the intermediate position, and FIG. 20C is a diagram showing a state in the telephoto end;

FIG. 21A is a diagram showing a state in a wide-angle end, FIG. 21B is a diagram showing an intermediate position, and FIG. 21C is a diagram showing a state in a telephoto end;

FIG. 22A is a diagram showing a state in a wide-angle end, FIG. 22B is a diagram showing an intermediate position, and FIG. 22C is a diagram showing a state in a telephoto end;

FIG. 23A is a diagram showing a state in a wide-angle end, FIG. 23B is a diagram showing an intermediate position, and FIG. 23C is a diagram showing a state in a telephoto end;

FIG. 24A is a diagram showing a state in a wide-angle end, FIG. 24B is a diagram showing an intermediate position, and FIG. 24C is a diagram showing a state in a telephoto end;

FIG. 25A is a diagram showing a state in a wide-angle end, FIG. 25B is a diagram showing an intermediate position, and FIG. 25C is a diagram showing a state in a telephoto end;

FIG. 26A is a diagram showing a state in a wide-angle end, FIG. 26B is a diagram showing an intermediate position, and FIG. 26C is a diagram showing a state in a telephoto end;

FIG. 27A is a diagram showing the state in the wide-angle end, FIG. 27B is a diagram showing the intermediate position, and FIG. 27C is a diagram showing a state in the telephoto end;

FIG. 28A is a diagram showing the state in the wide-angle end, FIG. 28B is a diagram showing the intermediate position, and FIG. 28C is a diagram showing a state in the telephoto end;

FIG. 29A is a diagram showing the state in the wide-angle end, FIG. 29B is a diagram showing the intermediate position, and FIG. 29C is a diagram showing a state in the telephoto end;

FIG. 30A is a diagram showing the state in the wide-angle end, FIG. 30B is a diagram showing the intermediate position, and FIG. 30C is a diagram showing a state in the telephoto end;

FIG. 31A is a diagram showing the state in the wide-angle end, FIG. 31B is a diagram showing the intermediate position, and FIG. 31C is a diagram showing a state in the telephoto end;

FIG. 32A is a diagram showing the state in the wide-angle end, FIG. 32B is a diagram showing the intermediate position, and FIG. 32C is a diagram showing a state in the telephoto end;

2006-108782

Figure 33:
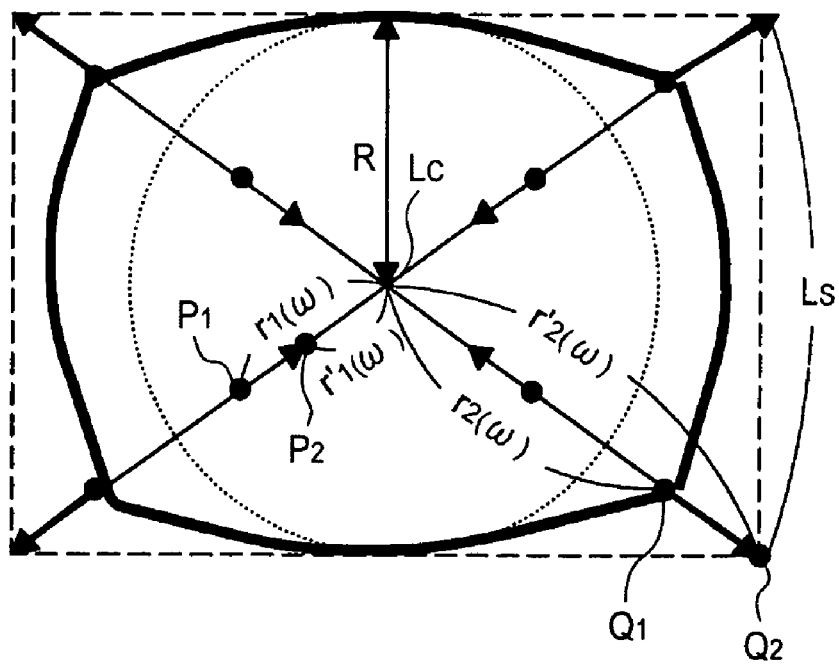
Figure 34:
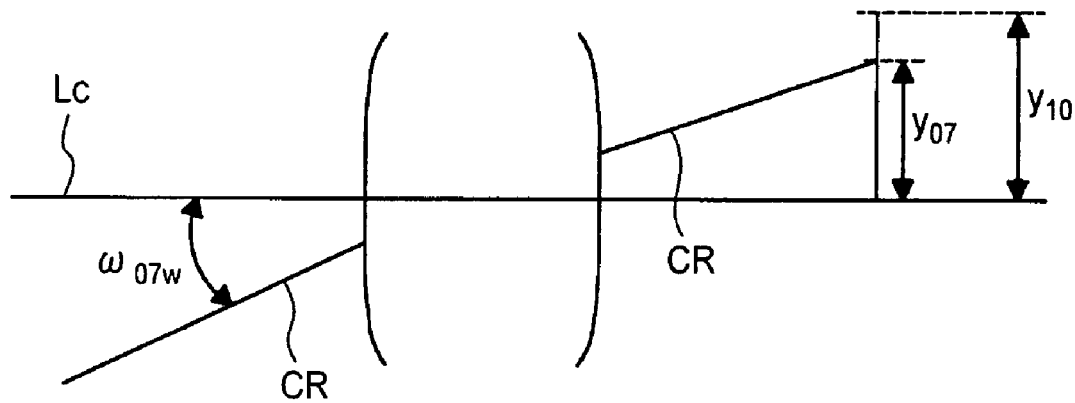
Figure 35:
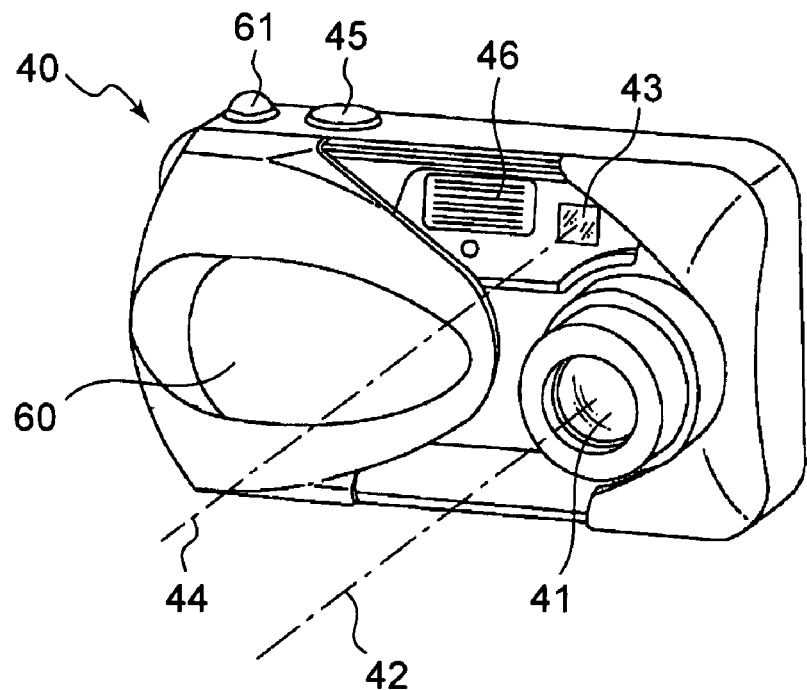
Figure 36:
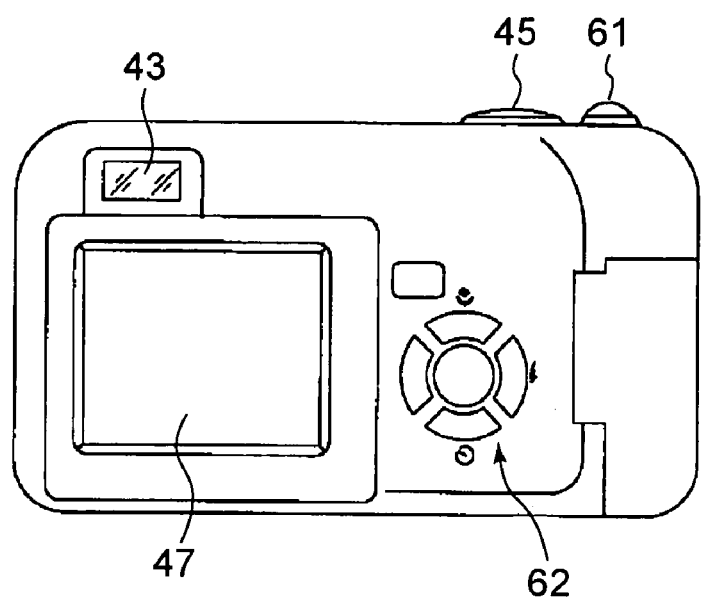
Figure 37:
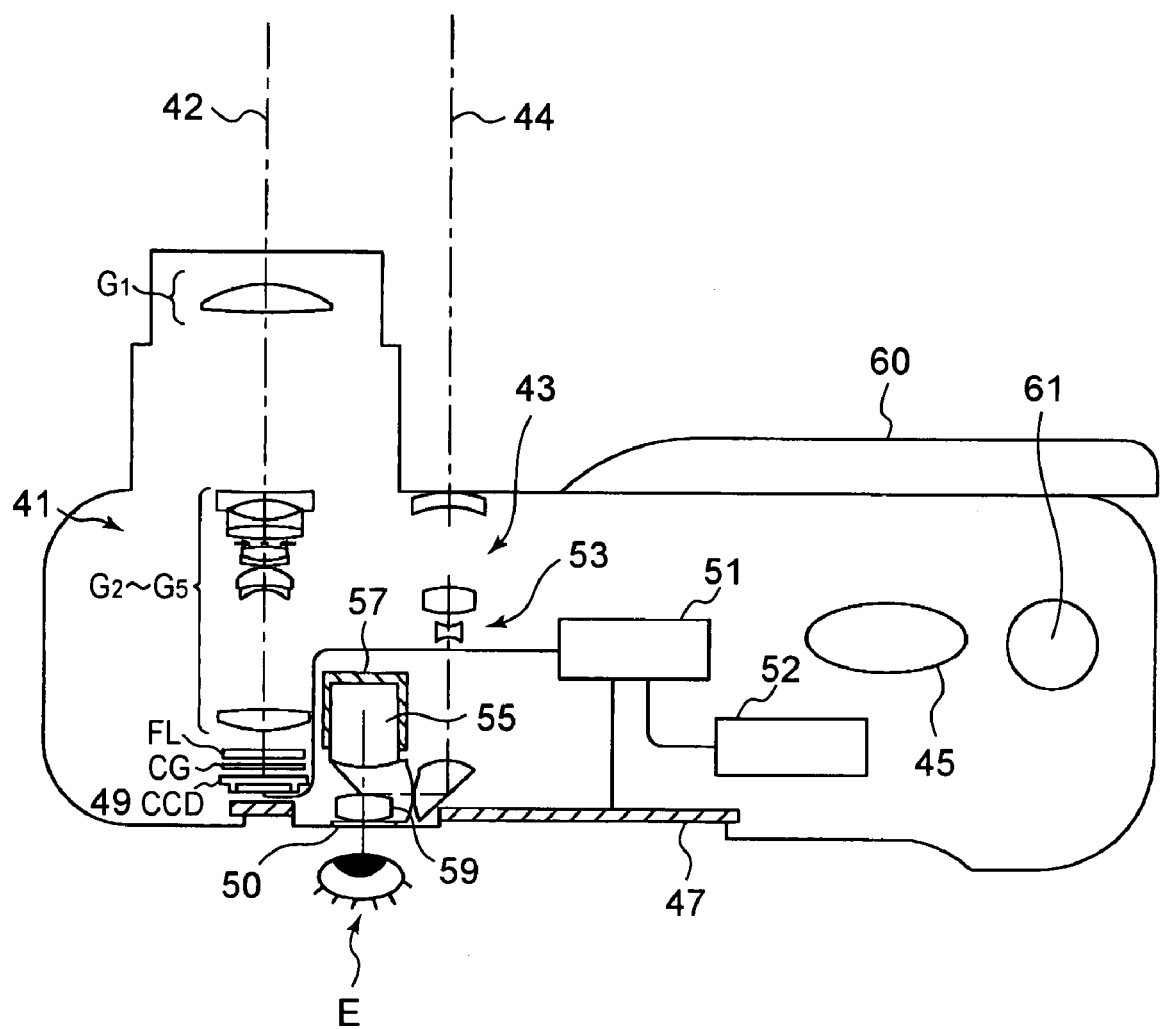
Figure 38:
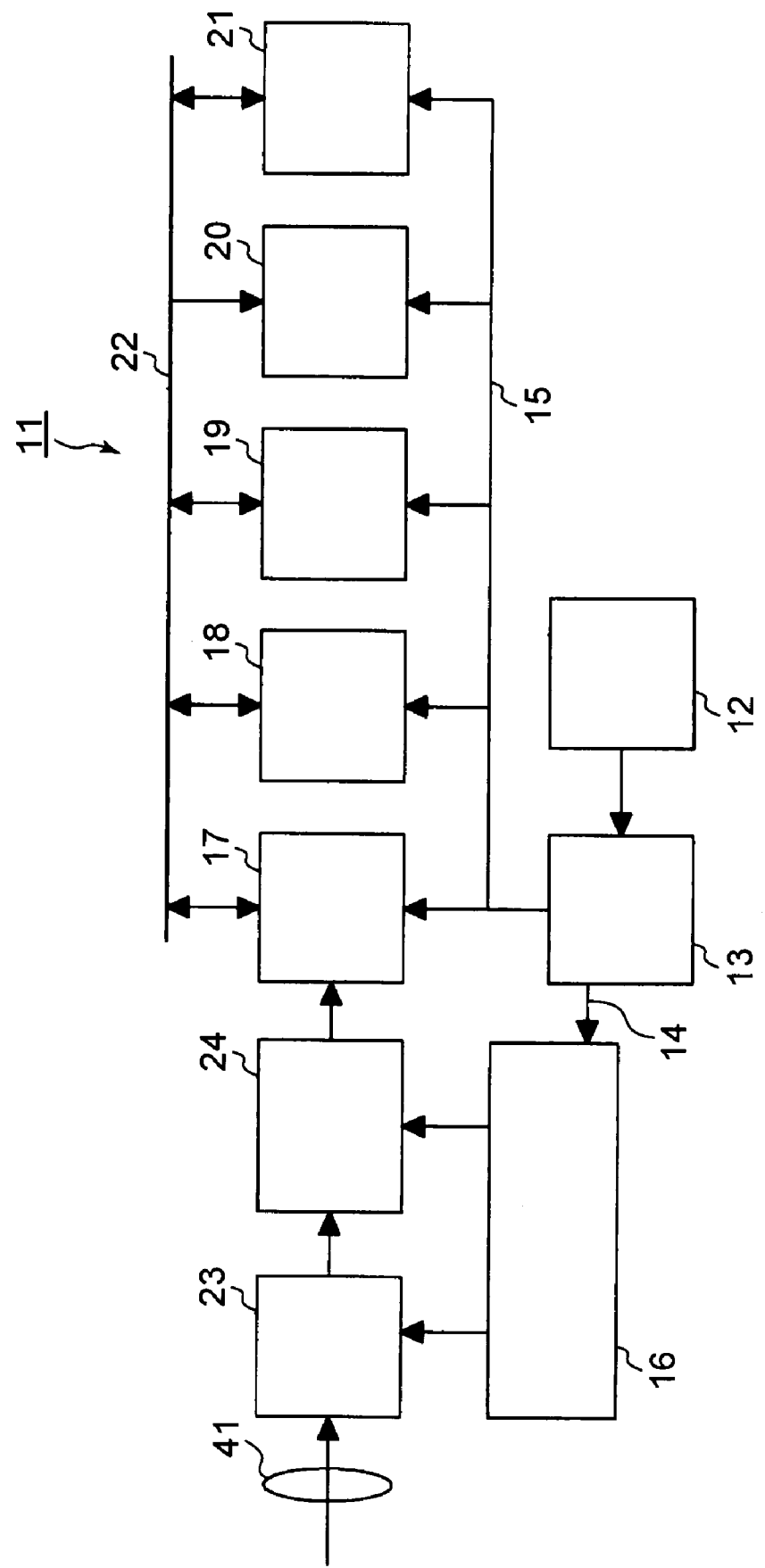

FIG. 33 is an explanatory view showing a basic concept for digitally correcting a distortion of an image;

FIG. 34 is a diagram showing a relation between an incidence angle of a ray with respect to an optical axis and an image height;

FIG. 35 is a front perspective view showing an appearance of a digital camera to which the zoom lens system of the present invention is applied;

FIG. 36 is a rear view of the digital camera of FIG. 35;

FIG. 37 is a schematic diagram showing a constitution of the digital camera of FIG. 35;

FIG. 38 is a block diagram showing a constitution of a part of an inner circuit of the digital camera;

2006-102735

Figure 39:
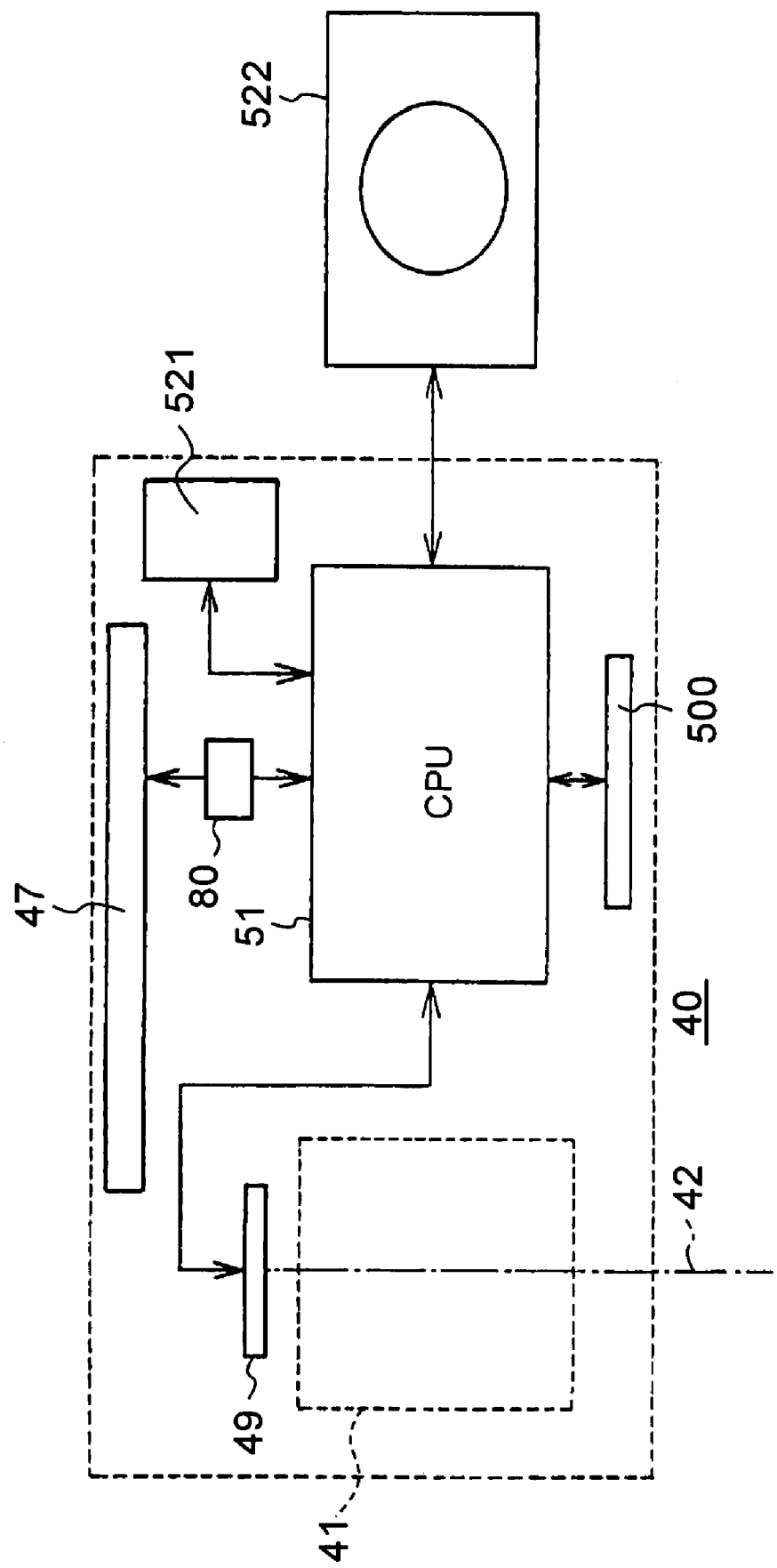
Figure 40:
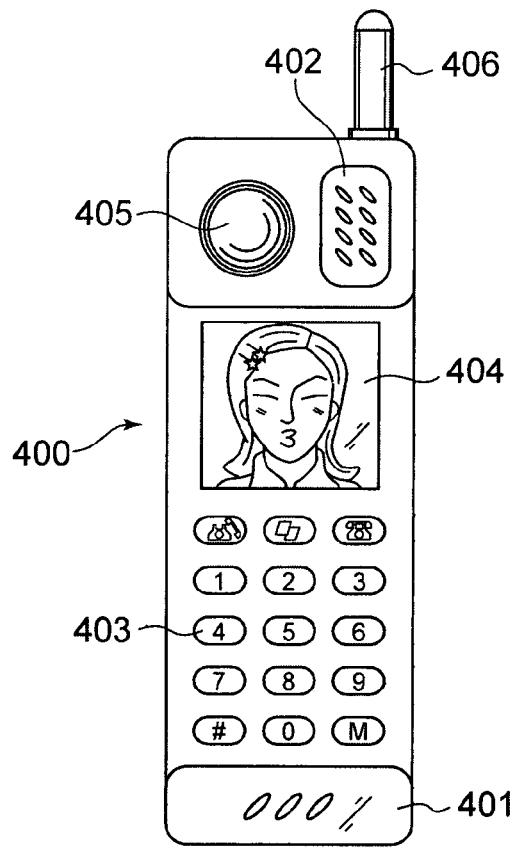
Figure 41:
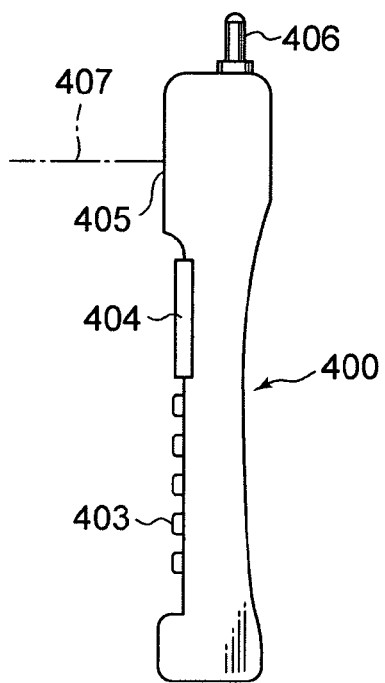
Figure 42:
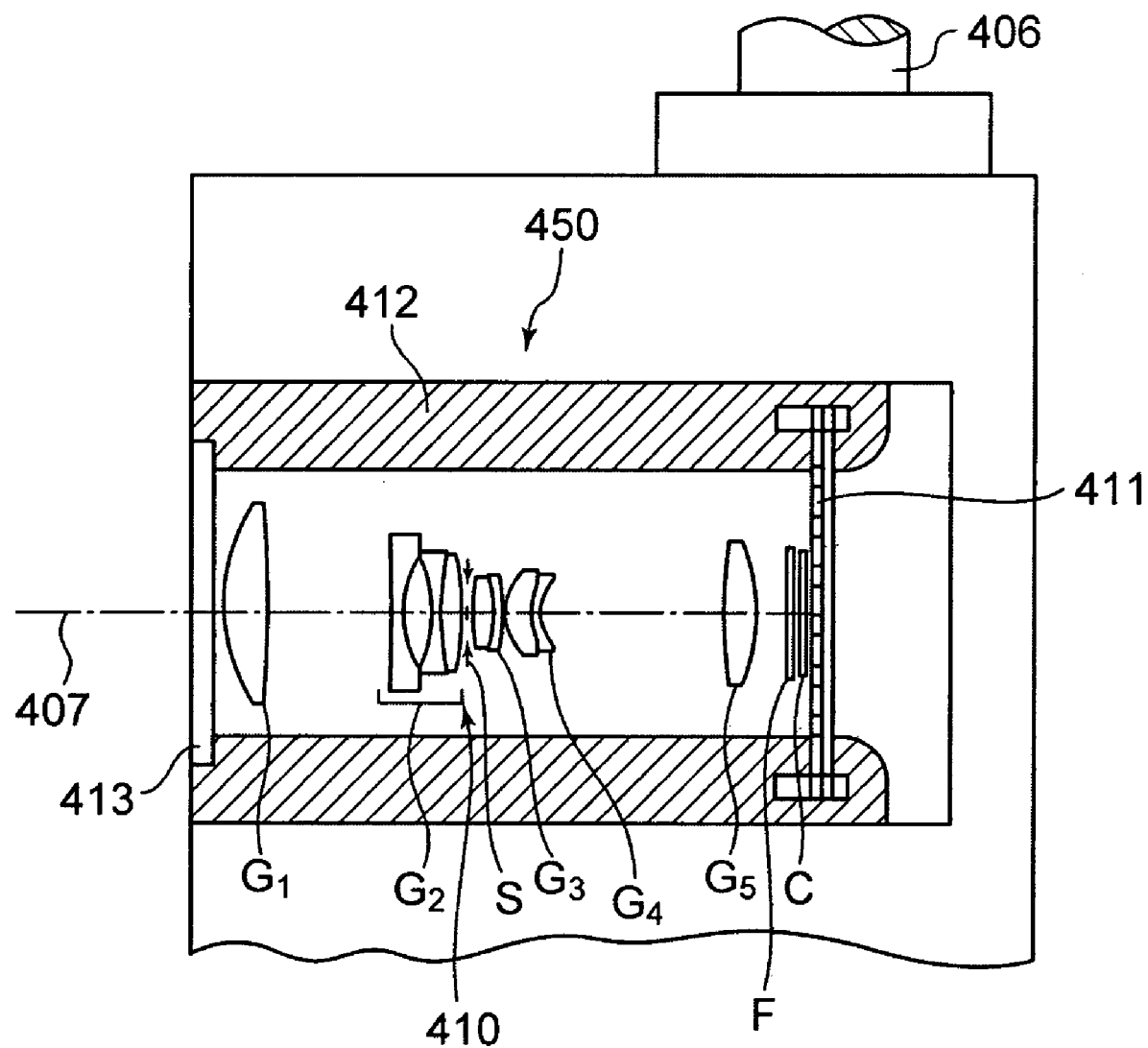

FIG. 39 is a schematic block diagram showing a main part of a control system of the digital camera;

FIG. 40 is a front view of a cellular phone;

FIG. 41 is a side view of the cellular phone;

FIG. 42 is a sectional view of a photographing optical system incorporated in the cellular phone; and FIG. 43 is a schematic block diagram showing a main part of a control system related to photographing, image recording and image display of the cellular phone.

DETAILED DESCRIPTION OF THE EMBODIMENTS

A zoom lens system according to the present invention comprises, in order from an object side, a first lens unit having a positive refractive power; a second lens unit having a negative refractive power; a third lens unit having a positive refractive power; a fourth lens unit having a negative refractive power; and a fifth lens unit having a positive refractive power. During magnification change from a wide-angle end to a telephoto end, each of the space between the respective lens units changes. This is a basic constitution. In addition, in the first aspect of the present invention, the lens units move so as to increase the space between the first lens unit and the second lens unit increases and to decrease the space between the second lens unit and the third lens unit in the telephoto end as compared with the wide-angle end. Further, the first lens unit is constituted of one lens component, the second lens unit includes a positive lens and a negative lens, and a total number of lenses constituting the first lens unit and the second lens unit is four or less. Here, the lens component is a lens having two surfaces—an object-side surface and an image-side surface—as air contact surfaces in a range of an effective diameter.

In the zoom lens system, the lens unit closest to the object side is constituted of one positive lens component (a positive single lens or a positive cemented lens).

To constitute a lens barrel to be compact, the first lens unit may be constituted of only one lens component. Since a height of an off-axial ray from an optical axis is large at the first lens unit, an axial thickness easily becomes very large in order to secure a necessary edge thickness of the lens.

Furthermore, when the first lens unit has a large number of lens components, an entrance pupil is positioned away from the object side. Therefore, the height of the ray passing through the first lens unit further increases, and a larger axial thickness is necessary in order to secure the edge thickness. When the number of the lens components increases, the axial thickness of the first lens unit increases. Therefore, as the number of the lens units in the first lens unit increases, the size in a diametric direction and the axial thickness of the first lens unit become larger than necessary. As a result, even when the zoom lens system is brought into a collapsible state, the lens barrel cannot be constituted to be sufficiently compact. From this viewpoint, the constitution in which the first lens unit is constituted of one lens component largely contributes to the compact lens barrel.

In addition, since the second lens unit includes the positive lens and the negative lens, a chromatic aberration easily generated in the second lens unit is suppressed. Moreover, the total number of the lenses constituting the first and second lens units is set to four or less to inhibit a diameter of the lens unit in the wide-angle end from being increased.

Moreover, the zoom lens system comprises, in order from the object side, the positive first lens unit, the negative second lens unit, the positive third lens unit, the negative fourth lens unit and the positive fifth lens unit. The axial spaces between the respective lens units are changed to perform the magnification change.

Therefore, even when the total number of the lenses of the first and second lens units is set to four or less, a burden of magnification change can be shared by these lens units. Therefore, aberration fluctuations during the magnification change function can be suppressed, and a satisfactory optical performance can be obtained in the whole magnification change region.

Moreover, an appropriate position of the exit pupil can be kept. Therefore, an angle of an incidence of the ray upon the electronic image sensor such as a CCD image sensor or a CMOS type image sensor can be controlled into an appropriate range and the ray is allowed to efficiently enter a light receiving surface of the electronic image sensor.

Furthermore, in order to provide the zoom lens system which has a satisfactory optical performance and which is suitable for a compact constitution, it is preferable that various devises are developed in addition to the above devises. This respect will hereinafter be described in detail.

First, a more preferable constitution of the first lens unit will be described.

As described above, from a viewpoint of compactness, it is preferable that the first lens unit is constituted of one lens component. In addition, to obtain a higher performance, it is preferable to remove aberrations generated in the first lens unit.

To do so, it is preferable that the zoom lens system is constituted so as to satisfy the following conditions:

$$2.40 < f1/fw < 8.00 \quad (1A); \text{ and}$$

$$0.45 < f1/ft < 2.00 \quad (2A),$$

in which f1 is a focal length of the first lens unit, fw is a focal length of the zoom lens system in the wide-angle end, and ft is a focal length of the zoom lens system in the telephoto end.

The focal length of the first lens unit is set so that upper limits of the above conditions are not exceeded, thereby securing the power of the first lens unit. In consequence, the total length of the zoom lens system is easily suppressed, and this is advantageous in constituting the lens barrel to be compact.

The power of the first lens unit is limited so that the focal length of the first lens unit is not below lower limits of the above conditions. In consequence, generation of the aberration is easily inhibited. The constitution is advantageous especially in reducing the chromatic aberration and a color blur in the photographed image.

Furthermore, it is more preferable to satisfy the following conditions:

$$2.90 < f1/fw < 6.30 \quad (1A'); \text{ and}$$

$$0.55 < f1/ft < 1.50 \quad (2A').$$

It is further preferable to satisfy the following conditions:

$$3.40 < f1/fw < 4.50 \quad (1A''); \text{ and}$$

$$0.65 < f1/ft < 1.00 \quad (2A'').$$

It is more preferable that the above zoom lens system satisfies one or more of the following constitutions or conditions.

The first lens unit can be constituted of one positive lens. To reduce the total length and the diameter of the zoom lens system, it is preferable that the number of the lenses of the first lens unit is set to one.

At this time, to suppress influences (e.g., the color blur of the photographed image and deterioration of resolution) of the aberrations generated in the positive lens, it is preferable to satisfy the following conditions.

$$70 < Vd11 < 105 \quad (3A),$$

in which Vd11 is the Abbe number of the positive lens of the first lens unit.

When a value of Vd11 is not above an upper limit of the condition, availability and mass productivity of a vitreous material are satisfactorily obtained. This constitution is advantageous for cost reduction.

When the value of Vd11 is not below a lower limit of this condition, color dispersion is reduced. The constitution is advantageous in reducing an amount of the chromatic aberration to be generated and suppressing the color blur in the photographed image. This is also advantageous in constituting the zoom lens system to be compact since the need for increasing the number of the lenses of the other lens unit in order to correct the chromatic aberration decreases.

Furthermore, it is more preferable to satisfy the following condition:

$$75 < Vd11 < 101 \quad (3A').$$

In addition, it is further preferable to satisfy the following condition:

$$80 < Vd11 < 97 \quad (3A'').$$

To obtain a more satisfactory aberration balance, it is preferable that the positive lens of the first lens unit satisfies the following condition:

$$-1.50 < SF11 < -0.20 \quad (4A),$$

in which SF11 is defined by SF11=(R11f+R11r)/(R11f−R11r) and in which R11f and R11r are paraxial radii of curvatures of the object-side surface and the image-side surface of the positive lens of the first lens unit, respectively.

When SF11 is not above an upper limit of the condition, astigmatism and a spherical aberration in the wide-angle end are advantageously corrected.

When SF11 is not below a lower limit of the condition, a distortion in the wide-angle end is advantageously corrected.

Furthermore, it is more preferable to satisfy the following condition:

$$-1.20 < SF11 < -0.36 \quad (4A').$$

In addition, it is further preferable to satisfy the following condition:

$$-0.90 < SF11 < -0.52 \quad (4A'').$$

Moreover, it is preferable that opposite surfaces of the positive lens of the first lens unit are aspherical surfaces. In consequence, generations of the distortion, the astigmatism and a coma in the wide-angle end can effectively be inhibited.

The first lens unit may be constituted of a cemented lens including a positive lens and a negative lens. When such a cemented lens is used, the chromatic aberration can more satisfactorily be corrected.

When the first lens unit is constituted of the positive lens and the negative lens, it is preferable to satisfy the following conditions:

$$1.400 < Nd1p < 1.620 \quad (5A);$$

$$65.0 < Vd1p < 100.0 \quad (6A);$$

$$1.600 < Nd1n < 2.100 \quad (7A); \text{ and}$$

$$18.0 < Vd1n < 38.0 \quad (8A),$$

in which Nd1p and Vd1p are a refractive index and the Abbe number of the positive lens of the first lens unit for the d-line, and Nd1n and Vd1n are a refractive index and the Abbe number of the negative lens of the first lens unit for the d-line, respectively.

In a case where Nd1p is not above an upper limit of the condition (5A), it is easy to obtain the vitreous material having the optimum Abbe number that satisfies the condition (6A). This is advantageous in improving mass productivity and reducing costs.

In a case where Nd1p is not below a lower limit of the condition (5A), even if the positive lens has an appropriate refractive power, a curvature of a lens surface decreases (an absolute value of a radius of curvature increases). This is advantageous in reducing the generation of the aberration.

When Vd1p is not above an upper limit of the condition (6A), the availability and the mass productivity of the vitreous material improve, and the costs are advantageously reduced.

When Vd1p is not below a lower limit of the condition (6A), the color dispersion is reduced, and the generation of the chromatic aberration is easily inhibited.

When Nd1n is not above an upper limit of the condition (7A), the availability and the mass productivity of the vitreous material improve, and the costs are advantageously reduced.

In a case where Nd1n is not below a lower limit of the condition (7A), even if the negative lens has an appropriate refractive power, the curvature of the lens surface decreases, and the generation of the aberration is easily inhibited.

When Vd1n is not above an upper limit of the condition (8A), the chromatic aberration generated in the positive lens is advantageously corrected.

When Vd1n is not below a lower limit of the condition (8A), an anomalous dispersion property is prevented from being excessively high, the chromatic aberration in a short wavelength region is reduced, and the color blur in the photographed image is advantageously suppressed.

Regarding the conditions (5A) to (8A), it is more preferable to satisfy the following conditions:

$$1.400 < Nd1p < 1.550 \quad (5A');$$

$$69.0 < Vd1p < 92.0 \quad (6A');$$

$$1.630 < Nd1n < 1.950 \quad (7A'); \text{ and}$$

$$20.0 < Vd1n < 35.0 \quad (8A').$$

It is further preferable to satisfy the following conditions:

$$1.470 < Nd1p < 1.530 \quad (5A'');$$

$$80.0 < Vd1p < 85.0 \quad (6A'');$$

$$1.680 < Nd1n < 1.850 \quad (7A''); \text{ and}$$

$$23.0 < Vd1n < 32.0 \quad (8A'').$$

Moreover, when one of the air contact surfaces is an aspherical surface, off-axial aberrations are effectively corrected.

It is preferable that the second lens unit is constituted of three or less lenses.

Moreover, it is preferable to dispose an aperture stop which limits an axial light flux between the second lens unit and the fourth lens unit. When the aperture stop is disposed at such a position, the zoom lens system includes lens units having a negative refractive power before and after the aperture stop. In this case, the off-axial aberrations are easily corrected.

When the number of the lenses is reduced and the entrance pupil is disposed to be shallow, a lens diameter and an outer diameter of the lens barrel are advantageously reduced. Therefore, it is preferable that the number of the lenses constituting the second lens unit is set to three or less.

Moreover, it is preferable that the negative lens of the second lens unit is disposed closest to the object side and that the positive lens is disposed closest to the image side.

According to such a constitution, since an off-axial ray passes through the second lens unit at a reduced angle with respect to the optical axis, the aberration fluctuations due to the movement of the second lens unit during the magnification change are easily suppressed.

It is to be noted that in a case where the first lens unit is constituted of one single lens, it is preferable that the second lens unit is constituted of three lenses.

When the number of the lenses of the second lens unit is set to three and the total number of the lenses of the first and second lens units is set to four, the off-axial aberration of the first lens unit generated in the wide-angle end is advantageously cancelled by the second lens unit.

At this time, the second lens unit may be constituted of three lenses including, in order from the object side, a negative single lens and a cemented lens constituted by cementing a negative lens and a positive lens in order from the object side.

According to such a constitution, since the negative power can be shared by two negative lenses, the aberrations generated in the second lens unit can further be suppressed. Moreover, the chromatic aberration can be corrected by the cemented lens. Therefore, the aberration fluctuations due to the movement of the second lens unit during the magnification change can satisfactorily be suppressed.

Furthermore, when the second lens unit includes the cemented lens, the thickness of the second lens unit is reduced, and the second lens unit is not easily adversely affected by eccentricity as compared with a case where the lenses are not cemented.

The second lens unit may be constituted of two single lenses including a negative single lens and a positive single lens in order from the object side.

According to such a constitution, the thickness of the second lens unit is easily reduced.

As the power of the second lens unit increases, the off-axial aberrations are easily generated. However, according to such a lens constitution, although the number of the lenses is minimized, the off-axial aberrations generated in the second lens unit are easily suppressed. Therefore, the aberration fluctuations during the magnification change can be minimized. This is advantageous in imparting a comparatively large power to the second lens unit to increase a zoom ratio and miniaturize the zoom lens system.

It is more preferable that the second lens unit satisfies the following conditions:

$$-1.35 < f2/fw < -0.40 \quad (16A); \text{ and}$$

$$-1.00 < f2/ft < -0.10 \quad (17A),$$

in which f2 is a focal length of the second lens unit, and fw and ft are focal lengths of the zoom lens system in the wide-angle end and the telephoto end, respectively.

The second lens unit is a lens unit which mainly performs a magnification change function together with the third lens unit. It is preferable to consider the movements of the lens units during the magnification change and the aberration fluctuations due to the movements.

It is preferable to impart an appropriate power to the second lens unit so that the compact constitution is more satisfactorily compatible with the securing of the satisfactory optical performance. Specifically, the above conditions (16A) and (17A) may be satisfied.

When f2/fw and f2/ft are not above upper limits of the conditions (16A) and (17A) and the power of the second lens unit is suppressed, the fluctuations of the aberrations of the second lens unit can be reduced, and the satisfactory optical performance is easily obtained in the whole magnification change region. When the total number of the lenses of the first and second lens units is set to three or four, the aberrations are easily corrected, and the thickness of the lens unit is advantageously reduced.

When f2/fw and f2/ft are not below lower limits of the conditions (16A) and (17A) and the power of the second lens unit is secured, movement amounts of these lens units during the magnification change can be reduced, and the total length of the zoom lens system can easily be reduced. The lens barrel is advantageously constituted to be compact in a thickness direction.

Regarding the conditions (16A) and (17A), it is more preferable to satisfy the following conditions:

$$-1.33 < f2/fw < -0.70 \quad (16A'); \text{ and}$$

$$-0.70 < f2/ft < -0.14 \quad (17A').$$

Regarding the conditions (16A) and (17A), it is further preferable to satisfy the following conditions:

$$-1.28 < f2/fw < -1.00 \quad (16A''); \text{ and}$$

$$-0.30 < f2/ft < -0.18 \quad (17A'').$$

To obtain a satisfactory aberration balance, it is preferable that the negative lens of the second lens unit closest to the object side satisfies the following condition:

$$0.10 < SF21 < 1.60 \quad (9A),$$

in which SF21 is defined by SF21=(R21f+R21r)/(R21f−R21r) and in which R21f and R21r are paraxial radii of curvatures of the object-side surface and the image-side surface of the negative lens of the second lens unit closest to the object side, respectively.

When SF21 is not above an upper limit of the condition (9A), the curvature of the image-side surface of the negative lens is reduced, and generations of off-axial aberrations such as the astigmatism and the coma are easily inhibited.

When SF21 is not below a lower limit of the condition (9A), the curvature of the object-side surface of the negative lens is reduced, and the generations of the off-axial aberrations are easily inhibited.

It is more preferable to satisfy the following condition:

$$0.27 < SF21 < 1.20 \quad (9A').$$

It is further preferable to satisfy the following condition:

$$0.44 < SF21 < 0.80 \quad (9A'').$$

It is preferable that the negative lens of the second lens unit closest to the object side satisfies the following conditions:

$$1.750 < Nd21 < 2.100 \quad (10A); \text{ and}$$

$$30.0 < Vd21 < 50.0 \quad (11A),$$

in which Nd21 and Vd21 are a refractive index and the Abbe number of the negative lens of the second lens unit closest to the object side for the d-line.

When Nd21 is not above an upper limit of the condition (10A), satisfactory availability and mass productivity of the vitreous material are obtained. This is advantageous in reducing the costs.

In a case where Nd21 is not below a lower limit of the condition (10A), even if the negative lens has an appropriate refractive power, the curvature of the lens surface can be reduced, and the generation of the aberration is easily inhibited.

When Vd21 is not above an upper limit of the condition (11A), the satisfactory availability and mass productivity of the vitreous material having the appropriate Abbe number that satisfies the condition (10A) are obtained, and the costs are advantageously reduced.

When Vd21 is not below a lower limit of the condition (11A), the color dispersion is reduced, and the generation of the chromatic aberration is easily inhibited.

Regarding the conditions (10A) and (11A), it is more preferable to satisfy the following conditions:

$$1.770 < Nd21 < 1.950 \quad (10A'); \text{ and}$$

$$34.0 < Vd21 < 47.0 \quad (11A').$$

It is further preferable to satisfy the following conditions:

$$1.800 < Nd21 < 1.890 \quad (10A''); \text{ and}$$

$$40.0 < Vd21 < 43.0 \quad (11A'').$$

It is preferable that the positive lens of the second lens unit closest to the image side satisfies the following conditions:

$$1.840 < Nd22 < 2.100 \quad (12A); \text{ and}$$

$$15.0 < Vd22 < 32.0 \quad (13A),$$

in which Nd22 and Vd22 are the refractive index and the Abbe number of the positive lens of the second lens unit closest to the image side for the d-line.

When Nd22 is not above an upper limit of the condition (12A), the availability and mass productivity of the vitreous material improve. This results in the cost reduction.

In a case where Nd22 is not below a lower limit of the condition (12A), even if the positive lens has an appropriate refractive power, the curvature of the lens surface can be reduced, and the generation of the aberration is easily inhibited.

When Vd22 is not above an upper limit of the condition (13A), the color dispersion is advantageously secured to correct the chromatic aberration generated in the negative lens of the second lens unit. When Vd22 is not below a lower limit of the condition (13A), the color dispersion is prevented from being excessively high, and the chromatic aberration is easily inhibited from being overcorrected on the short-wavelength region. When the conditions are satisfied, the color blur in the photographed image is effectively reduced.

Regarding the conditions (12A) and (13A), it is more preferable to satisfy the following conditions:

$$1.890 < Nd22 < 2.010 \quad (12A'); \text{ and}$$

$$16.0 < Vd22 < 26.0 \quad (13A').$$

It is further preferable to satisfy the following conditions:

$$1.920 < Nd22 < 1.950 \quad (12A''); \text{ and}$$

$$17.0 < Vd22 < 21.0 \quad (13A'').$$

When the total number of the lenses constituting the first and second lens units is set to four, the aberration can practically sufficiently be corrected. In consequence, the costs are reduced, and the lens barrel can sufficiently be thinned when collapsed. When the above zoom lens system is used as a photographing lens of an image pickup apparatus, the image pickup apparatus is advantageously thinned.

It is preferable that the third lens unit includes a positive lens and a negative lens, the total number of the lenses is three or less and the total number of the lens components is two or less. It is preferable that the fourth lens unit includes a positive lens and a negative lens and that the total number of the lenses is two. It is preferable that the fifth lens unit is constituted of one positive lens.

The preferable constitutions of the first and second lens units have been described above. It is preferable that the first lens unit is constituted of one lens component, the second lens unit includes a positive lens and a negative lens, and the total number of the lenses of the first and second lens units is set to four or less.

In addition, when the third lens unit is constituted as described above, the aberrations in the third lens unit are easily balanced, and the thickness of the lens unit is advantageously reduced.

Moreover, when the fourth lens unit is constituted as described above, the aberrations in the fourth lens unit are easily balanced, and the thickness of the lens unit is advantageously reduced.

Furthermore, when the fifth lens unit is constituted of one positive lens, the total length of the zoom lens system is advantageously reduced.

In the whole zoom lens system, it is preferable that the second and third lens units perform a main magnification change function in order to appropriately perform the magnification change and set an appropriate size of the zoom lens system. Moreover, the above constitution of each lens unit is advantageous in realizing the aberration balance and the reduction of the number of the lenses at the same time.

The third lens unit may be constituted of two lenses including a positive lens and a negative lens in order from the object side.

According to such a constitution, a front principal point of the third lens unit is positioned closer to the object side. Therefore, the movement amount during the magnification change can be minimized, and this results in the miniaturization of the whole zoom lens system. When the lenses constitute a cemented lens, an axial chromatic aberration can satisfactorily be corrected.

Furthermore, when the lenses constitute the cemented lens, deterioration of the optical performance due to relative eccentricity of the lenses in an assembly step can be prevented. Therefore, yield improves, and the costs are reduced.

Moreover, the third lens unit may be constituted of three lenses including a positive lens, a negative lens and a positive lens in order from the object side.

When the third lens unit is constituted to be of a triplet type having a symmetric power layout in which two positive lenses share a positive power, the aberrations generated in the third lens unit can more satisfactorily be corrected.

When the positive lens and the negative lens of the third lens unit are cemented, the axial chromatic aberrations can be corrected.

Furthermore, when all of these three lenses are cemented to constitute a cemented triplet, the deterioration of the optical performance due to the relative eccentricity of the lenses in the assembly step can be prevented. Therefore, the yield improves, and the costs are reduced.

Furthermore, when the third lens unit is provided with one or more aspherical surfaces, the spherical aberration and the coma are effectively corrected. Especially, when the surface closest to the object side is an aspherical surface, the spherical aberration is more effectively corrected. When the surface closest to the image side is an aspherical surface, a field curvature is effectively corrected.

It is preferable that the fourth lens unit is constituted of two lenses including, in order from the object side, a positive lens and a negative lens whose concave surface faces the image side. Since the front principal point of the fourth lens unit can be positioned closer to the object side, the movement amount during the magnification change can be reduced, and the whole zoom lens system is miniaturized. When these lenses are cemented to constitute a cemented lens, the chromatic aberration can be corrected.

The surface of the fourth lens unit closest to the image side may be formed as a concave which faces the image side.

When the off-axial ray emitted from the fourth lens unit is kicked up and guided into the fifth lens unit having the positive power, the incidence angle of the off-axial ray upon an electronic image sensor such as the CCD image sensor can easily be set to be appropriate, and the ray is efficiently allowed to enter the light receiving surface.

It is more preferable that the zoom lens system satisfies the following conditions:

$$3.00 < Lw/fw < 9.90 \quad (14A); \text{ and}$$

$$0.50 < Lt/ft < 2.25 \quad (15A),$$

in which Lw and Lt are total lengths of the zoom lens system in the wide-angle end and the telephoto end, respectively, and fw and ft are focal lengths of the zoom lens system in the wide-angle end and the telephoto end, respectively.

When the conditions (14A) and (15A) are satisfied, it is possible to realize a compact zoom lens system in which the aberrations are satisfactorily corrected.

When Lw/fw and Lt/ft are not above upper limits of the conditions (14A) and (15A), the total length of the zoom lens system is suppressed. The lens barrel may be constituted to be compact.

When Lw/fw and Lt/ft are not below lower limits of the conditions (14A) and (15A), the powers of the lens units constituting the zoom lens system can be weakened, and it is easy to satisfactorily correct the aberrations. This reduces the number of the lenses, and this is advantageous in reducing the costs and constituting a compact frame that holds the lenses.

Regarding the condition (14A), it is more preferable to satisfy the following condition:

$$4.20 < Lw/fw < 8.05 \quad (14A').$$

It is further preferable to satisfy the following condition:

$$5.40 < Lw/fw < 6.15 \quad (14A'').$$

Regarding the condition (15A), it is more preferable to satisfy the following condition:

$$0.90 < Lt/ft < 1.85 \quad (15A').$$

It is further preferable to satisfy the following condition:

$$1.30 < Lt/ft < 1.45 \quad (15A'').$$

More preferable constitutions of the powers of the third lens unit and the subsequent lens units will be described.

The third lens unit is a lens unit which mainly performs the magnification change function in the same manner as in the second lens unit. It is preferable to consider the movements of the lens unit during the magnification change and the aberration fluctuations due to the movements.

It is preferable to impart an appropriate power to the third lens unit so that the compact constitution is more satisfactorily compatible with the securing of the satisfactory optical performance. Specifically, the following conditions (18A) and (19A) may be satisfied:

$$0.80 < f3/fw < 2.40 \quad (18A); \text{ and}$$

$$0.10 < f3/ft < 1.00 \quad (19A),$$

in which f3 is a focal length of the third lens unit, and fw and ft are focal lengths of the zoom lens system in the wide-angle end and the telephoto end, respectively.

In a case where the power of the third lens unit is secured so that the focal length of the third lens unit is not above upper limits of the conditions (18A) and (19A), the total length of the zoom lens system can easily be reduced. The movement amount during the magnification change can be reduced, and it is easy to constitute the lens barrel to be compact.

In a case where the power of the third lens unit is suppressed so that the focal length of the third lens unit is not below lower limits of the conditions (18A) and (19A), the amount of the aberrations to be generated is reduced, and the satisfactory optical performance is advantageously secured in the whole magnification change region. The constitution is also advantageous in reducing the number of the lenses required for the aberration correction and reducing the thickness of the lens unit.

Regarding the conditions (18A) and (19A), it is more preferable to satisfy the following conditions:

$$0.80 < f3/fw < 2.40 \quad (18A'); \text{ and}$$

$$0.16 < f3/ft < 0.72 \quad (19A').$$

Regarding the conditions (18A) and (19A), it is further preferable to satisfy the following conditions:

$$1.20 < f3/fw < 1.95 \quad (18A''); \text{ and}$$

$$0.22 < f3/ft < 0.42 \quad (19A'').$$

It is preferable that the fourth lens unit satisfies the following conditions:

$$-12.00 < f4/fw < -1.30 \quad (20A); \text{ and}$$

$$-3.50 < f4/ft < -0.20 \quad (21A),$$

in which f4 is a focal length of the fourth lens unit, fw is a focal length of the zoom lens system in the wide-angle end, and ft is a focal length of the zoom lens system in the telephoto end.

In a case where the power of the fourth lens unit is inhibited from being enlarged so that the focal length of the fourth lens unit is not above upper limits of the conditions (20A) and (21A), the aberrations generated in the fourth lens unit are preferably reduced.

In a case where the power of the fourth lens unit is secured so that the focal length of the fourth lens unit is not below lower limits of the conditions (20A) and (21A), the fourth lens unit advantageously has a magnification change function or a function of adjusting the aberration fluctuations. Moreover, an incidence position of an off-axial light flux upon the subsequent fifth lens unit is easily raised. Therefore, when an electronic image sensor such as the CCD image sensor is used, the incidence angle of the ray upon the light receiving surface of the image sensor can easily be reduced. As a result, shading in the periphery of the image surface can be suppressed.

It is more preferable to satisfy the following conditions:

$$-10.00 < f4/fw < -2.30 \quad (20A'); \text{ and}$$

$$-2.60 < f4/ft < -0.33 \quad (21A').$$

It is further preferable to satisfy the following conditions:

$$-8.00 < f4/fw < -3.30 \quad (20A''); \text{ and}$$

$$-1.65 < f4/ft < -0.43 \quad (21A'').$$

It is preferable that the fifth lens unit satisfies the following conditions:

$$0.80 < f5/fw < 2.00 \quad (22A); \text{ and}$$

$$0.15 < f5/ft < 3.00 \quad (23A),$$

in which f5 is a focal length of the fifth lens unit, fw is a focal length of the zoom lens system in the wide-angle end, and ft is a focal length of the zoom lens system in the telephoto end.

In a case where the power of the fifth lens unit is secured so that the focal length of the fifth lens unit is not above upper limits of the conditions (22A) and (23A), a function of disposing the exit pupil in a far position is easily obtained. As a result, the incidence angle of the ray upon an electronic image sensor such as the CCD image sensor is advantageously reduced. In this case, the generation of the shading in the periphery of the image surface is preferably easily inhibited.

In a case where the power of the fifth lens unit is limited so that the focal length of the fifth lens unit is not below lower limits of the conditions (22A) and (23A), the aberrations of the fifth lens unit are easily suppressed, and the number of the lenses of the fifth lens unit is preferably reduced.

Moreover, the aberration fluctuations at a time when the fifth lens unit performs the focusing are suppressed, and a satisfactory image when photographing an object at a minimum distance can be obtained.

It is more preferable to satisfy the following conditions:

$$1.30 < f5/fw < 3.50 \quad (22A'); \text{ and}$$

$$0.25 < f5/ft < 2.00 \quad (23A').$$

It is further preferable to satisfy the following conditions:

$$1.75 < f5/fw < 4.85 \quad (22A''); \text{ and}$$

$$0.36 < f5/ft < 1.00 \quad (23A'').$$

Here, a preferable lens movement form (a mode of movement of the lens units) during the magnification change will be described.

It is preferable that the first lens unit is positioned closer to the object side in the telephoto end than in the wide-angle end. This is useful to enlarge the angle of field of the zoom lens system while keeping a small outer diameter of the lens positioned closest to the object side of the zoom lens system.

It is preferable that the second lens unit is positioned closer to the image side in the telephoto end than in the wide-angle end. This is useful to more easily secure the magnification change function of the second lens unit.

It is preferable that the third lens unit is positioned closer to the object side in the telephoto end than in the wide-angle end. This is useful to more easily secure the magnification change function of the third lens unit.

When the second and third lens units are moved as described above, the second and third lens units can preferably share the magnification change function with a good balance.

It is preferable that the fifth lens unit is positioned closer to the image side in the telephoto end than in the wide-angle end. This is useful to impart a burden of magnification change function to the fifth lens unit. Therefore, burdens of the magnification change functions on the other magnification change units can be reduced, and the aberration fluctuations during the magnification change can further be reduced.

Furthermore, it is preferable that during the magnification change from the wide-angle end to the telephoto end, the axial space between the third lens unit and the fourth lens unit first increases and then decreases.

When the fifth lens unit is burdened with the magnification change function, the field curvature more easily indicates a minus value in the vicinity of an intermediate position than in the wide-angle end or the telephoto end. To solve the problem, when the axial space between the third lens unit and the fourth lens unit is adjusted as described above, the field curvature is advantageously corrected in the whole magnification change region.

It is preferable that the fourth lens unit is positioned closer to the object side in the telephoto end than in the wide-angle end and that the axial space between the third lens unit and the fourth lens unit is shorter in the telephoto end than in the wide-angle end. According to such a constitution, the fourth lens unit can be burdened with the magnification change function. Therefore, the burdens of the magnification change functions on the other magnification change units can be reduced, and the aberration fluctuations during the magnification change can further be reduced.

Furthermore, it is preferable that during the magnification change from the wide-angle end to the telephoto end, the fifth lens unit moves toward the object side and then moves toward the image side.

When the fourth lens unit is burdened with the magnification change function as described above, the field curvature more easily indicates a plus value in the intermediate position than in the wide-angle end or the telephoto end. To solve the problem, when the fifth lens unit is moved as described above, the field curvature in the region distant from the optical axis can satisfactorily be corrected in the whole magnification change region.

An aperture stop which limits a diameter of an axial light flux may be disposed between the second lens unit and the third lens unit. A height of the off-axial ray passing through the third lens unit and the subsequent lens units does not become larger than necessary. Therefore, it is possible to minimize the fluctuations of the off-axial aberrations at a time when the third lens unit and the subsequent lens units move during the magnification change.

Moreover, the aperture stop may be moved integrally with the third lens unit during the magnification change. Especially, since an effective diameter of the lens of the third lens unit can be reduced, the power of the third lens unit is easily strengthened, and the miniaturization is advantageously compatible with the high zoom ratio.

Furthermore, when the zoom lens system is used as a photographing lens of a camera including a shutter, the shutter may be disposed between the second lens unit and the third lens unit in the same manner as the aperture stop. In addition, the shutter may be moved integrally with the third lens unit during the magnification change.

Since the height of the off-axial ray decreases in the vicinity of the aperture stop, a shutter unit does not have to be enlarged. An only small dead space is required for moving the shutter.

A focusing system of the zoom lens system may be an inner focusing system in which the fourth lens unit or the fifth lens unit is moved.

The inner focusing system is preferable because the movable lens unit is light and only little load is applied to a motor as compared with a focusing system performed by moving the whole lens system or a front focusing system performed by moving the first lens unit. Moreover, in consideration of a constitution for moving the lens unit to perform the focusing, a size of the zoom lens system can be reduced. Since a driving motor is disposed in a lens frame, a size of the lens frame in the diametric direction does not easily increase.

Furthermore, it is preferable that the fifth lens unit is a focusing lens unit. Especially, in a case where the focusing system in which the fifth lens unit is moved is used, a fluctuation of the field curvature in the region distant from the optical axis becomes small. Therefore, the satisfactory optical performance can be secured even in a periphery of the image surface even during the photographing of an object at the minimum focus distance.

In addition, it is preferable that the zoom lens system satisfies the following condition:

$$4.0 < fw/ft < 15.0,$$

in which fw is a focal length of the zoom lens system in the wide-angle end, and ft is a focal length of the zoom lens system in the telephoto end.

When a sufficient zoom ratio fw/ft that is not below a lower limit value of the condition, it is preferably possible to sufficiently exhibit an advantage of the securing of the zoom ratio by the zoom lens system having five lens units, an advantage of the optical performance, an advantage of the reduction of the total length and the like.

When fw/ft is not above an upper limit value of this condition, the lens movement amount is prevented from being excessively enlarged. The fluctuations of the aberrations are preferably suppressed with a small number of the lenses.

Furthermore, it is preferable to satisfy the following condition:

$$4.5 < fw/ft < 8.0.$$

The zoom lens system described above can be used as the photographing lens of the image pickup apparatus.

In general, as the incidence angle of the ray upon the light receiving surface increases, a light receiving performance of the electronic image sensor tends to deteriorate, and color shading and the like tend to be generated. However, the zoom lens system having the power layout of positive, negative, positive, negative and positive powers as described above is advantageous in disposing the exit pupil in the far position. Therefore, the system is suitable for use as the photographing lens of the image pickup apparatus, because the incidence angle of the ray upon the light receiving surface of the electronic image sensor is easily reduced. In this case, it is preferable that the image pickup apparatus has the zoom lens system described above; and the electronic image sensor which is disposed on the image side of the zoom lens system and which picks up the image formed by the above zoom lens system to convert the image into an electric signal.

It is preferable that the image pickup apparatus satisfies the following condition:

$$1.2 < fw/y_{10} < 2.0,$$

in which $y_{10}$ is a distance from the center of an effective image pickup region (a region where the image can be picked up) of the image pickup surface of the electronic image sensor to the farthest point, that is, the maximum image height.

When $fw/y_{10}$ is not below a lower limit value of this condition, the incidence angle of the off-axial light flux upon the first lens unit in the wide-angle end is inhibited from being excessively enlarged, and the amount of the off-axial aberration to be generated in the first lens unit can be reduced. It is preferable that, even when correction such as processing of image data is performed, the off-axial aberrations are suppressed to such an extent that deterioration of an image quality can be permitted.

It is preferable to easily enlarge an angle of field in the wide-angle end so that $fw/y_{10}$ is not above an upper limit value of this condition.

Next, the second aspect of the zoom lens system according to the present invention will be described.

As described above, the zoom lens system according to the present invention comprises, in order from an object side, a first lens unit having a positive refractive power; a second lens unit having a negative refractive power; a third lens unit having a positive refractive power; a fourth lens unit having a negative refractive power; and a fifth lens unit having a positive refractive power. During magnification change from a wide-angle end to a telephoto end, each of the spaces between the respective lens units changes. This is a basic constitution. In addition, according to the second aspect of the present invention, the lens units move so as to increase the space between the first lens unit and the second lens unit and to decrease the space between the second lens unit and the third lens unit in the telephoto end as compared with the wide-angle end. In the telephoto end than in the wide-angle end, the second lens unit is positioned closer to an image side and the third lens unit is positioned closer to the object side. Moreover, the zoom lens system satisfies the following conditions:

$$3.00 < Lw/fw < 9.90 \quad (1B); \text{ and}$$

$$0.50 < Lt/ft < 2.25 \quad (2B),$$

in which Lw, Lt are total lengths of the zoom lens system in the wide-angle end and the telephoto end, respectively, and fw, ft are focal lengths of the zoom lens system in the wide-angle end and the telephoto end, respectively.

According to such a constitution, the lens units can share a burden of a magnification change function and a function of adjusting an aberration balance by adjustment of a variable space. Therefore, aberration fluctuations during the magnification change can be suppressed, and a satisfactory optical performance can be obtained in the whole magnification change region.

Especially, the second and third lens units are moved as described above to distribute the magnification change function to the second and third lens units, and a difference between movement amounts of two lens units is prevented from being excessively enlarged. In consequence, a zoom ratio is advantageously secured while suppressing the aberration fluctuations.

Moreover, in a case where an electronic image sensor such as a CCD image sensor or a CMOS type image sensor is used as image pickup element, an appropriate position of an exit pupil can be kept. Therefore, an incidence angle of a ray upon the electronic image sensor can be controlled in an appropriate range, and the ray is efficiently allowed to enter a light receiving surface of the electronic image sensor.

Furthermore, the conditions (1B) and (2B) are conditions which appropriately define the total length and the focal length of the zoom lens system so that constituting of a lens barrel to be compact is compatible with securing of a satisfactory optical performance.

These conditions can be satisfied to realize a compact zoom lens system in which the aberrations are satisfactorily corrected.

When Lw/fw is not above an upper limit of the condition (1B), the total length of the zoom lens system in the wide-angle end is reduced, and an incidence height of the ray upon an object-side surface of the first lens unit in the wide-angle end is reduced so that miniaturization is advantageously compatible with the securing of a large angle of field.

When Lw/fw is not below a lower limit of the condition (1B), the power of each lens unit constituting the zoom lens system can be weakened, and the aberrations are easily satisfactorily corrected. This reduces the number of the lenses. The constitution is advantageous in reducing costs and constituting a frame which holds the lenses to be compact.

When Lt/ft is not above an upper limit of the condition (2B), the total length of the zoom lens system in the wide-angle end is reduced, and a lens frame can be inhibited from being excessively enlarged.

When Lt/ft is not below a lower limit of the condition (2B), the power of each lens unit constituting the zoom lens system can be weakened, and the aberrations are easily satisfactorily corrected. This reduces the number of the lenses. The constitution is advantageous in reducing the costs and constituting the frame which holds the lens units to be compact.

In the condition (1B), it is more preferable to satisfy the following condition:

$$4.20 < Lw/fw < 8.05 \quad (1B').$$

It is further preferable to satisfy the following condition:

$$5.40 < Lw/fw < 6.15 \quad (1B'').$$

In the condition (2B), it is more preferable to satisfy the following condition:

$$0.90 < Lt/ft < 1.85 \quad (2B').$$

It is further preferable to satisfy the following condition:

$$1.30 < Lt/ft < 1.45 \quad (2B'').$$

Furthermore, in order to provide the zoom lens system which has a satisfactory optical performance and which is suitable for a compact constitution, it is preferable that various devises are developed in addition to the above devises. This respect will hereinafter be described in detail.

It is preferable that the zoom lens system satisfies the following condition:

$$0 \leq D12/D23 < 0.20,$$

in which D12 is an axial distance from an emission surface of the first lens unit to an incidence surface of the second lens unit in the wide-angle end, and D23 is an axial distance from an emission surface of the second lens unit to an incidence surface of the third lens unit in the wide-angle end.

When D12/D23 is not above an upper limit of the above condition, the angle of field in the wide-angle end is easily secured. The constitution is advantageous in reducing the total length and a diameter of the zoom lens system in the wide-angle end. A space for moving the second and third lens units is advantageously secured, and a zoom ratio is advantageously increased.

If a value of D12/D23 is below a lower limit of the above condition, lens surfaces interfere with each other. Therefore, the value is not below the lower limit. It is more preferable to set the upper limit value to 0.13.

The second and third lens units are lens units mainly burdened with the magnification change function. It is preferable to consider the movement of the lens units during the magnification change and the aberration fluctuations due to the movement.

To constitute the zoom lens system to be compact while securing the satisfactory optical performance, it is preferable to impart appropriate powers to the second and third lens units.

Specifically, it is preferable that the second lens unit satisfies the following conditions (3B) and (4B):

$$-1.35 < f2/fw < -0.40 \quad (3B); \text{ and}$$

$$-1.00 < f2/ft < -0.10 \quad (4B),$$

in which f2 is a focal length of the second lens unit, and fw and ft are focal lengths of the zoom lens system in the wide-angle end and the telephoto end, respectively.

When f2/fw and f2/ft are not above upper limits of the conditions (3B) and (4B), the negative power of the second lens unit can be suppressed. Therefore, an amount of the aberrations to be generated is reduced, and it is easy to obtain a satisfactory optical performance in the whole magnification change region. Even when the number of the lenses is reduced, the aberrations can be corrected. A thickness of the zoom lens system when stored is advantageously suppressed.

In a case where the power of the second lens unit is secured so that f2/fw and f2/ft are not below lower limits of the conditions (3B) and (4B), the total length of the zoom lens system is easily suppressed, and a movement amount during the magnification change is easily reduced. Moreover, the constitution is advantageous in constituting a lens barrel to be compact.

Specifically, it is preferable that the third lens unit satisfies the following conditions (5B) and (6B):

$$0.80 < f3/fw < 2.40 \quad (5B); \text{ and}$$

$$0.10 < f3/ft < 1.00 \quad (6B),$$

in which f3 is a focal length of the third lens unit, and fw and ft are focal lengths of the zoom lens system in the wide-angle end and the telephoto end, respectively.

In a case where the power of the third lens unit is secured so that the f3/fw and f3/ft are not above upper limits of the conditions (5B) and (6B), the total length of the zoom lens system is easily suppressed, and the movement amount during the magnification change is easily reduced. Moreover, the constitution is advantageous in constituting a lens barrel to be compact.

When f3/fw and f3/ft are not below lower limits of the conditions (5B) and (6B), the amount of the aberrations to be generated can be reduced, and the satisfactory optical performance is easily obtained in the whole magnification change region. Even when the number of the lenses is reduced, the aberrations can be corrected. The constitution is also advantageous in reducing a thickness of the zoom lens system when stored.

When these conditions (3B) to (6B) are simultaneously satisfied, the second and third lens units advantageously share the magnification change function.

In the conditions (3B) to (6B), it is more preferable to satisfy the following conditions:

$$-1.33 < f2/fw < -0.70 \quad (3B');$$

$$-0.70 < f2/ft < -0.14 \quad (4B');$$

$$0.80 < f3/fw < 2.40 \quad (5B'); \text{ and}$$

$$0.16 < f3/ft < 0.72 \quad (6B').$$

In the conditions (3B) to (6B), it is further preferable to satisfy the following conditions:

$$-1.28 < f2/fw < -1.00 \quad (3B'');$$

$$-0.30 < f2/ft < -0.18 \quad (4B'');$$

$$1.20 < f3/fw < 1.95 \quad (5B''); \text{ and}$$

$$0.22 < f3/ft < 0.42 \quad (6B'').$$

It is more preferable that the above zoom lens system satisfies one or more of the following constitutions or conditions.

It is preferable that the first lens unit is constituted of one lens component. Here, the lens component is a lens having two surfaces—an object-side surface and an image-side surface—as air contact surfaces in a range of an effective diameter.

In the first lens unit, a height of an off-axial ray from the optical axis increases. Therefore, if a necessary thickness of an edge of the lens is to be secured, an axial thickness easily remarkably increases. Furthermore, when the number of the lens components of the first lens unit is increased, a position of an entrance pupil comes away from the object side. Therefore, a height of the ray passing through the first lens unit further increases. Therefore, the axial thickness needs to increase in order to secure an edge thickness. When the number of the lens components increases, the axial thickness of the first lens unit increases. Therefore, as the lens components increase, a size in a diametric direction or the axial thickness of the first lens unit becomes larger than necessary. The lens barrel even when collapsed cannot be compact sufficiently.

From such a viewpoint, a constitution in which the first lens unit is constituted of one lens component largely contributes to the compact constitution of the lens barrel.

When the lens component is constituted of only one lens, the constitution is further advantageous for the miniaturization. When the lens component includes a plurality of lenses, the constitution is further advantageous in miniaturizing the system while correcting the aberrations of the first lens unit.

The first lens unit may be constituted of one positive single lens. This constitution is further advantageous for the reduction of the total length of the zoom lens system and the miniaturization of the zoom lens system in the diametric direction.

At this time, it is preferable that the positive single lens satisfies the following condition:

$$70.0 < Vd11 < 105.0 \quad (7B),$$

in which Vd11 is the Abbe number of the positive single lens of the first lens unit.

When the first lens unit is constituted of one positive single lens only, the first lens unit does not have a function of canceling the aberrations generated in this lens. Therefore, to inhibit the generation of the aberrations in the first lens unit to the utmost, it is preferable that a vitreous material of the positive single lens of the first lens unit satisfies the above condition (7B).

When Vd11 is not above an upper limit of this condition, satisfactory availability and mass productivity of the vitreous material are obtained, and costs are reduced.

When Vd11 is not below a lower limit of this condition, color dispersion is reduced, the amount of chromatic aberrations to be generated in the first lens unit can be reduced, and color blur in a photographed image can be reduced.

It is more preferable to satisfy the following condition:

$$75 < Vd11 < 101 \quad (7B').$$

It is further preferable to satisfy the following condition:

$$80 < Vd11 < 97 \quad (7B'').$$

To obtain a more satisfactory aberration balance, it is preferable that the positive single lens satisfies the following condition:

$$-1.50 < SF11 < -0.20 \quad (8B),$$

in which SF11 is defined by SF11=(R11f+R11r)/(R11f−R11r) and in which R11f and R11r are paraxial radii of curvatures of the object-side surface and the image-side surface of the positive lens of the first lens unit, respectively.

When SF11 is not above an upper limit of this condition, an astigmatism and a spherical aberration generated in the wide-angle end can be reduced.

When SF11 is not below a lower limit of this condition, generation of a distortion in the wide-angle end is easily inhibited. Therefore, a further satisfactory optical performance can be obtained.

It is more preferable to satisfy the following condition:

$$-1.10 < SF11 < -0.36 \quad (8B').$$

It is further preferable to satisfy the following condition:

$$-0.90 < SF11 < -0.52 \quad (8B'').$$

Moreover, it is preferable that the object-side surface and the image-side surface of a positive single lens of the first lens unit are aspherical surfaces. The generations of the distortion, the astigmatism and a coma in the wide-angle end can effectively be inhibited.

It is preferable that the first lens unit includes one cemented lens constituted by cementing two lenses including a positive lens and a negative lens.

When the first lens unit is a cemented doublet, it is possible to more satisfactorily correct the chromatic aberration while suppressing the thickness.

It is preferable that the vitreous material of the cemented lens satisfies the following conditions:

$$1.400 < Nd1p < 1.620 \quad (9B);$$

$$65.0 < Vd1p < 100.0 \quad (10B);$$

$$1.600 < Nd1n < 2.100 \quad (11B); \text{ and}$$

$$18.0 < Vd1n < 38.0 \quad (12B),$$

in which Nd1p and Vd1p are a refractive index and the Abbe number of the positive lens of the first lens unit for the d-line, and Nd1n and Vd1n are a refractive index and the Abbe number of the negative lens of the first lens unit for the d-line, respectively.

In a case where Nd1p is not above an upper limit of the condition (9B), it is easy to obtain the vitreous material having the appropriate Abbe number that satisfies the condition (10B). This is advantageous in improving the mass productivity and reducing the costs.

In a case where Nd1p is not below a lower limit of the condition (9B), even if the positive lens has an appropriate refractive power, a curvature of the lens surface decreases (an absolute value of a radius of curvature increases). This is advantageous in reducing the generation of the aberration.

When Vd1p is not above an upper limit of the condition (10B), the availability and the mass productivity of the vitreous material improve, and the costs are advantageously reduced.

When Vd1p is not below a lower limit of the condition (10B), the color dispersion is reduced, and the generation of the chromatic aberration is easily inhibited.

When Nd1n is not above an upper limit of the condition (11B), the availability and the mass productivity of the vitreous material improve, and the costs are advantageously reduced.

In a case where Nd1n is not below a lower limit of the condition (11B), even if the negative lens has an appropriate refractive power, the curvature of the lens surface decreases, and the generation of the aberration is easily inhibited.

When Vd1n is not above an upper limit of the condition (12B), the chromatic aberration generated in the positive lens is advantageously corrected.

When Vd1n is not below a lower limit of the condition (12B), an anomalous dispersion property is prevented from being excessively high, the chromatic aberration on a short wavelength region is reduced, and the color blur in the photographed image is advantageously suppressed.

In the conditions (9B) to (12B), it is more preferable to satisfy the following conditions:

$$1.400 < Nd1p < 1.550 \quad (9B');$$

$$69.0 < Vd1p < 92.0 \quad (10B');$$

$$1.630 < Nd1n < 1.950 \quad (11B'); \text{ and}$$

$$20.0 < Vd1n < 35.0 \quad (12B').$$

It is further preferable to satisfy the following conditions:

$$1.470 < Nd1p < 1.530 \quad (9B'');$$

$$80.0 < Vd1p < 85.0 \quad (10B'');$$

$$1.680 < Nd1n < 1.850 \quad (11B''); \text{ and}$$

$$23.0 < Vd1n < 32.0 \quad (12B'').$$

It is preferable that the second lens unit is constituted of three or less lenses.

Moreover, it is preferable to dispose an aperture stop which limits an axial light flux between the second lens unit and the fourth lens unit. When the aperture stop to limit the axial light flux is disposed in this manner, the zoom lens system includes lens units having a negative refractive power before and after the aperture stop. In this case, the off-axial aberrations are easily corrected.

When the number of the lenses of the second lens unit is reduced and the entrance pupil is constituted to be shallow, the constitution is advantageous in reducing a lens diameter and reducing an outer diameter of the lens barrel. Therefore, it is preferable that the number of the lenses constituting the second lens unit is set to be as small as three or less.

Moreover, it is preferable that the negative lens is disposed closest to the object side and that the positive lens is disposed closest to the image side.

According to such a constitution, since an off-axial ray passes through the second lens unit at a reduced angle with respect to the optical axis, the aberration fluctuations due to the movement of the second lens unit during the magnification change are easily suppressed.

Furthermore, the second lens unit may be constituted of two single lenses including a negative single lens and a positive single lens in order from the object side.

Since the second lens unit has a comparatively large power, off-axial aberrations are easily generated. However, according to such a lens constitution, although the number of the lenses is reduced, the off-axial aberrations generated in the second lens unit are easily suppressed. Therefore, the aberration fluctuation during the magnification change can be minimized. Therefore, the constitution is advantageous in imparting a comparatively large power to the second lens unit to increase the zoom ratio and miniaturize the zoom lens system.

Moreover, the second lens unit may be constituted of, in order from the object side, a negative single lens and a cemented lens constituted by cementing a negative lens and a positive lens in order from the object side.

According to such a constitution, since the negative power can be shared by two negative lenses, the aberrations generated in the second lens unit can further be reduced.

Furthermore, the chromatic aberration can be corrected by the cemented lens. Therefore, the aberration fluctuations due to the movement of the second lens unit during the magnification change can satisfactorily be suppressed.

In addition, when the second lens unit includes the cemented lens, the thickness of the second lens unit is advantageously suppressed. The constitution is also advantageous in reducing influences of eccentricity as compared with a case where the lenses are not cemented.

To obtain a satisfactory aberration balance, it is preferable that the negative lens of the second lens unit closest to the object side satisfies the following condition:

$$0.10 < SF21 < 1.60 \quad (13B),$$

in which SF21 is defined by SF21=(R21f+R21r)/(R21f−R21r) and in which R21f and R21r are paraxial radii of curvatures of the object-side surface and the image-side surface of the negative lens of the second lens unit closest to the object side, respectively.

When SF21 is not above an upper limit of the condition (13B), the curvature of the image-side surface of the negative lens is reduced, and generations of off-axial aberrations such as the astigmatism and the coma are easily inhibited.

When SF21 is not below a lower limit of the condition (13B), the curvature of the object-side surface of the negative lens is reduced, and the generations of the off-axial aberrations are easily inhibited.

It is more preferable to satisfy the following condition:

$$0.27 < SF21 < 1.20 \quad (13B').$$

It is further preferable to satisfy the following condition:

$$0.44 < SF21 < 0.80 \quad (13B'').$$

It is preferable that the negative lens of the second lens unit closest to the object side satisfies the following conditions:

$$1.750 < Nd21 < 2.100 \quad (14B); \text{ and}$$

$$30.0 < Vd21 < 50.0 \quad (15B),$$

in which Nd21 and Vd21 are a refractive index and the Abbe number of the negative lens of the second lens unit closest to the object side for the d-line, respectively.

When Nd21 is not above an upper limit of the condition (14B), satisfactory availability and mass productivity of the vitreous material are obtained. This is advantageous in reducing the costs.

In a case where Nd21 is not below a lower limit of the condition (14B), even if the negative lens has an appropriate refractive power, the curvature of the lens surface can be reduced, and the generation of the aberration is easily inhibited.

When Vd21 is not above an upper limit of the condition (15B), the satisfactory availability and mass productivity of the vitreous material having the appropriate Abbe number that satisfies the condition (10B) are obtained, and the costs are advantageously reduced.

When Vd21 is not below a lower limit of the condition (15B), the color dispersion is reduced, and the generation of the chromatic aberration is easily inhibited.

In the conditions (14B) and (15B), it is more preferable to satisfy the following conditions:

$$1.770 < Nd21 < 1.950 \quad (14B'); \text{ and}$$

$$34.0 < Vd21 < 47.0 \quad (15B').$$

It is further preferable to satisfy the following conditions:

$$1.800 < Nd21 < 1.890 \quad (14B''); \text{ and}$$

$$40.0 < Vd21 < 43.0 \quad (15B'').$$

It is preferable that the positive lens of the second lens unit closest to the image side satisfies the following conditions:

$$1.840 < Nd22 < 2.100 \quad (16B); \text{ and}$$

$$15.0 < Vd22 < 32.0 \quad (17B),$$

in which Nd22 and Vd22 are the refractive index and the Abbe number of the positive lens of the second lens unit closest to the image side for the d-line, respectively.

When Nd22 is not above an upper limit of the condition (16B), the availability and mass productivity of the vitreous material improve. This results in the cost reduction.

In a case where Nd22 is not below a lower limit of the condition (16B), even if the positive lens has an appropriate refractive power, the curvature of the lens surface can be reduced, and the generation of the aberration is easily inhibited.

When Vd22 is not above an upper limit of the condition (17B), the color dispersion is advantageously secured to correct the chromatic aberration generated in the negative lens of the second lens unit. When Vd22 is not below a lower limit of the condition (17B), the color dispersion is prevented from being high, and the chromatic aberration is easily inhibited from being overcorrected on the short-wavelength region. When the conditions are satisfied, the color blur in the photographed image is effectively reduced.

In the conditions (14B) and (15B), it is more preferable to satisfy the following conditions:

$$1.890 < Nd22 < 2.010 \quad (16B'); \text{ and}$$

$$16.0 < Vd22 < 26.0 \quad (17B').$$

It is further preferable to satisfy the following conditions:

$$1.920 < Nd22 < 1.950 \quad (16B''); \text{ and}$$

$$17.0 < Vd22 < 21.0 \quad (17B'').$$

It is preferable that the total number of the lenses constituting the first and second lens units is set to four or less.

When the first and second lens units are constituted of four or less lenses in total, the thicknesses of the first and second lens units are suppressed, and the entrance pupil can be constituted to be shallow. The constitution is advantageous in constituting the zoom lens system to be compact, reducing the costs and miniaturizing the lens barrel when collapsed.

Furthermore, it is more preferable that the second lens unit includes a negative lens and a positive lens and that the first and second lens units are constituted of four lenses including two positive lenses and two negative lenses in total.

The number of the lenses constituting the first and second lens units is suppressed. Moreover, the second lens unit burdened with a magnification change function includes a negative lens and a positive lens to easily suppress the aberration fluctuations. The constitution is advantageous in obtaining the satisfactory aberration balance and miniaturizing the zoom lens system.

It is preferable that the third lens unit includes a positive lens and a negative lens, the total number of the lenses is set to three or less, and the total number of the lens components is two or less. It is preferable that the fourth lens unit includes a positive lens and a negative lens and that the total number of the lenses is two. It is preferable that the fifth lens unit is constituted of one positive lens.

The preferable constitutions of the first and second lens units have been described above. It is preferable that the first and second lens units are constituted of four or less lenses in total.

In addition, when the third lens unit is constituted as described above, the aberrations in the third lens unit are easily balanced, and the thickness of the lens unit is advantageously reduced.

When the fourth lens unit is constituted as described above, the aberrations in the fourth lens unit are easily balanced, and the thickness of the lens unit is advantageously reduced.

When the fifth lens unit is constituted of one positive lens, the total length of the zoom lens system is advantageously reduced.

In the whole zoom lens system, it is preferable that the second and third lens units perform a main magnification change function in order to appropriately perform the magnification change and set an appropriate size of the zoom lens system. Moreover, the above constitution of each lens unit is advantageous in realizing the aberration balance and the reduction of the number of the lenses at the same time.

The third lens unit may be constituted of two lenses including a positive lens and a negative lens in order from the object side. According to such a constitution, a front principal point of the third lens unit is positioned closer to the object side. Therefore, the movement amount during the magnification change can be minimized, and this results in the miniaturization of the whole zoom lens system.

Moreover, when these lenses constitute a cemented lens, axial chromatic aberrations can be corrected.

Furthermore, when these lenses constitute the cemented lens, deterioration of the optical performance due to relative eccentricity of the lenses in an assembly step can be prevented. Therefore, yield improves, and the costs are reduced.

In addition, the third lens unit may be constituted of three lenses including a positive lens, a negative lens and a positive lens in order from the object side. When the third lens unit is constituted to be of a triplet type having a symmetric power layout in which two positive lenses share a positive power, the aberrations generated in the third lens unit can more satisfactorily be corrected.

When the positive lens and the negative lens of the third lens unit constitute a cemented lens, the axial chromatic aberrations can be corrected.

Furthermore, when all of these three lenses are cemented to constitute a cemented triplet, the deterioration of the optical performance due to the relative eccentricity of the lenses in the assembly step can be prevented. Therefore, the yield improves, and the costs are reduced.

Furthermore, when the third lens unit is provided with one or more aspherical surfaces, the spherical aberration and the coma are effectively corrected. Especially, when the surface closest to the object side is an aspherical surface, the spherical aberration is more effectively corrected. When the surface closest to the image side is an aspherical surface, a field curvature is effectively corrected.

It is preferable that the fourth lens unit is constituted of two lenses including, in order from the object side, a positive lens and a negative lens whose concave surface faces the image side. Since the front principal point of the fourth lens unit can be positioned closer to the object side, the movement amount during the magnification change can be reduced, and the whole zoom lens system is miniaturized. When these lenses are cemented to constitute a cemented lens, the chromatic aberration can be corrected.

The surface of the fourth lens unit closest to the image side may be formed into a concave surface which faces the image side.

When the off-axial ray emitted from the fourth lens unit is kicked up and guided into the fifth lens unit having the positive power, the incidence angle of the off-axial ray upon an electronic image sensor such as the CCD image sensor can easily be set to be appropriate, and the ray is efficiently allowed to enter the light receiving surface.

Next, a preferable movement form of the lens units during the magnification change will be described.

The first lens unit is preferably positioned closer to the object side in the telephoto end than in the wide-angle end. This is useful to enlarge the angle of field of the zoom lens system while keeping a small outer diameter of the lens positioned closest to the object side of the zoom lens system. The magnification change function of the second lens unit can be enlarged.

It is preferable that the fifth lens unit is positioned closer to the image side in the telephoto end than in the wide-angle end. This is useful to impart a burden of magnification change function to the fifth lens unit. Therefore, the burdens of the magnification change functions on the other magnification change units can be reduced, and the aberration fluctuations during the magnification change can further be reduced.

Furthermore, it is preferable that during the magnification change from the wide-angle end to the telephoto end, the axial space between the third lens unit and the fourth lens unit first increases and then decreases.

When the fifth lens unit is burdened with the magnification change function, the field curvature more easily indicates a minus value in the vicinity of an intermediate position than in the wide-angle end or the telephoto end. To solve the problem, when the axial space between the third lens unit and the fourth lens unit is adjusted as described above, the field curvature is advantageously corrected in the whole magnification change region.

Moreover, it is preferable that the fourth lens unit is positioned closer to the object side in the telephoto end than in the wide-angle end and that the axial space between the third lens unit and the fourth lens unit is shorter in the telephoto end than in the wide-angle end. According to such a constitution, the fourth lens unit can be burdened with the magnification change function. Therefore, the burdens of the magnification change functions on the other magnification change units can be reduced, and the aberration fluctuations during the magnification change can further be reduced.

Furthermore, it is preferable that during the magnification change from the wide-angle end to the telephoto end, the fifth lens unit moves toward the object side and then moves toward the image side.

When the fourth lens unit is burdened with the magnification change function as described above, the field curvature more easily indicates a plus value in the intermediate position than in the wide-angle end or the telephoto end. To solve the problem, when the fifth lens unit is moved as described above, the field curvature in the region distant from the optical axis can satisfactorily be corrected in the whole magnification change region.

An aperture stop which limits a diameter of an axial light flux may be disposed between the second lens unit and the third lens unit. A height of the off-axial ray passing through the third lens unit and the subsequent lens units does not become larger than necessary. Therefore, it is possible to minimize the fluctuations of the off-axial aberrations at a time when the third lens unit and the subsequent lens units move during the magnification change.

Moreover, the aperture stop may be moved integrally with the third lens unit during the magnification change. Especially, since an effective diameter of the lens of the third lens unit can be reduced, the power of the third lens unit is easily strengthened, and the miniaturization is advantageously compatible with the high zoom ratio.

Furthermore, when the zoom lens system is used as a photographing lens of a camera including a shutter, the shutter may be disposed between the second lens unit and the third lens unit in the same manner as in the aperture stop. In addition, the shutter may be moved integrally with the third lens unit during the magnification change.

Since the height of the off-axial ray decreases in the vicinity of the aperture stop, a shutter unit does not have to be enlarged. An only small dead space is required for moving the shutter.

Here, a preferable focusing system will be described.

The focusing system of this zoom lens system may be an inner focusing system in which the fourth lens unit or the fifth lens unit is moved.

The inner focusing system is preferable because the movable lens unit is light and only little load is applied to a motor as compared with a focusing system performed by moving the whole lens system or a front focusing system performed by moving the first lens unit. Moreover, in consideration of a constitution for moving the lens unit to perform the focusing, a size of the zoom lens system can be reduced. Since a driving motor is disposed in a lens frame, a size of the lens frame in the diametric direction does not easily increase.

Furthermore, it is preferable that the fifth lens unit is a focusing lens unit. Especially, in a case where the focusing system in which the fifth lens unit is moved is used, a fluctuation of the field curvature in the off-axial region becomes small. Therefore, the satisfactory optical performance can be secured even in a peripheral portion of the image even during the photographing of an object at the minimum focus distance.

Here, preferable conditions of the power of each lens unit constituting the zoom lens system will be described.

It is preferable that the first lens unit satisfies the following conditions:

$$2.40 < f1/fw < 8.00 \qquad (18B); \text{ and}$$

$$0.45 < f1/ft < 2.00 \qquad (19B),$$

in which f1 is a focal length of the first lens unit, fw is a focal length of the zoom lens system in the wide-angle end, and ft is a focal length of the zoom lens system in the telephoto end.

The power of the first lens unit is secured so that f1/fw and f1/ft are not above upper limits of the conditions (18B) and (19B). In consequence, the total length of the lens system is easily reduced. The constitution is advantageous in constituting the lens barrel to be compact.

The power of the first lens unit is limited so that f1/fw and f1/ft are not below lower limits of the conditions (18B) and (19B). In consequence, generation of the aberration is easily inhibited. The constitution is advantageous especially in inhibiting the generation of the chromatic aberration, and a color blur in the photographed image is easily suppressed.

It is more preferable to satisfy the following conditions:

$$2.90 < f1/fw < 6.30 \qquad (18B'); \text{ and}$$

$$0.55 < f1/ft < 1.50 \qquad (19B').$$

It is further preferable to satisfy the following conditions:

$$3.40 < f1/fw < 4.50 \qquad (18B''); \text{ and}$$

$$0.65 < f1/ft < 1.00 \qquad (19B'').$$

It is preferable that the fourth lens unit satisfies the following conditions:

$$-12.00 < f4/fw < -1.30 \qquad (20B); \text{ and}$$

$$-3.50 < f4/ft < -0.20 \qquad (21B),$$

in which f4 is a focal length of the fourth lens unit, fw is a focal length of the zoom lens system in the wide-angle end, and ft is a focal length of the zoom lens system in the telephoto end.

In a case where the power of the fourth lens unit is inhibited from being enlarged so that the focal length of the fourth lens unit is not above upper limits of the conditions (20B) and (21B), the aberrations generated in the fourth lens unit are preferably reduced.

In a case where the power of the fourth lens unit is secured so that the focal length of the fourth lens unit is not below lower limits of the conditions (20B) and (21B), the fourth lens unit advantageously has a magnification change function or a function of adjusting the aberration fluctuations. Moreover, an incidence position of an off-axial light flux upon the subsequent fifth lens unit is easily raised. Therefore, when an electronic image sensor such as the CCD image sensor is used, the incidence angle of the ray upon the light receiving surface of the image sensor can easily be reduced. As a result, shading in the periphery of the image surface can be suppressed.

As a result, shading around a screen can be suppressed.

It is more preferable to satisfy the following conditions:

$$-10.00 < f4/fw < -2.30 \quad (20B'); \text{ and}$$

$$-2.60 < f4/fw < -0.33 \quad (21B').$$

It is further preferable to satisfy the following conditions:

$$-8.00 < f4/fw < -3.30 \quad (20B''); \text{ and}$$

$$-1.65 < f4/ft < -0.43 \quad (21B'').$$

It is preferable that the fifth lens unit satisfies the following conditions:

$$0.80 < f5/fw < 4.85 \quad (22B); \text{ and}$$

$$0.15 < f5/ft < 3.00 \quad (23B),$$

in which f5 is a focal length of the fifth lens unit, fw is a focal length of the zoom lens system in the wide-angle end, and ft is a focal length of the zoom lens system in the telephoto end.

In a case where the power of the fifth lens unit is secured so that the focal length of the fifth lens unit is not above upper limits of the conditions (22B) and (23B), a function of disposing the exit pupil in a far position is easily obtained. As a result, the incidence angle of the ray upon an electronic image sensor such as the CCD image sensor is advantageously reduced. In this case, the generation of the shading in the periphery of the image surface is preferably easily inhibited.

In a case where the power of the fifth lens unit is limited so that the focal length of the fifth lens unit is not below lower limits of the conditions (22B) and (23B), the aberrations of the fifth lens unit are easily suppressed, and the number of the lenses of the fifth lens unit is preferably reduced.

Moreover, the aberration fluctuations at a time when the fifth lens unit performs the focusing are suppressed, and a satisfactory image during photographing an object at a minimum distance can be obtained.

It is more preferable to satisfy the following conditions:

$$1.30 < f5/fw < 3.50 \quad (22B'); \text{ and}$$

$$0.25 < f5/ft < 2.00 \quad (23B').$$

It is further preferable to satisfy the following conditions:

$$1.75 < f5/fw < 2.00 \quad (22B''); \text{ and}$$

$$0.36 < f5/ft < 1.00 \quad (23B'').$$

In addition, it is preferable that the zoom lens system satisfies the following condition:

$$4.0 < fw/ft < 15.0,$$

in which fw is a focal length of the zoom lens system in the wide-angle end and ft is a focal length of the zoom lens system in the telephoto end.

When a sufficient zoom ratio fw/ft that is not below a lower limit value of the condition, it is preferably possible to sufficiently exhibit an advantage of the securing of the zoom ratio by the zoom lens system having five lens units, an advantage of the optical performance, an advantage of the reduction of the total length and the like.

When fw/ft is not above an upper limit value of this condition, the lens movement amount is prevented from being excessively enlarged. The fluctuations of the aberrations are preferably suppressed with a small number of the lenses.

Furthermore, it is preferable to satisfy the following condition:

$$4.5 < fw/ft < 8.0.$$

The zoom lens system described above can be used as the photographing lens of the image pickup apparatus.

In general, as the incidence angle of the ray upon the light receiving surface increases, a light receiving performance of the electronic image sensor tends to deteriorate, and color shading and the like tend to be generated. However, the zoom lens system having the power layout of positive, negative, positive, negative and positive powers as described above is advantageous in disposing the exit pupil in the far position. Therefore, the system is suitable for use as the photographing lens of the image pickup apparatus, because the incidence angle of the ray upon the light receiving surface of the electronic image sensor is easily reduced. In this case, it is preferable that the image pickup apparatus has the zoom lens system described above; and the electronic image sensor which is disposed on the image side of the zoom lens system and which picks up the image formed by the above zoom lens system to convert the image into an electric signal.

It is preferable that this image pickup apparatus satisfies the following condition:

$$1.2 < fw/y_{10} < 2.0,$$

in which $y_{10}$ is a distance from the center of an effective image pickup region (a region where the image can be picked up) of the image pickup surface of the electronic image sensor to the farthest point, that is, the maximum image height.

When $fw/y_{10}$ is not below a lower limit value of this condition, the incidence angle of the off-axial light flux upon the first lens unit in the wide-angle end is inhibited from being excessively enlarged, and the amount of the off-axial aberration to be generated in the first lens unit can be reduced. It is preferable that, even when correction such as processing of image data is performed, the off-axial aberrations are suppressed to such an extent that deterioration of an image quality can be permitted.

It is preferable to easily broaden an angle of field in the wide-angle end so that $fw/y_{10}$ is not above an upper limit value of this condition.

Next, numerical examples of the above zoom lens system will be described.

EXAMPLE 1

Figure 1A:
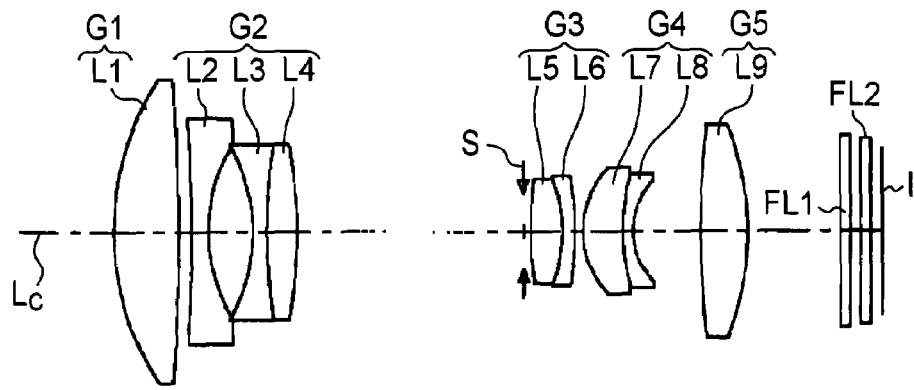
FIGS. 1A to 1C are sectional views of Example 1 of the present invention along an optical axis.
Figure 1B:
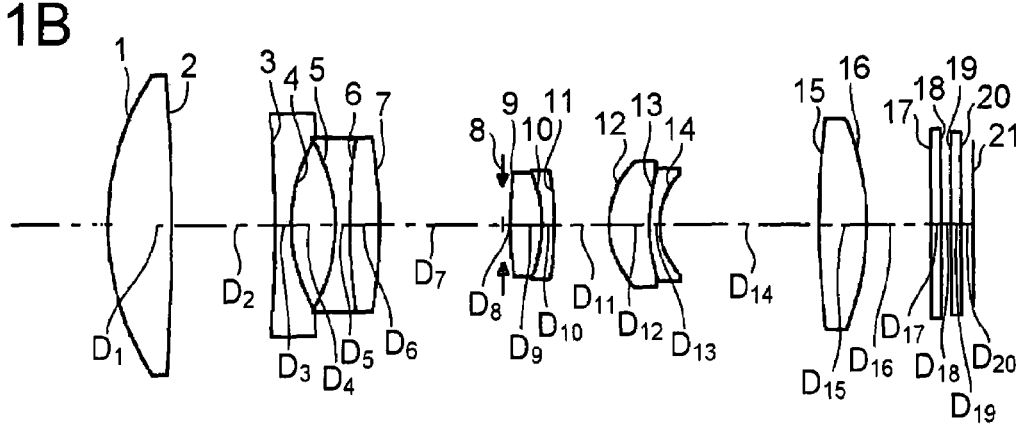
Figure 1C:
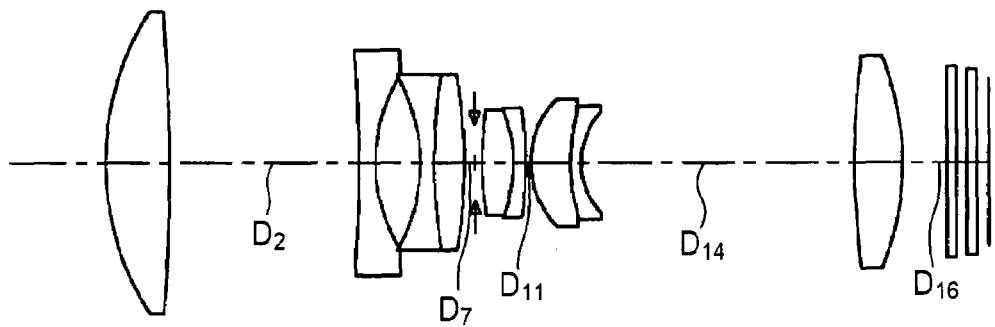

FIGS. 1A to 1C are sectional views of Example 1 of a zoom lens system according to the present invention along an optical axis, FIG. 1A is a diagram showing a state in a wide-angle end, FIG. 1B is a diagram showing an intermediate position, and FIG. 1C is a diagram showing a state in a telephoto end. A focal length increases in order of FIGS. 1A, 1B and 1C.

FIGS. 2A to 2C are aberration diagrams showing a spherical aberration (SA), an astigmatism (FC), a distortion (DT) and a chromatic aberration of magnification (CC) of Example 1 when focused on an infinite object, FIG. 2A is a diagram showing the state in the wide-angle end, FIG. 2B is a diagram showing the intermediate position, and FIG. 2C is a diagram showing a state in the telephoto end. In the drawings, FIY is an image height.

The zoom lens system of Example 1 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When the zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, a double concave negative lens L2, a double concave negative lens L3 and a double convex positive lens L4, and two lenses L3 and L4 are cemented. The third lens unit G3 includes a double convex positive lens L5 and a negative meniscus lens L6 whose concave surface faces the object side, and these two lenses L5 and L6 are cemented. The fourth lens unit G4 includes a positive meniscus lens L7 whose convex surface faces the object side and a negative meniscus lens L8 whose convex surface faces the object side. The fifth lens unit G5 includes a double convex positive lens L9. Opposite surfaces 1 and 2 of the lens L1, opposite surfaces 3 and 4 of the lens L2, an object-side surface 9 of the lens L5 and an object-side surface 12 of the lens L7 are aspherical surfaces. The parallel flat plate FL1 is a low pass filter coated with an infrared cut coating, and FL2 is a cover glass which protects the light receiving surface of the CCD image sensor.

In the zoom lens system of Example 1, during magnification change from the wide-angle end to the intermediate position, the first lens unit G1, the second lens unit G2, the third lens unit G3 and the fourth lens unit G4 move toward the object side, and the fifth lens unit G5 moves toward the image side. In this case, the lens units move so as to enlarge a space D2 between the first lens unit G1 and the second lens unit G2, a space D11 between the third lens unit G3 and the fourth lens unit G4 and a space D14 between the fourth lens unit G4 and the fifth lens unit G5, respectively. A space D7 between the second lens unit G2 and the third lens unit G3 and a space D16 between the fifth lens unit G5 and the parallel flat plate FL1 decrease. On the other hand, during the magnification change from the intermediate position to the telephoto end, the first lens unit G1, the third lens unit G3 and the fourth lens unit G4 move toward the object side. However, the second lens unit G2 reverses its movement direction between the intermediate position and the telephoto end to move toward the image side. The fifth lens unit G5 further moves toward the image side. In this case, the lens units move so as to increase the space D2 between the first lens unit G1 and the second lens unit G2 and the space D14 between the fourth lens unit G4 and the fifth lens unit G5, respectively. On the other hand, the space D7 between the second lens unit G2 and the third lens unit G3, the space D11 between the third lens unit G3 and the fourth lens unit G4 and the space D16 between the fifth lens unit G5 and the parallel flat plate FL1 decrease, respectively.

Next, numerical data of an optical member constituting an optical system of Example 1 will be described.

In the numerical data of Example 1, R is a paraxial radius of curvature of each lens surface, D is a thickness of each lens or an air space between the lenses, Nd and Vd are a refractive index and the Abbe number of each lens for the d-line, and D2, D7, D11, D14 and D16 are variable spaces. Furthermore, Fno is the F-number, f is a focal length of the zoom lens system, and $2\omega$ is an angle of field ($\omega$ is a half angle of field). A unit of R, D or f is mm. It is to be noted that the symbol * attached to a value of the radius of curvature indicates that the surface is an aspherical surface and the symbol (I) indicates that the surface is an image surface. A shape of the aspherical surface is represented by the following equation in a coordinate system in which an optical axis is a z-axis, an intersection between the surface and the optical axis is an origin, and a y-axis is a direction passing through the origin and crossing the optical axis at right angles:

$$z = (y^2/R)/[1+\{1-(1+k)(y/R)^2\}^{1/2}] + A_4 y^4 + A_6 y^6 + A_8 y^8 + A_{10} y^{10},$$

in which R is a paraxial radius of curvature, k is a conic constant, and A4, A6, A8 and A10 are 4-th, 6-th, 8-th and 10-th order aspherical coefficients. Among the aspherical coefficients, for example, a value of A4 of the aspherical surface 3 of Example 1, that is, 3.50640e−04 can be represented by $3.50640 \times 10^{-4}$, but all of the present numerical data is represented by the former form. It is to be noted that these symbols are common even to the numerical data of another example described later.

In Example 1, an image height is 4.04 mm, the focal length f is 6.62 to 14.58 to 31.74 mm, and Fno is 3.31 to 4.38 to 5.16.

Numerical Data 1

| Surface number | R | D | Nd | Vd |
|---|---|---|---|---|
| 1 | 13.131* | 3.17 | 1.49700 | 81.54 |
| 2 | −145.288* | D2 | | |
| 3 | −37.836* | 0.80 | 1.80610 | 40.92 |
| 4 | 9.350* | 2.19 | | |
| 5 | −8.965 | 0.70 | 1.58913 | 61.14 |
| 6 | 29.209 | 1.48 | 1.92286 | 18.90 |
| 7 | −28.126 | D7 | | |
| 8 | aperture | 0.37 | | |
| 9 | 17.925* | 1.59 | 1.77377 | 47.17 |
| 10 | −6.800 | 0.61 | 1.78472 | 25.68 |
| 11 | −19.935 | D11 | | |
| 12 | 4.410* | 1.97 | 1.76802 | 49.24 |
| 13 | 11.157 | 0.51 | 2.00069 | 25.46 |
| 14 | 3.550 | D14 | | |
| 15 | 41.001 | 2.35 | 1.80518 | 25.42 |
| 16 | −14.105 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞(I) | | | |

Aspherical coefficient

| | Surface number | | | |
|---|---|---|---|---|
| | 1 | 2 | 3 | 4 |
| R | 13.131 | −145.288 | −37.836 | 9.350 |
| k | 0.000 | 0.000 | 0.000 | −1.061 |
| A4 | −2.41125e−05 | −6.80953e−06 | 3.50640e−04 | 3.44906e−04 |
| A6 | −3.21539e−07 | −3.70482e−08 | −4.49378e−06 | 1.17809e−05 |
| A8 | 0.000 | 0.000 | 1.59282e−07 | −2.58210e−07 |
| A10 | 0.000 | 0.000 | −2.37981e−09 | 2.30813e−08 |

| | Surface number | |
|---|---|---|
| | 9 | 12 |
| R | 17.925 | 4.410 |
| k | 0.748 | −0.044 |
| A4 | −6.22558e−05 | −1.42650e−04 |
| A6 | 2.61058e−07 | 1.82011e−06 |
| A8 | 2.30167e−07 | 0.000 |
| A10 | −1.23545e−07 | 0.000 |

Zoom Data

| | WE | ST | TE |
|---|---|---|---|
| f | 6.62 | 14.58 | 31.74 |
| Fno | 3.31 | 4.38 | 5.16 |
| 2ω | 68.01 | 29.91 | 13.95 |
| D2 | 0.57 | 5.03 | 9.28 |
| D7 | 11.18 | 6.03 | 0.43 |
| D11 | 0.38 | 2.69 | 0.22 |
| D14 | 3.34 | 7.88 | 13.49 |
| D16 | 4.54 | 3.23 | 2.28 |

EXAMPLE 2

Figure 3A:
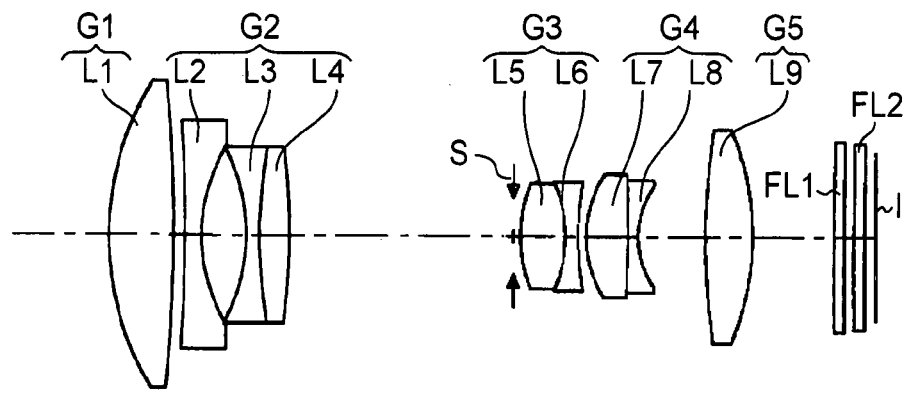
FIGS. 3A to 3C are sectional views of Example 2 of the present invention along an optical axis.
Figure 3B:
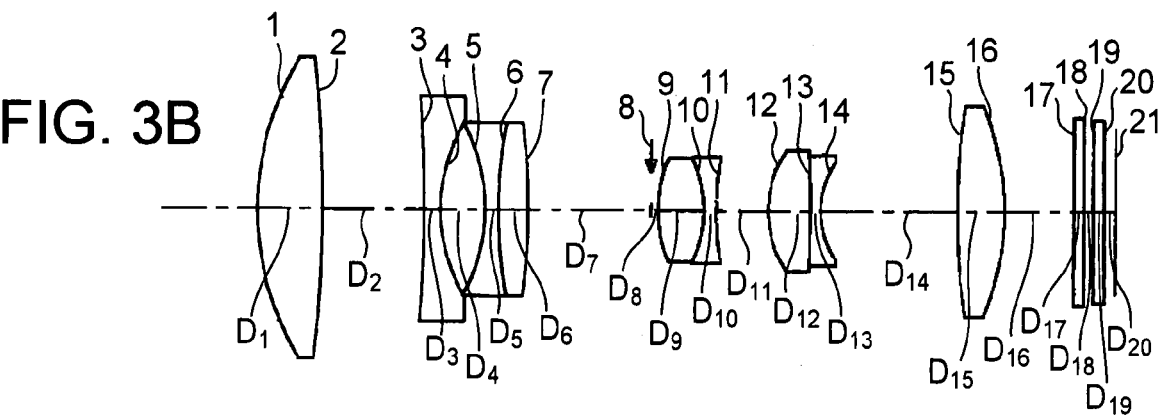
Figure 3C:
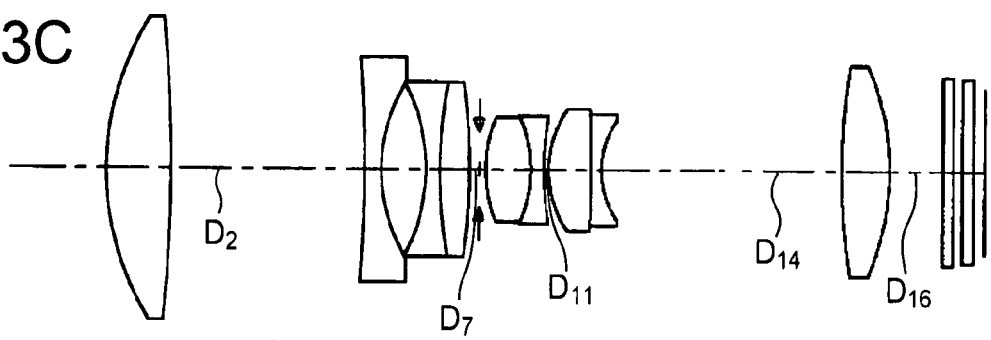

FIGS. 3A to 3C are sectional views of Example 2 of a zoom lens system according to the present invention along an optical axis, FIG. 3A is a diagram showing a state in a wide-angle end, FIG. 3B is a diagram showing an intermediate position, and FIG. 3C is a diagram showing a state in a telephoto end, respectively. A focal length increases in order of FIGS. 3A, 3B and 3C.

Figure 4A:
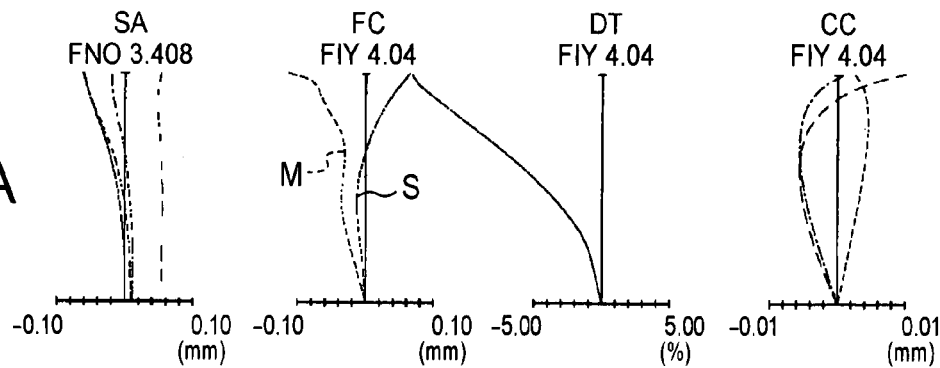
FIGS. 4A to 4C are aberration diagrams showing a spherical aberration (SA), an astigmatism (FC), a distortion (DT) and a chromatic aberration of magnification (CC) of Example 2 when focused on an infinite object.
Figure 4B:
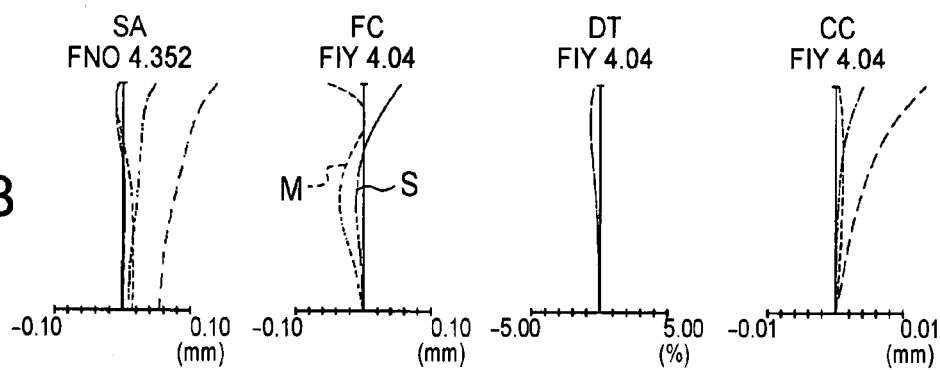
Figure 4C:
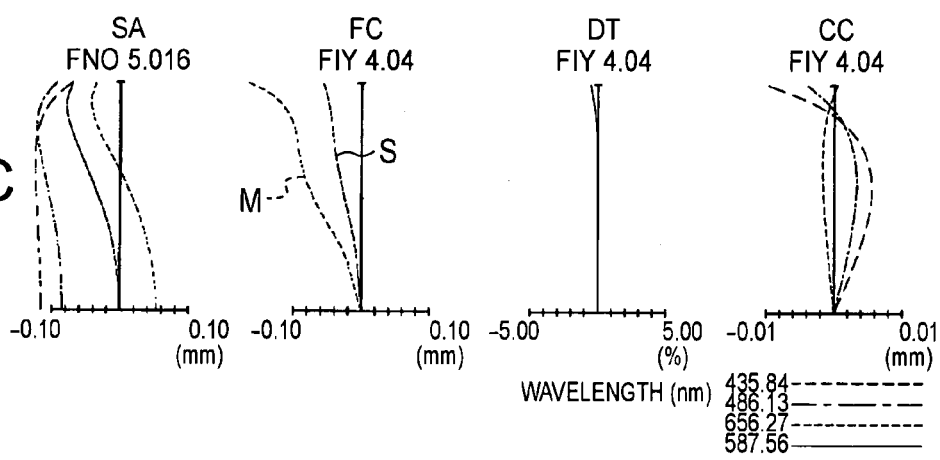

FIGS. 4A to 4C are aberration diagrams showing a spherical aberration (SA), an astigmatism (FC), a distortion (DT) and a chromatic aberration of magnification (CC) of Example 2 when focused on an infinite object, FIG. 4A is a diagram showing the state in the wide-angle end, FIG. 4B is a diagram showing the intermediate position, and FIG. 4C is a diagram showing a state in the telephoto end. In the drawings, FIY is the maximum image height.

The zoom lens system of Example 2 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, a double concave negative lens L2, a double concave negative lens L3 and a double convex positive lens L4, and two lenses L3 and L4 are cemented. The third lens unit G3 includes a double convex positive lens L5 and a double concave negative lens L6, and these two lenses L5 and L6 are cemented. The fourth lens unit G4 includes a double convex positive lens L7 and a double concave negative lens L8, and the two lenses L7 and L8 are cemented. The fifth lens unit G5 includes a double convex positive lens L9. Opposite surfaces 1 and 2 of the lens L1, opposite surfaces 3 and 4 of the lens L2, an object-side surface 9 of the lens L5 and an image-side surface 11 of the lens L6 are aspherical surfaces. The parallel flat plate FL1 is a low pass filter coated with an infrared cut coating, and FL2 is a cover glass which protects the light receiving surface of the CCD image sensor.

In the zoom lens system of Example 2, during magnification change from the wide-angle end to the intermediate position, the first lens unit G1, the second lens unit G2, the third lens unit G3 and the fourth lens unit G4 move toward the object side, and the fifth lens unit G5 moves toward the image side. During this magnification change, the lens units move so as to enlarge a space D2 between the first lens unit G1 and the second lens unit G2, a space D11 between the third lens unit G3 and the fourth lens unit G4 and a space D14 between the fourth lens unit G4 and the fifth lens unit G5, respectively. A space D7 between the second lens unit G2 and the third lens unit G3 and a space D16 between the fifth lens unit G5 and the parallel flat plate FL1 decrease. On the other hand, during the magnification change from the intermediate position to the telephoto end, the first lens unit G1, the third lens unit G3 and the fourth lens unit G4 move toward the object side. However, the second lens unit G2 reverses its movement direction between the intermediate position and the telephoto end to move toward the image side. The fifth lens unit G5 further moves toward the image side. In this case, the lens units move so as to increase the space D2 between the first lens unit G1 and the second lens unit G2, the space D14 between the fourth lens unit G4 and the fifth lens unit G5 and the space D7 between the second lens unit G2 and the third lens unit G3, respectively. The space D7 between the second lens unit G2 and the third lens unit G3, the space D11 between the third lens unit G3 and the fourth lens unit G4 and the space D16 between the fifth lens unit G5 and the parallel flat plate FL1 decrease, respectively.

In Example 2, an image height is 4.04 mm, the focal length f is 6.62 to 14.22 to 31.73 mm, and Fno is 3.41 to 4.35 to 5.02.

Numerical Data 2

| Surface number | R | D | Nd | Vd |
|---|---|---|---|---|
| 1 | 13.726* | 3.17 | 1.49700 | 81.54 |
| 2 | −85.837* | D2 | | |
| 3 | −38.043* | 0.80 | 1.80610 | 40.92 |
| 4 | 9.226* | 2.19 | | |
| 5 | −9.230 | 0.70 | 1.58913 | 61.14 |
| 6 | 25.936 | 1.48 | 1.92286 | 18.90 |
| 7 | −36.175 | D7 | | |
| 8 | aperture | 0.37 | | |
| 9 | 7.800* | 2.22 | 1.77377 | 47.17 |
| 10 | −6.800 | 0.61 | 1.68893 | 31.16 |
| 11 | 20.470* | D11 | | |
| 12 | 5.311 | 2.07 | 1.88300 | 40.76 |
| 13 | −1158.189 | 0.51 | 2.00069 | 25.46 |
| 14 | 4.141 | D14 | | |
| 15 | 30.007 | 2.35 | 1.80518 | 25.42 |
| 16 | −14.743 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞(I) | | | |

Aspherical coefficient

| | Surface number | | | |
|---|---|---|---|---|
| | 1 | 2 | 3 | 4 |
| R | 13.726 | −85.837 | −38.043 | 9.226 |
| k | 0.000 | 0.000 | 0.000 | −1.570 |
| A4 | −1.82405e−05 | 6.18637e−06 | 3.72444e−04 | 5.05344e−04 |
| A6 | −2.53266e−07 | −6.21578e−08 | −4.17444e−06 | 1.07045e−05 |
| A8 | 0.000 | 0.000 | 8.99176e−08 | 8.83402e−09 |
| A10 | 0.000 | 0.000 | −1.56083e−09 | 8.19063e−09 |

| | Surface number | |
|---|---|---|
| | 9 | 11 |
| R | 7.800 | 20.470 |
| k | −0.939 | 0.000 |
| A4 | 7.47118e−04 | 1.47264e−03 |
| A6 | 1.87059e−05 | 4.28950e−05 |
| A8 | −5.14211e−07 | 0.000 |
| A10 | −8.51175e−08 | 0.000 |

Zoom Data

| | WE | ST | TE |
|---|---|---|---|
| f | 6.62 | 14.22 | 31.73 |
| Fno | 3.41 | 4.35 | 5.02 |
| 2ω | 67.57 | 30.38 | 13.84 |
| D2 | 0.57 | 5.04 | 9.51 |
| D7 | 11.02 | 6.00 | 0.43 |
| D11 | 0.40 | 2.60 | 0.22 |
| D14 | 3.33 | 6.79 | 11.99 |
| D16 | 4.05 | 3.45 | 2.87 |

EXAMPLE 3

Figure 5A:
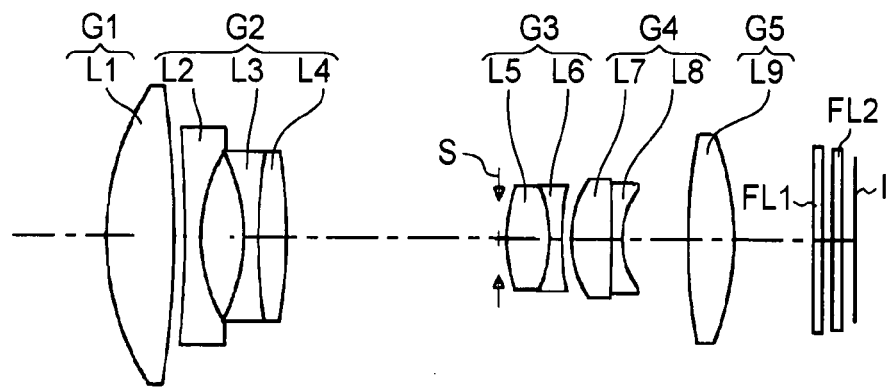
FIGS. 5A to 5C are sectional views of Example 3 of the present invention along an optical axis.
Figure 5B:
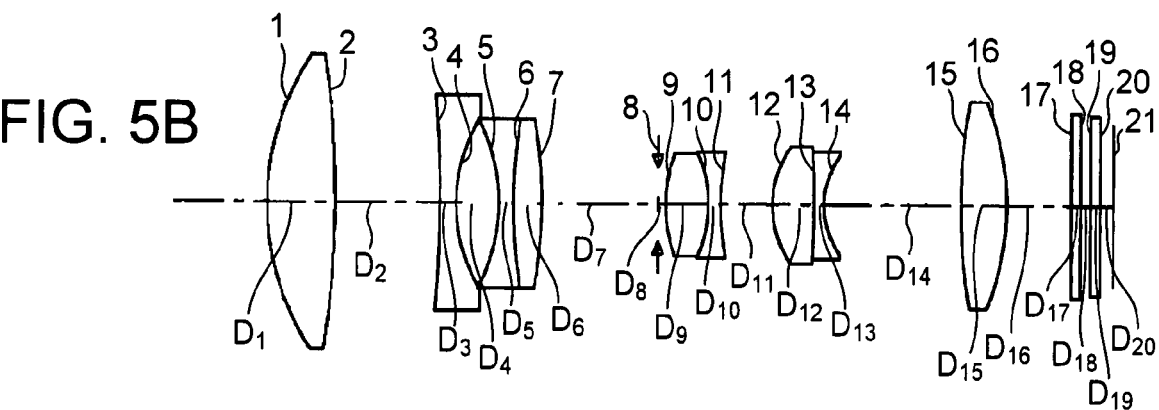
Figure 5C:
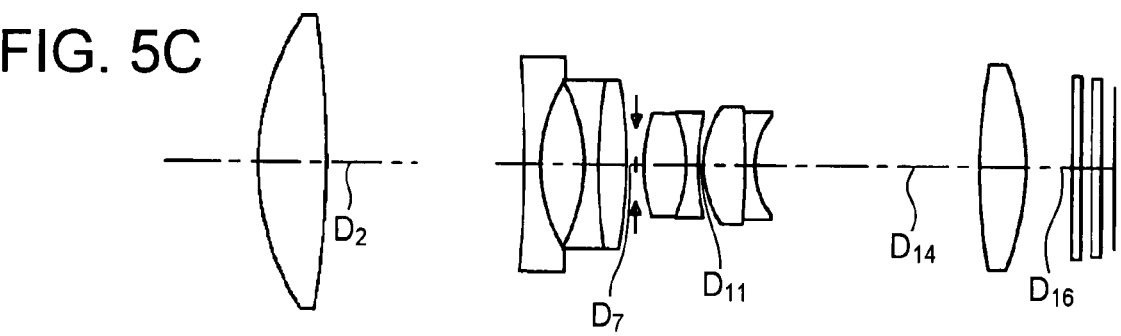

FIGS. 5A to 5C are sectional views of Example 3 of the present invention along an optical axis, FIG. 5A is a diagram showing a state in a wide-angle end, FIG. 5B is a diagram showing an intermediate position, and FIG. 5C is a diagram showing a state in a telephoto end. A focal length increases in order of FIGS. 5A, 5B and 5C.

Figure 6A:
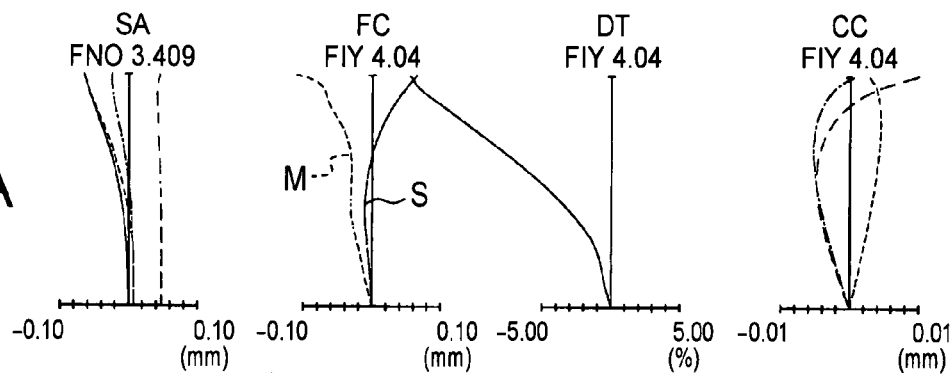
FIGS. 6A to 6C are aberration diagrams showing a spherical aberration (SA), an astigmatism (FC), a distortion (DT) and a chromatic aberration of magnification (CC) of Example 3 when focused on an infinite object.
Figure 6B:
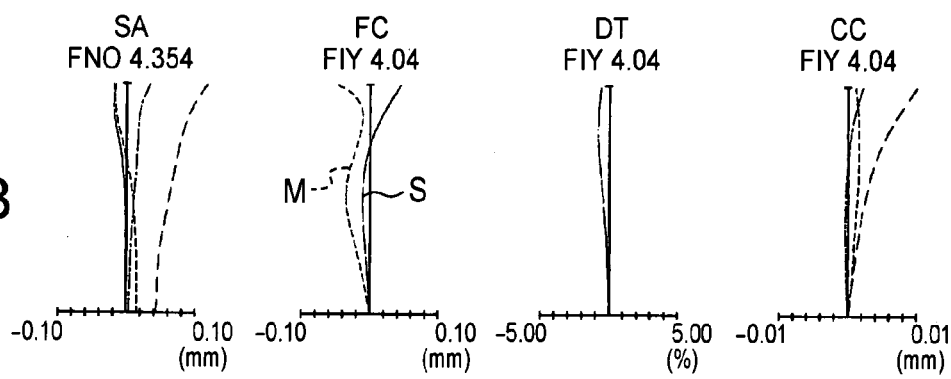
Figure 6C:
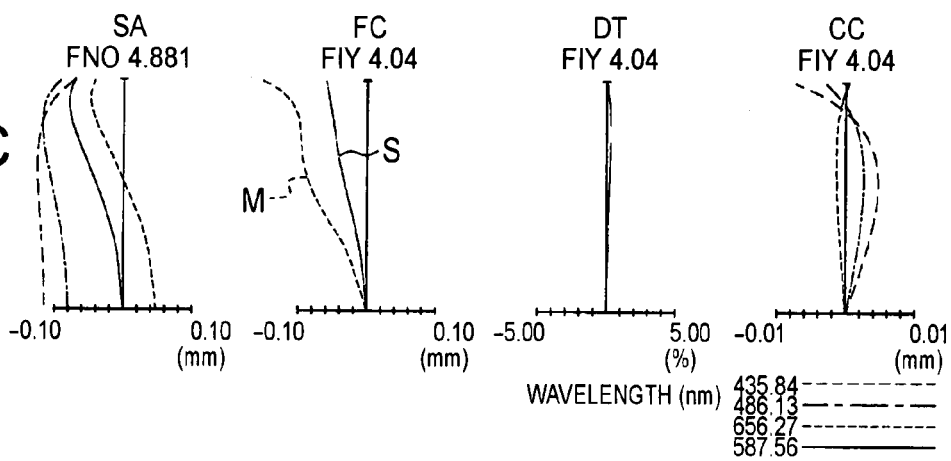

FIGS. 6A to 6C are aberration diagrams showing a spherical aberration (SA), an astigmatism (FC), a distortion (DT) and a chromatic aberration of magnification (CC) of Example 3 when focused on an infinite object, FIG. 6A is a diagram showing the state in the wide-angle end, FIG. 6B is a diagram showing the intermediate position, and FIG. 6C is a diagram showing a state in the telephoto end. In the drawings, FIY is an image height.

The zoom lens system of Example 3 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, a double concave negative lens L2, a double concave negative lens L3 and a double convex positive lens L4, and two lenses L3 and L4 are cemented. The third lens unit G3 includes a double convex positive lens L5 and a double concave negative lens L6, and these two lenses L5 and L6 are cemented. The fourth lens unit G4 includes a double convex positive lens L7 and a double concave negative lens L8, and the two lenses L7 and L8 are cemented. The fifth lens unit G5 includes a double convex positive lens L9. Opposite surfaces 1 and 2 of the lens L1, opposite surfaces 3 and 4 of the lens L2, an object-side surface 9 of the lens L5 and an image-side surface 11 of the lens L6 are aspherical surfaces. The parallel flat plate FL1 is a low pass filter coated with an infrared cut coating, and FL2 is a cover glass which protects the light receiving surface of the CCD image sensor.

In the zoom lens system of Example 3, during magnification change from the wide-angle end to the intermediate position, the first lens unit G1, the second lens unit G2, the third lens unit G3 and the fourth lens unit G4 move toward the object side, and the fifth lens unit G5 moves toward the image side. In this case, the lens units move so as to enlarge a space D2 between the first lens unit G1 and the second lens unit G2, a space D11 between the third lens unit G3 and the fourth lens unit G4 and a space D14 between the fourth lens unit G4 and the fifth lens unit G5, respectively. A space D7 between the second lens unit G2 and the third lens unit G3 and a space D16 between the fifth lens unit G5 and the parallel flat plate FL1 decrease. Moreover, during the magnification change from the intermediate position to the telephoto end, the first lens unit G1, the third lens unit G3 and the fourth lens unit G4 move toward the object side. The fifth lens unit G5 further moves toward the image side. The second lens unit G2 reverses its movement direction between the intermediate position and the telephoto end to move toward the image side. In this case, the lens units move so as to increase the space D2 between the first lens unit G1 and the second lens unit G2 and a space D14 between the fourth lens unit G4 and the fifth lens unit G5, respectively. On the other hand, the space D7 between the second lens unit G2 and the third lens unit G3, the space D11 between the third lens unit G3 and the fourth lens unit G4 and the space D16 between the fifth lens unit G5 and the parallel flat plate FL1 decrease, respectively.

Moreover, in Example 3, an image height is 4.04 mm, the focal length f is 6.62 to 14.42 to 31.74 mm, and Fno is 3.41 to 4.35 to 4.88.

| Numerical Data 3 | | | | |
|---|---|---|---|---|
| Surface number | R | D | Nd | Vd |
| 1 | 12.998* | 3.45 | 1.43875 | 94.93 |
| 2 | −56.964* | D2 | | |
| 3 | −29.930* | 0.80 | 1.80610 | 40.92 |
| 4 | 9.186* | 2.19 | | |
| 5 | −9.158 | 0.70 | 1.58913 | 61.14 |
| 6 | 27.313 | 1.48 | 1.92286 | 18.90 |
| 7 | −29.143 | D7 | | |
| 8 | aperture | 0.37 | | |
| 9 | 7.800* | 2.20 | 1.77377 | 47.17 |
| 10 | −6.800 | 0.61 | 1.68893 | 31.16 |
| 11 | 20.540* | D11 | | |
| 12 | 5.367 | 2.08 | 1.88300 | 40.76 |
| 13 | −114.106 | 0.51 | 2.00069 | 25.46 |
| 14 | 4.180 | D14 | | |
| 15 | 28.481 | 2.35 | 1.80518 | 25.42 |
| 16 | −14.752 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞(I) | | | |

| Aspherical coefficient | | | | |
|---|---|---|---|---|
| | Surface number | | | |
| | 1 | 2 | 3 | 4 |
| R | 12.998 | −56.964 | −29.930 | 9.186 |
| k | 0.000 | 0.000 | 0.000 | −0.854 |
| A4 | −2.35458e−05 | 1.27194e−05 | 3.93377e−04 | 3.85073e−04 |
| A6 | −2.41873e−07 | −1.28219e−08 | −4.71194e−06 | 1.09184e−05 |
| A8 | 0.000 | 0.000 | 7.44028e−08 | −6.06903e−09 |
| A10 | 0.000 | 0.000 | −1.26789e−09 | 3.00577e−09 |

| | Surface number | |
|---|---|---|
| | 9 | 11 |
| R | 7.800 | 20.540 |
| k | −0.890 | 0.000 |
| A4 | 7.37916e−04 | 1.45721e−03 |
| A6 | 1.63555e−05 | 4.23048e−05 |
| A8 | −1.04707e−07 | 0.000 |
| A10 | −1.09038e−07 | 0.000 |

| Zoom Data | | | |
|---|---|---|---|
| | WE | ST | TE |
| f | 6.62 | 14.42 | 31.74 |
| Fno | 3.41 | 4.35 | 4.88 |
| 2ω | 67.98 | 30.01 | 13.77 |
| D2 | 0.57 | 5.41 | 10.11 |
| D7 | 10.77 | 5.89 | 0.43 |
| D11 | 0.47 | 2.62 | 0.25 |
| D14 | 3.35 | 6.91 | 11.39 |
| D16 | 4.06 | 3.34 | 2.54 |

EXAMPLE 4

Figure 7A:
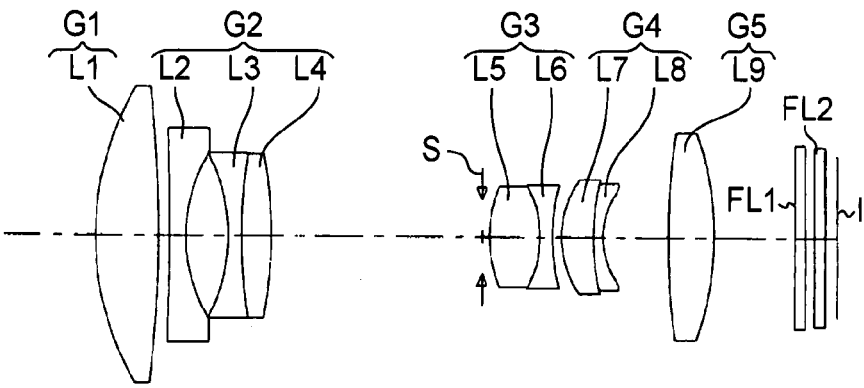
FIGS. 7A to 7C are sectional views of Example 4 of the present invention along an optical axis.
Figure 7B:
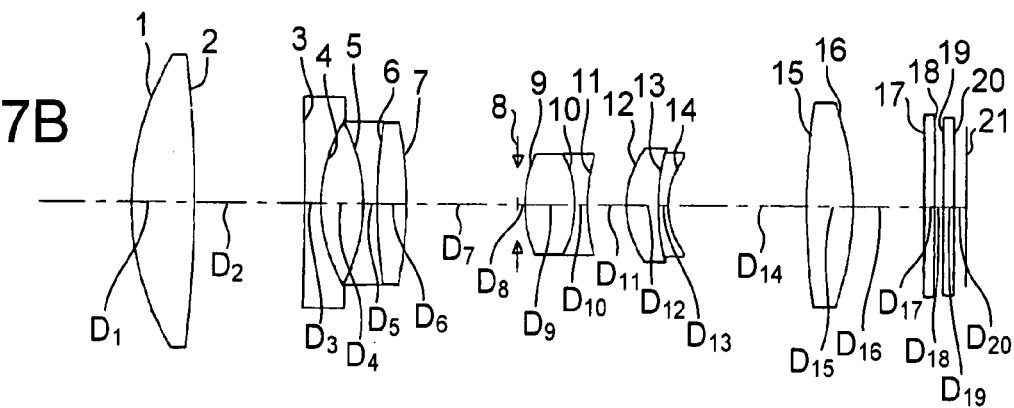
Figure 7C:
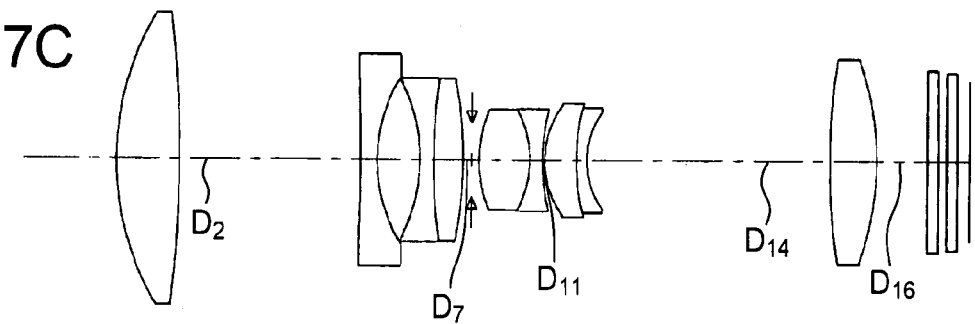

FIGS. 7A to 7C are sectional views of Example 4 of a zoom lens system according to the present invention along an optical axis, FIG. 7A is a diagram showing a state in a wide-angle end, FIG. 7B is a diagram showing an intermediate position, and FIG. 7C is a diagram showing a state in a telephoto end, respectively. A focal length increases in order of FIGS. 7A, 7B and 7C.

Figure 8A:
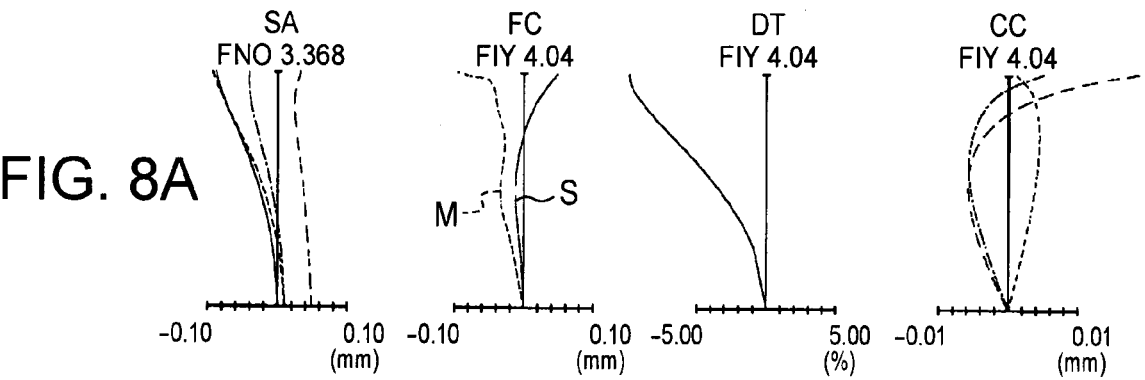
FIGS. 8A to 8C are aberration diagrams showing a spherical aberration (SA), an astigmatism (FC), a distortion (DT) and a chromatic aberration of magnification (CC) of Example 4 when focused on an infinite object.
Figure 8B:
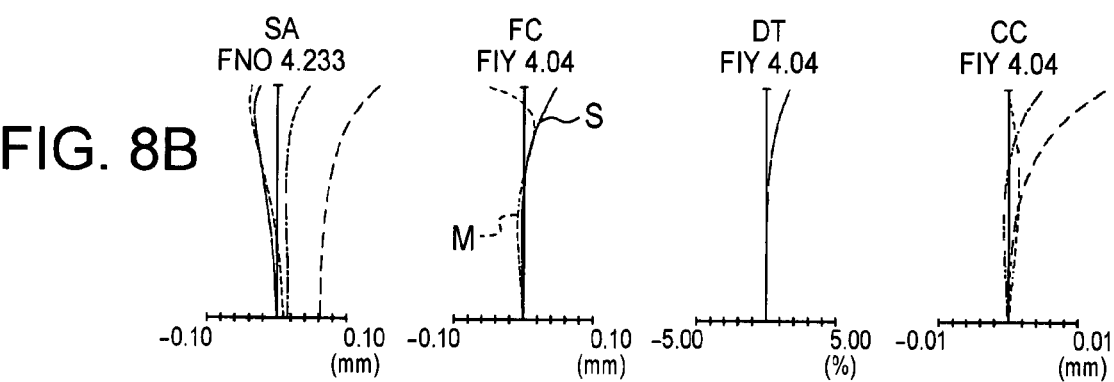
Figure 8C:
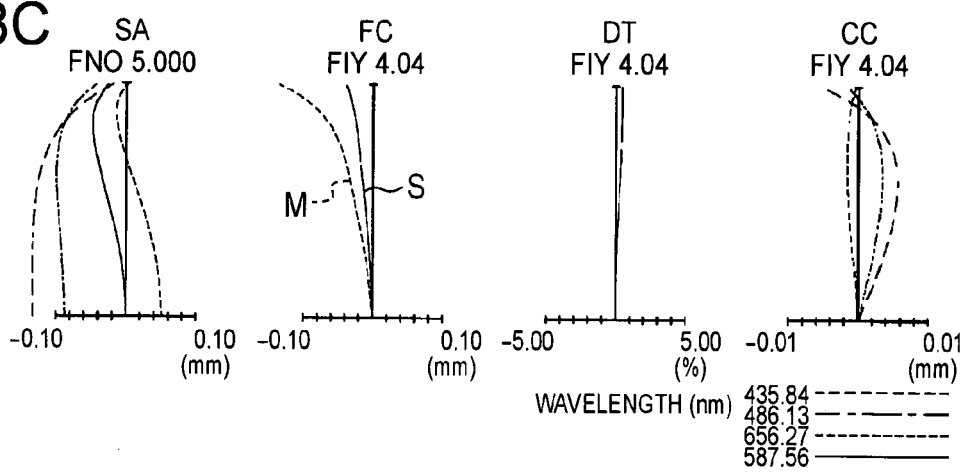

FIGS. 8A to 8C are aberration diagrams showing a spherical aberration (SA), an astigmatism (FC), a distortion (DT) and a chromatic aberration of magnification (CC) of Example 4 when focused on an infinite object, FIG. 8A is a diagram showing the state in the wide-angle end, FIG. 8B is a diagram showing the intermediate position, and FIG. 8C is a diagram showing a state in the telephoto end, respectively. In the drawings, FIY is an image height.

The zoom lens system of Example 4 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, a double concave negative lens L2, a double concave negative lens L3 and a double convex positive lens L4, and two lenses L3 and L4 are cemented. The third lens unit G3 includes a double convex positive lens L5 and a double concave negative lens L6, and these two lenses L5 and L6 are cemented. The fourth lens unit G4 includes a positive meniscus lens L7 whose convex surface faces the object side and a negative meniscus lens L8 whose convex surface faces the object side, and the two lenses L7 and L8 are cemented. The fifth lens unit G5 includes a double convex positive lens L9. Opposite surfaces 1 and 2 of the lens L1, opposite surfaces 3 and 4 of the lens L2, an object-side surface 9 of the lens L5 and an image-side surface 11 of the lens L6 are aspherical surfaces. The parallel flat plate FL1 is a low pass filter coated with an infrared cut coating, and FL2 is a cover glass which protects the light receiving surface of the CCD image sensor.

In the zoom lens system of Example 4, during magnification change from the wide-angle end to the intermediate position, the first lens unit G1, the third lens unit G3 and the fourth lens unit G4 move toward the object side, and the second lens unit G2 and the fifth lens unit G5 move toward the image side. In this case, the lens units move so as to enlarge a space D2 between the first lens unit G1 and the second lens unit G2, a space D11 between the third lens unit G3 and the fourth lens unit G4 and a space D14 between the fourth lens unit G4 and the fifth lens unit G5, respectively. A space D7 between the second lens unit G2 and a space D16 between the fifth lens unit G4 and the parallel flat plate FL1 decrease. Moreover, during the magnification change from the intermediate position to the telephoto end, the first lens unit G1, the third lens unit G3 and the fourth lens unit G4 move toward the object side. However, the second lens unit G2 and the fifth lens unit G5 further move toward the image side. In this case, the lens units move so as to increase the space D2 between the first lens unit G1 and the second lens unit G2 and a space D14 between the fourth lens unit G4 and the fifth lens unit G5, respectively. On the other hand, the space D7 between the second lens unit G2 and the third lens unit G3, the space D11 between the third lens unit G3 and the fourth lens unit G4 and the space D16 between the fifth lens unit G5 and the parallel flat plate FL1 decrease, respectively.

Moreover, in Example 4, an image height is 4.04 mm, the focal length f is 6.61 to 14.94 to 31.74 mm, and Fno is 3.37 to 4.23 to 5.00.

Numerical Data 4

| Surface number | R | D | Nd | Vd |
|---|---|---|---|---|
| 1 | 14.006* | 3.21 | 1.49700 | 81.54 |
| 2 | −63.961* | D2 | | |
| 3 | −62.128* | 0.80 | 1.80610 | 40.92 |
| 4 | 8.732* | 2.19 | | |
| 5 | −9.634 | 0.71 | 1.69680 | 55.53 |
| 6 | 27.040 | 1.51 | 1.92286 | 18.90 |
| 7 | −27.632 | D7 | | |
| 8 | aperture | 0.37 | | |
| 9 | 7.059* | 2.61 | 1.77377 | 47.17 |
| 10 | −5.168 | 0.60 | 1.68893 | 31.16 |
| 11 | 13.827* | D11 | | |
| 12 | 5.051 | 1.62 | 1.81600 | 46.62 |
| 13 | 12.402 | 0.50 | 2.00069 | 25.46 |
| 14 | 4.165 | D14 | | |
| 15 | 38.360 | 2.35 | 2.00069 | 25.46 |
| 16 | −17.347 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞(I) | | | |

Aspherical coefficient

| | Surface number | | | |
|---|---|---|---|---|
| | 1 | 2 | 3 | 4 |
| R | 14.006 | −63.961 | −62.128 | 8.732 |
| k | 0.000 | 0.000 | 0.000 | −1.404 |
| A4 | −1.80006e−05 | 1.72341e−05 | 3.30809e−04 | 5.12084e−04 |
| A6 | −1.32046e−07 | −4.04260e−08 | −6.93335e−06 | 2.34364e−06 |
| A8 | 0.000 | 0.000 | 1.83679e−07 | 2.19326e−07 |
| A10 | 0.000 | 0.000 | −2.54736e−09 | 1.22205e−09 |

| | Surface number | |
|---|---|---|
| | 9 | 11 |
| R | 7.059 | 13.827 |
| k | −3.142 | 0.000 |
| A4 | 1.44837e−03 | 1.60777e−03 |
| A6 | −1.26704e−05 | 4.12926e−05 |
| A8 | 5.36646e−07 | 0.000 |
| A10 | −1.42543e−07 | 0.000 |

Zoom Data

| | WE | ST | TE |
|---|---|---|---|
| f | 6.61 | 14.94 | 31.74 |
| Fno | 3.37 | 4.23 | 5.00 |
| 2ω | 65.48 | 28.47 | 13.73 |
| D2 | 0.57 | 5.62 | 9.27 |
| D7 | 10.77 | 5.68 | 0.43 |
| D11 | 0.48 | 1.92 | 0.15 |
| D14 | 3.35 | 7.18 | 12.47 |
| D16 | 4.24 | 3.64 | 2.69 |

EXAMPLE 5

Figure 9A:
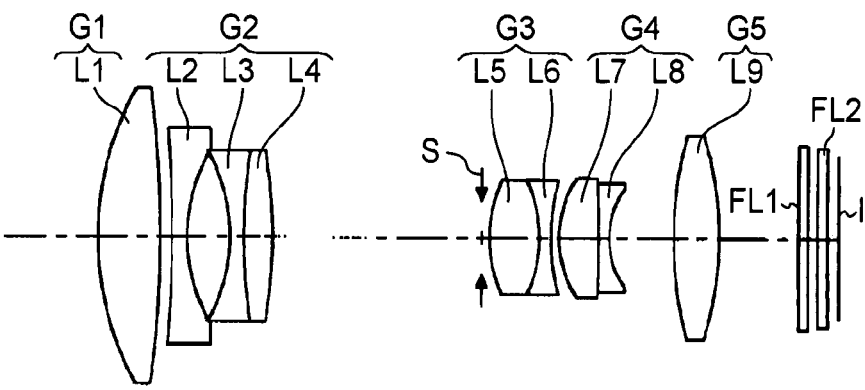
FIGS. 9A to 9C are sectional views of Example 5 of the present invention along an optical axis.
Figure 9B:
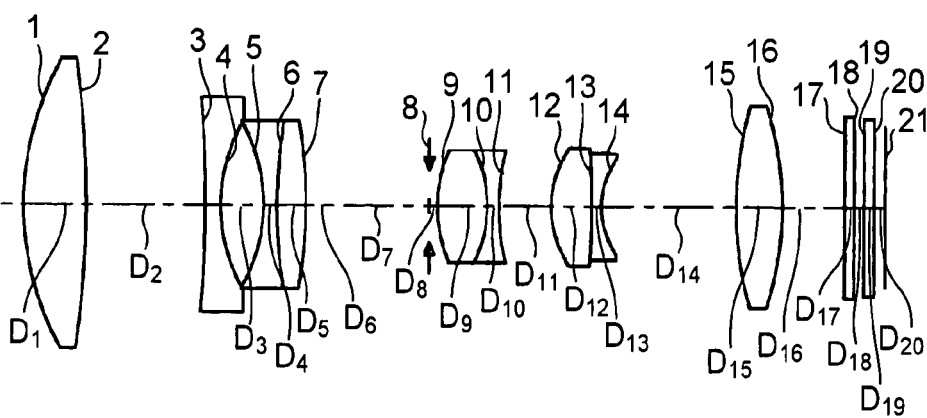
Figure 9C:
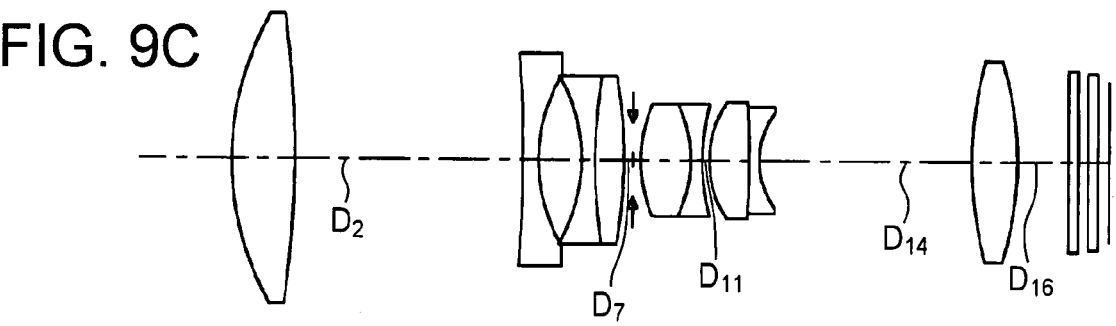

FIGS. 9A to 9C are sectional views of Example 5 of a zoom lens system according to the present invention along an optical axis, FIG. 9A is a diagram showing a state in a wide-angle end, FIG. 9B is a diagram showing an intermediate position, and FIG. 9C is a diagram showing a state in a telephoto end, respectively. A focal length increases in order of FIGS. 9A, 9B and 9C.

Figure 10A:
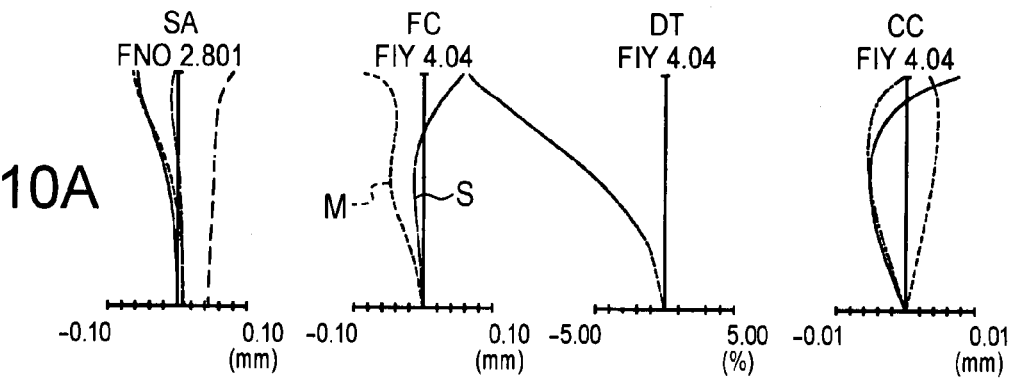
FIGS. 10A to 10C are aberration diagrams showing a spherical aberration (SA), an astigmatism (FC), a distortion (DT) and a chromatic aberration of magnification (CC) of Example 5 when focused on an infinite object.
Figure 10B:
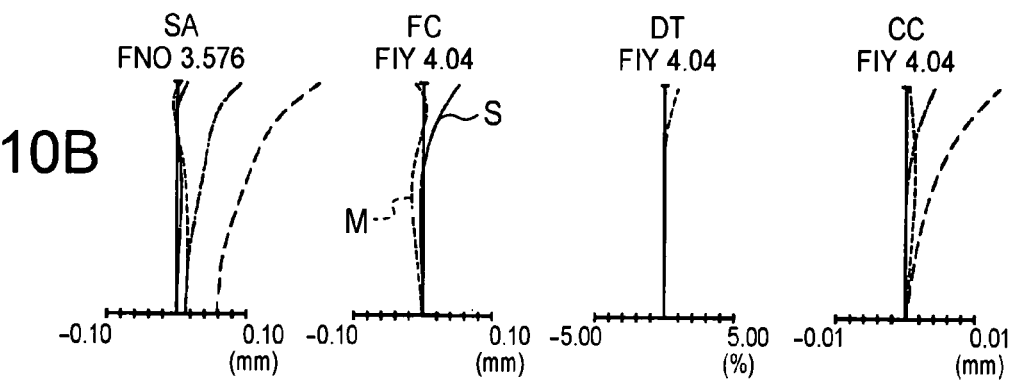
Figure 10C:
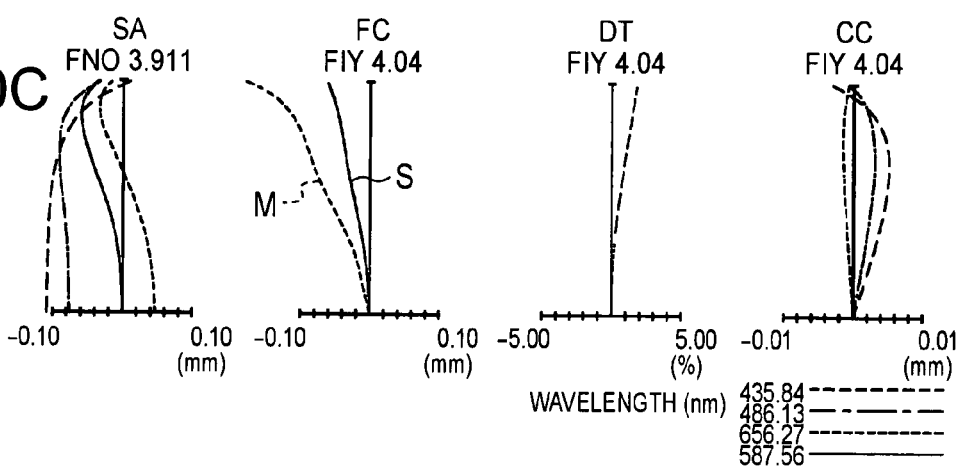

FIGS. 10A to 10C are aberration diagrams showing a spherical aberration (SA), an astigmatism (FC), a distortion (DT) and a chromatic aberration of magnification (CC) of Example 5 when focused on an infinite object, FIG. 10A is a diagram showing the state in the wide-angle end, FIG. 10B is a diagram showing the intermediate position, and FIG. 10C is a diagram showing a state in the telephoto end, respectively. In the drawings, FIY is an image height.

The zoom lens system of Example 5 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, a double concave negative lens L2, a double concave negative lens L3 and a double convex positive lens L4, and two lenses L3 and L4 are cemented. The third lens unit G3 includes a double convex positive lens L5 and a double concave negative lens L6, and these two lenses L5 and L6 are cemented. The fourth lens unit G4 includes a double convex positive lens L7 and a double concave negative lens L8, and the two lenses L7 and L8 are cemented. The fifth lens unit G5 includes a double convex positive lens L9. Opposite surfaces 1 and 2 of the lens L1, opposite surfaces 3 and 4 of the lens L2, an object-side surface 9 of the lens L5 and an image-side surface 11 of the lens L6 are aspherical surfaces. The parallel flat plate FL1 is a low pass filter coated with an infrared cut coating, and FL2 is a cover glass which protects the light receiving surface of the CCD image sensor.

In the zoom lens system of Example 5, during magnification change from the wide-angle end to the intermediate position, the first lens unit G1, the second lens unit G2, the third lens unit G3 and the fourth lens unit G4 move toward the object side, and the fifth lens unit G5 moves toward the image side. In this case, the lens units move so as to enlarge a space D2 between the first lens unit G1 and the second lens unit G2, a space D11 between the third lens unit G3 and the fourth lens unit G4 and a space D14 between the fourth lens unit G4 and the fifth lens unit G5, respectively. A space D7 between the second lens unit G2 and the third lens unit G3 and a space D16 between the fifth lens unit G4 and the parallel flat plate FL1 decrease. Moreover, during the magnification change from the intermediate position to the telephoto end, the first lens unit G1, the third lens unit G3 and the fourth lens unit G4 move toward the object side. The fifth lens unit G5 further moves toward the image side. The second lens unit G2 reverses its movement direction between the intermediate position and the telephoto end to move toward the image side. In this case, the lens units move so as to increase the space D2 between the first lens unit G1 and the second lens unit G2 and the space D14 between the fourth lens unit G4 and the fifth lens unit G5, respectively. On the other hand, the space D7 between the second lens unit G2 and the third lens unit G3, the space D11 between the third lens unit G3 and the fourth lens unit G4 and the space D16 between the fifth lens unit G5 and the parallel flat plate FL1 decrease, respectively.

Moreover, in Example 5, an image height is 4.04 mm, the focal length f is 6.61 to 14.27 to 31.753 mm, and Fno is 2.80 to 3.58 to 3.91.

Numerical Data 5

| Surface number | R | D | Nd | Vd |
|---|---|---|---|---|
| 1 | 14.666* | 3.20 | 1.43875 | 94.93 |
| 2 | −54.521* | D2 | | |
| 3 | −38.229* | 0.80 | 1.80610 | 40.92 |
| 4 | 9.630* | 2.19 | | |
| 5 | −8.740 | 0.70 | 1.58913 | 61.14 |
| 6 | 32.581 | 1.48 | 1.92286 | 18.90 |
| 7 | −27.615 | D7 | | |
| 8 | aperture | 0.37 | | |
| 9 | 7.800* | 2.57 | 1.77377 | 47.17 |
| 10 | −6.800 | 0.61 | 1.68893 | 31.16 |
| 11 | 19.246* | D11 | | |
| 12 | 5.370 | 2.06 | 1.88300 | 40.76 |
| 13 | −129.784 | 0.51 | 2.00069 | 25.46 |
| 14 | 4.191 | D14 | | |
| 15 | 20.499 | 2.35 | 1.80518 | 25.42 |
| 16 | −17.739 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞(I) | | | |

Aspherical coefficient

| | Surface number | | | |
|---|---|---|---|---|
| | 1 | 2 | 3 | 4 |
| R | 14.666 | −54.521 | −38.229 | 9.630 |
| k | 0.000 | 0.000 | 0.000 | −0.584 |
| A4 | −1.81359e−05 | 1.01441e−05 | 2.78275e−04 | 2.50636e−04 |
| A6 | −1.31494e−07 | −3.08880e−09 | −3.87019e−06 | 2.47399e−06 |
| A8 | 0.000 | 0.000 | 1.47604e−07 | 2.47163e−07 |
| A10 | 0.000 | 0.000 | −2.32474e−09 | 4.96916e−09 |

| | Surface number | |
|---|---|---|
| | 9 | 11 |
| R | 7.800 | 19.246 |
| k | −0.811 | 0.000 |
| A4 | 5.56562e−04 | 1.25468e−03 |
| A6 | 1.18629e−05 | 3.36566e−05 |
| A8 | −2.52008e−07 | 0.000 |
| A10 | −2.82755e−08 | 0.000 |

Zoom Data

| | WE | ST | TE |
|---|---|---|---|
| f | 6.61 | 14.27 | 31.75 |
| Fno | 2.80 | 3.58 | 3.91 |
| 2ω | 67.73 | 29.93 | 13.57 |
| D2 | 0.57 | 6.16 | 11.61 |
| D7 | 10.77 | 6.27 | 0.43 |
| D11 | 0.38 | 2.63 | 0.28 |
| D14 | 3.32 | 6.97 | 11.00 |
| D16 | 4.05 | 3.22 | 2.76 |

EXAMPLE 6

Figure 11A:
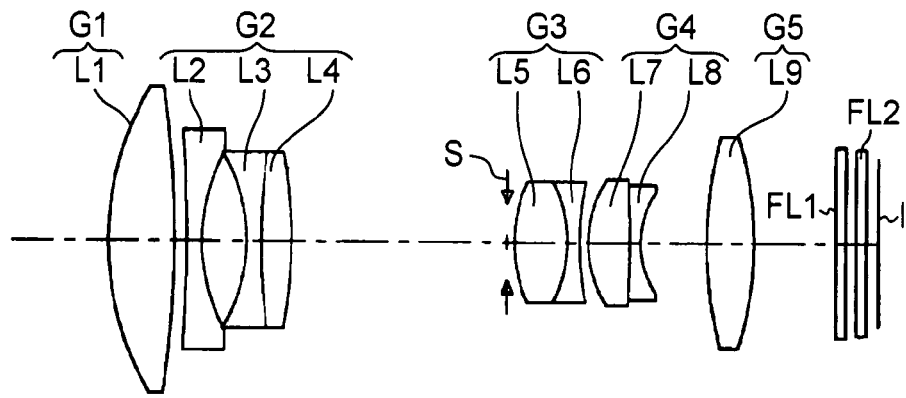
FIGS. 11A to 11C are sectional views of Example 6 of the present invention along an optical axis.
Figure 11B:
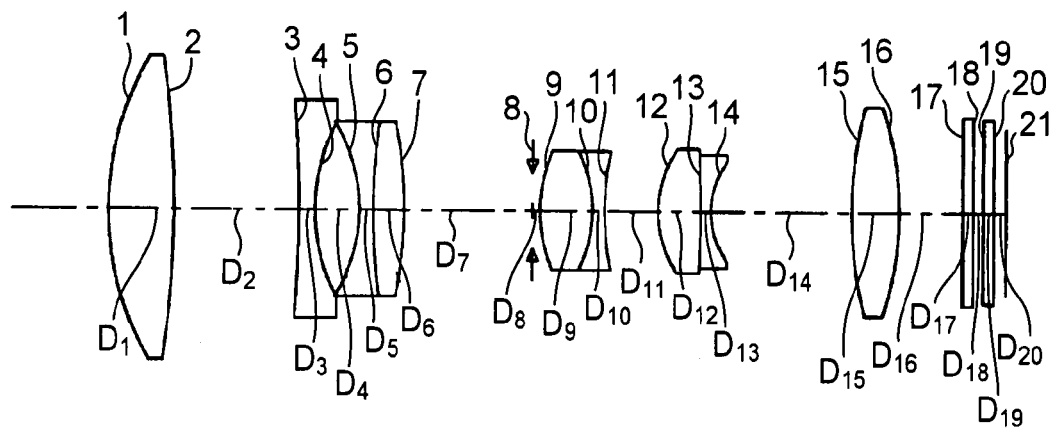
Figure 11C:
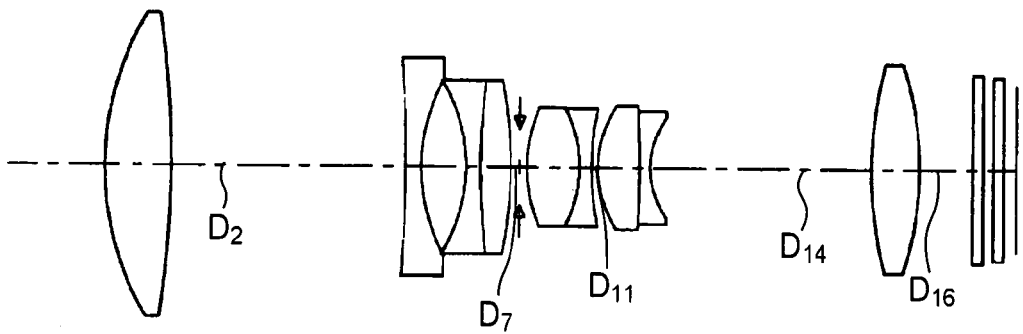

FIGS. 11A to 11C are sectional views of Example 6 of a zoom lens system according to the present invention along an optical axis, FIG. 11A is a diagram showing a state in a wide-angle end, FIG. 11B is a diagram showing an intermediate position, and FIG. 11C is a diagram showing a state in a telephoto end, respectively. A focal length increases in order of FIGS. 11A, 11B and 11C.

Figure 12A:
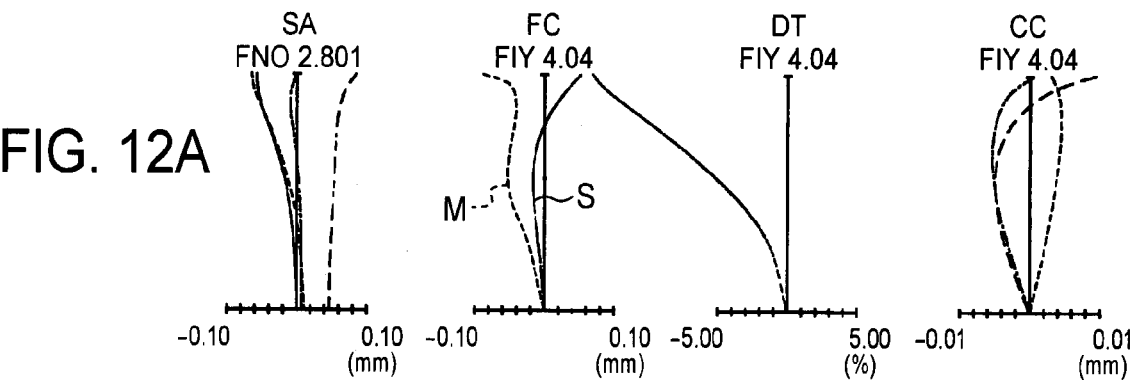
FIGS. 12A to 12C are aberration diagrams showing a spherical aberration (SA), an astigmatism (FC), a distortion (DT) and a chromatic aberration of magnification (CC) of Example 6 when focused on an infinite object.
Figure 12B:
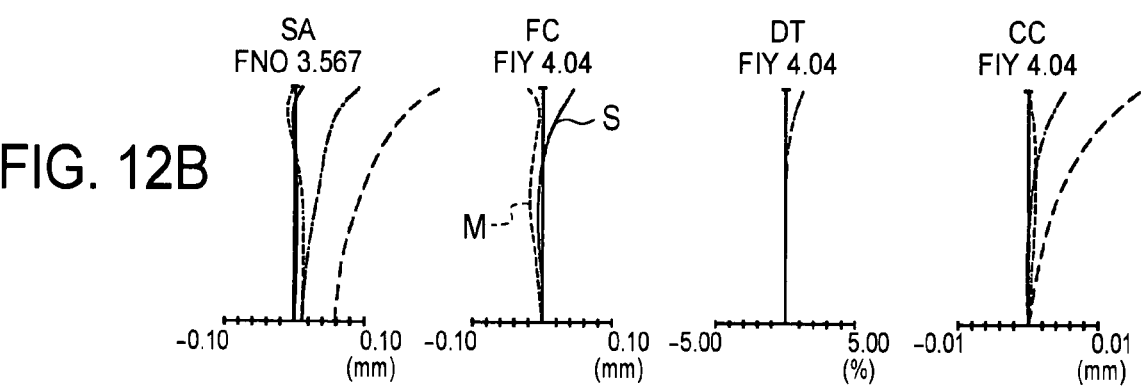
Figure 12C:
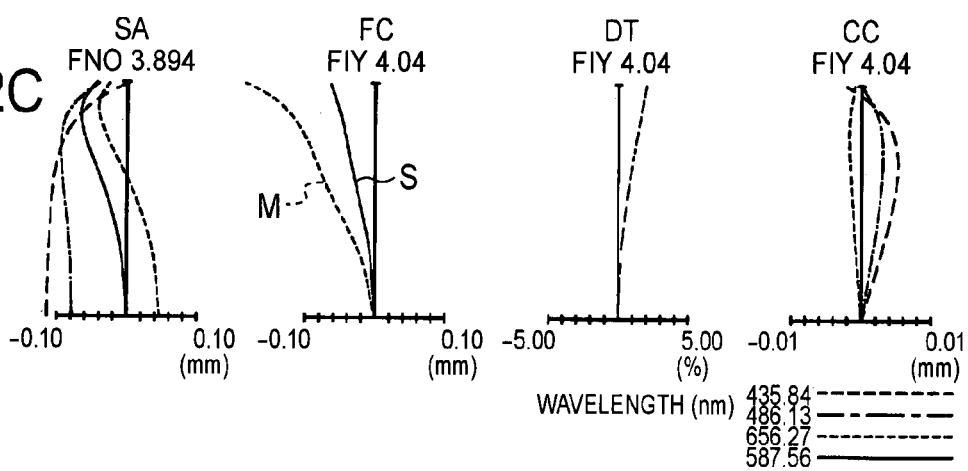

FIGS. 12A to 12C are aberration diagrams showing a spherical aberration (SA), an astigmatism (FC), a distortion (DT) and a chromatic aberration of magnification (CC) of Example 6 when focused on an infinite object, FIG. 12A is a diagram showing the state in the wide-angle end, FIG. 12B is a diagram showing the intermediate position, and FIG. 12C is a diagram showing a state in the telephoto end, respectively. In the drawings, FIY is an image height.

The zoom lens system of Example 6 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, double concave negative lenses L2 and L3 and a double convex positive lens L4, and two lenses L3 and L4 are cemented. The third lens unit G3 includes a double convex positive lens L5 and a double concave negative lens L6, and these two lenses L5 and L6 are cemented. The fourth lens unit G4 includes a double convex positive lens L7 and a double concave negative lens L8, and the two lenses L7 and L8 are cemented. The fifth lens unit G5 includes a double convex positive lens L9. Opposite surfaces 1 and 2 of the lens L1, opposite surfaces 3 and 4 of the lens L2, an object-side surface 9 of the lens L5 and an image-side surface 11 of the lens L6 are aspherical surfaces. The parallel flat plate FL1 is a low pass filter coated with an infrared cut coating, and FL2 is a cover glass which protects the light receiving surface of the CCD image sensor.

In the zoom lens system of Example 6, during magnification change from the wide-angle end to the intermediate position, the first lens unit G1, the second lens unit G2, the third lens unit G3 and the fourth lens unit G4 move toward the object side, and the fifth lens unit G5 moves toward the image side. In this case, the lens units move so as to enlarge a space D2 between the first lens unit G1 and the second lens unit G2, a space D11 between the third lens unit G3 and the fourth lens unit G4 and a space D14 between the fourth lens unit G4 and the fifth lens unit G5, respectively. A space D7 between the second lens unit G2 and the third lens unit G3 and a space D16 between the fifth lens unit G5 and the parallel flat plate FL1 decrease. Moreover, during the magnification change from the intermediate position to the telephoto end, the first lens unit G1, the third lens unit G3 and the fourth lens unit G4 move toward the object side. The fifth lens unit G5 further moves toward the image side. The second lens unit G2 reverses its movement direction between the intermediate position and the telephoto end to move toward the image side. In this case, the lens units move so as to increase the space D2 between the first lens unit G1 and the second lens unit G2 and the space D14 between the fourth lens unit G4 and the fifth lens unit G5, respectively. On the other hand, the space D7 between the second lens unit G2 and the third lens unit G3, the space D11 between the third lens unit G3 and the fourth lens unit G4 and the space D16 between the fifth lens unit G5 and the parallel flat plate FL1 decrease, respectively.

Moreover, in Example 6, an image height is 4.04 mm, the focal length f is 6.61 to 14.22 to 31.76 mm, and Fno is 2.80 to 3.57 to 3.89.

Numerical Data 6

| Surface number | R | D | Nd | Vd |
|---|---|---|---|---|
| 1 | 14.558* | 3.24 | 1.43875 | 94.93 |
| 2 | −52.051* | D2 | | |
| 3 | −44.850* | 0.80 | 1.88300 | 40.76 |
| 4 | 9.992* | 2.19 | | |
| 5 | −8.538 | 0.70 | 1.58913 | 61.14 |
| 6 | 35.581 | 1.47 | 1.92286 | 18.90 |
| 7 | −25.525 | D7 | | |
| 8 | aperture | 0.37 | | |
| 9 | 7.800* | 2.60 | 1.77377 | 47.17 |
| 10 | −6.800 | 0.60 | 1.68893 | 31.16 |
| 11 | 19.250* | D11 | | |
| 12 | 5.360 | 2.10 | 1.88300 | 40.76 |
| 13 | −93.009 | 0.50 | 2.00069 | 25.46 |
| 14 | 4.176 | D14 | | |
| 15 | 20.185 | 2.35 | 1.80518 | 25.42 |
| 16 | −18.062 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞(I) | | | |

Aspherical coefficient

| | Surface number | | | |
|---|---|---|---|---|
| | 1 | 2 | 3 | 4 |
| R | 14.558 | −52.051 | −44.850 | 9.992 |
| k | 0.000 | 0.000 | 0.000 | −0.619 |
| A4 | −1.83244e−05 | 1.21730e−05 | 2.39553e−04 | 2.24098e−04 |
| A6 | −1.28024e−07 | −3.83119e−09 | −2.82074e−06 | 1.75073e−06 |
| A8 | 0.000 | 0.000 | 1.20596e−07 | 3.08030e−07 |
| A10 | 0.000 | 0.000 | −2.14299e−09 | −6.71731e−10 |

| | Surface number | |
|---|---|---|
| | 9 | 11 |
| R | 7.800 | 19.250 |
| k | −0.785 | 0.000 |
| A4 | 5.49617e−04 | 1.25458e−03 |
| A6 | 1.15403e−05 | 3.33752e−05 |
| A8 | −2.60160e−07 | 0.000 |
| A10 | −2.62162e−08 | 0.000 |

Zoom Data

| | WE | ST | TE |
|---|---|---|---|
| f | 6.61 | 14.22 | 31.76 |
| Fno | 2.80 | 3.57 | 3.89 |
| 2ω | 67.64 | 29.95 | 13.54 |
| D2 | 0.57 | 6.12 | 11.47 |
| D7 | 10.66 | 6.30 | 0.43 |
| D11 | 0.39 | 2.63 | 0.29 |
| D14 | 3.32 | 6.96 | 10.94 |
| D16 | 4.06 | 3.22 | 2.83 |

EXAMPLE 7

Figure 13A:
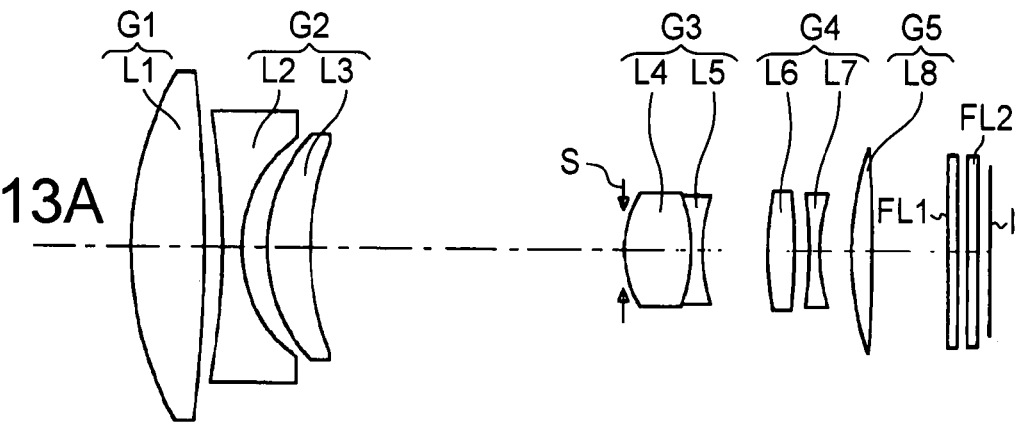
FIGS. 13A to 13C are sectional views of Example 7 of the present invention along an optical axis.
Figure 13B:
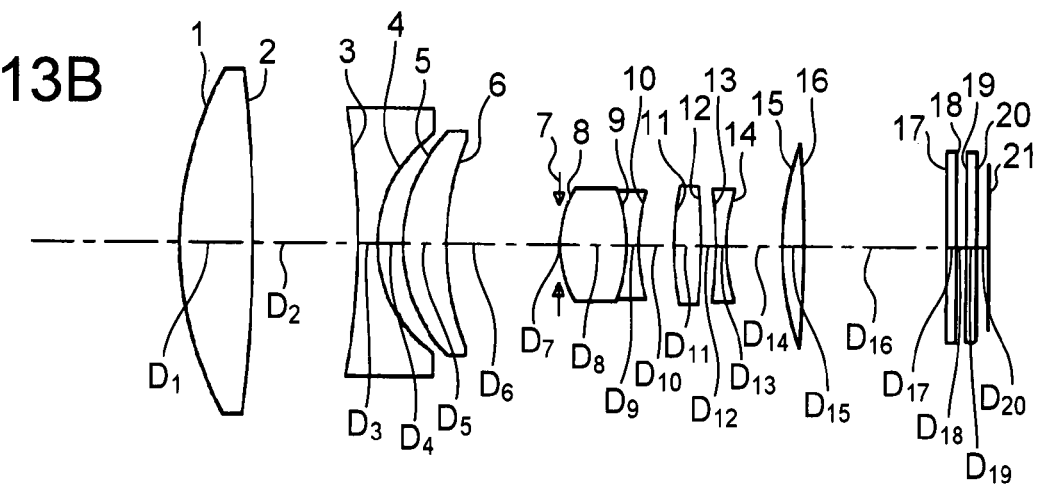
Figure 13C:
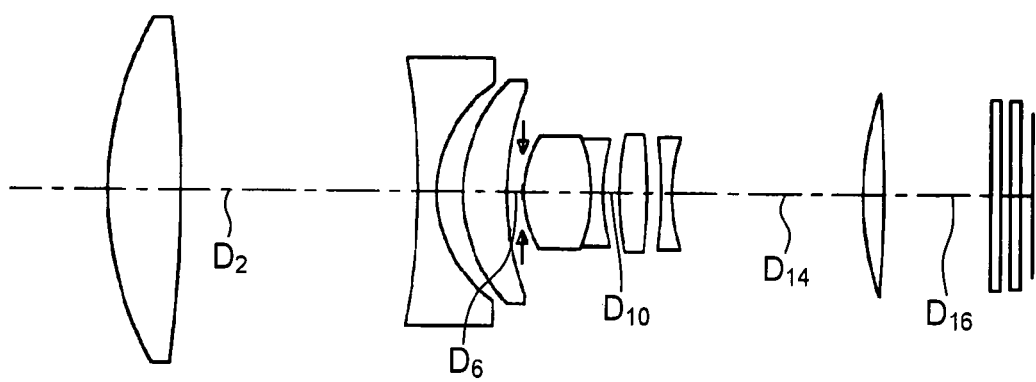

FIGS. 13A to 13C are sectional views of Example 7 of a zoom lens system according to the present invention along an optical axis, FIG. 13A is a diagram showing a state in a wide-angle end, FIG. 13B is a diagram showing an intermediate position, and FIG. 13C is a diagram showing a state in a telephoto end. A focal length increases in order of FIGS. 13A, 13B and 13C.

Figure 14A:
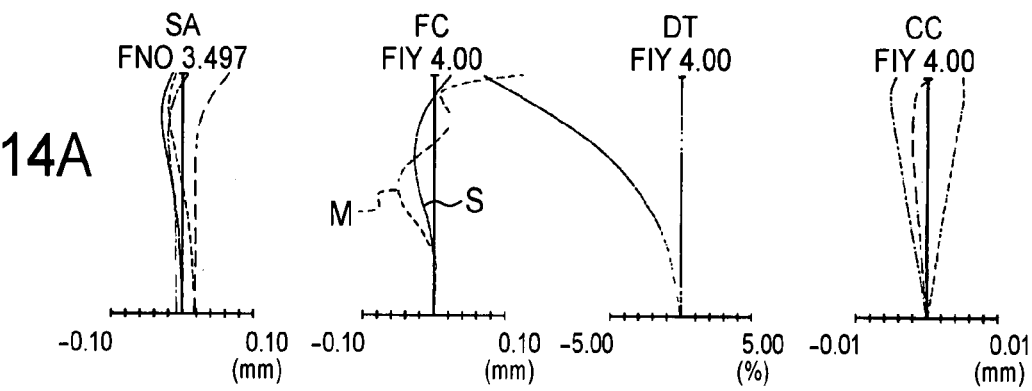
FIGS. 14A to 14C are aberration diagrams showing a spherical aberration (SA), an astigmatism (FC), a distortion (DT) and a chromatic aberration of magnification (CC) of Example 7 when focused on an infinite object.
Figure 14B:
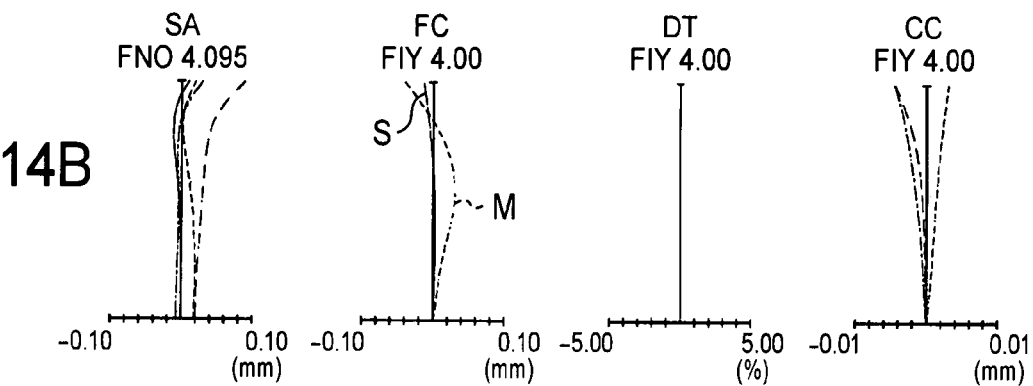
Figure 14C:
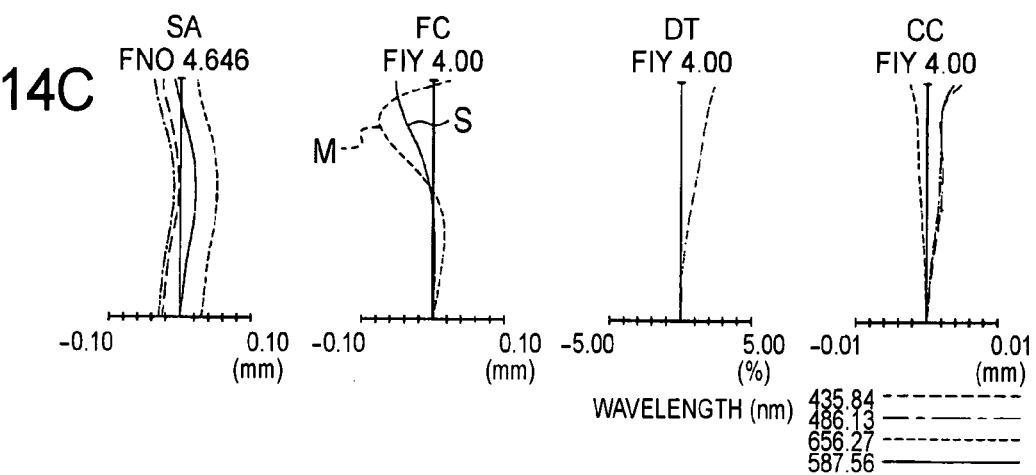

FIGS. 14A to 14C are aberration diagrams showing a spherical aberration (SA), an astigmatism (FC), a distortion (DT) and a chromatic aberration of magnification (CC) of Example 7 when focused on an infinite object, FIG. 14A is a diagram showing the state in the wide-angle end, FIG. 14B is a diagram showing the intermediate position, and FIG. 14C is a diagram showing a state in the telephoto end, respectively. In the drawings, FIY is an image height.

The zoom lens system of Example 7 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1. The second lens unit G2 includes, in order from the object side, a double concave negative lens L2 and a positive lens L3 whose convex surface faces the object side. The third lens unit G3 includes a double convex positive lens L4 and a double concave negative lens L5, and these two lenses L4 and L5 are cemented. The fourth lens unit G4 includes a double convex positive lens L6 and a double concave negative lens L7. The fifth lens unit G5 includes a double convex positive lens L8. Opposite surfaces 1 and 2 of the lens L1, opposite surfaces 3 and 4 of the lens L2, an object-side surface 8 of the lens L4 and an image-side surface 10 of the lens L5 are aspherical surfaces. The parallel flat plate FL1 is a low pass filter coated with an infrared cut coating, and FL2 is a cover glass which protects the light receiving surface of the CCD image sensor.

In the zoom lens system of Example 7, during magnification change from the wide-angle end to the intermediate position, the first lens unit G1 and the second lens unit G2 move toward the image side, but the third lens unit G3, the fourth lens unit G4 and the fifth lens unit G5 move toward the object side. In this case, the lens units move so that a space D2 between the first lens unit G1 and the second lens unit G2, a space D14 between the fourth lens unit G4 and the fifth lens unit G5 and a space D16 between the fifth lens unit G5 and the parallel flat plate FL1 increase but a space D6 between the second lens unit G2 and the third lens unit G3 and a space D10 between the third lens unit G3 and the fourth lens unit G4 decrease, respectively. Moreover, during the magnification change from the intermediate position to the telephoto end, the first lens unit G1 reverses its movement direction between the intermediate position and the telephoto end to move toward the object side. The second lens unit reverses its movement direction between the intermediate position and the telephoto end to move toward the object side. Moreover, the third lens unit G3 and the fourth lens unit G4 move toward the object side. The fifth lens unit G5 further moves toward the image side. In this case, the space D2 between the first lens unit G1 and the second lens unit G2 and the space D14 between the fourth lens unit G4 and the fifth lens unit G5 increase, respectively. However, the space D6 between the second lens unit G2 and the third lens unit G3, the space D10 between the third lens unit G3 and the fourth lens unit G4 and the space D16 between the fifth lens unit G5 and the parallel flat plate FL1 decrease, respectively.

In Example 7, an image height is 4.00 mm, the focal length f is 6.88 to 14.91 to 32.74 mm, and Fno is 3.50 to 4.10 to 4.65.

Numerical Data 7

| Surface number | R | D | Nd | Vd |
|---|---|---|---|---|
| 1 | 16.550* | 3.56 | 1.49700 | 81.54 |
| 2 | −85.794 | D2 | | |
| 3 | −46.004* | 0.90 | 1.88300 | 40.76 |
| 4 | 5.533* | 1.26 | | |
| 5 | 7.789 | 2.10 | 1.92286 | 20.88 |
| 6 | 14.071 | D6 | | |
| 7 | aperture | 0.10 | | |
| 8 | 5.974* | 3.20 | 1.77377 | 47.17 |
| 9 | −8.176 | 0.57 | 1.75520 | 27.51 |
| 10 | 12.214* | D10 | | |
| 11 | 14.897 | 1.33 | 1.90366 | 31.31 |
| 12 | −31.188 | 0.71 | | |
| 13 | −28.745 | 0.51 | 1.92286 | 20.88 |
| 14 | 9.004 | D14 | | |
| 15 | 14.991* | 1.05 | 1.92286 | 20.88 |
| 16 | −88.443 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21 | ∞ (I) | | | |

Aspherical coefficient

| | Surface number | | | |
|---|---|---|---|---|
| | 1 | 3 | 4 | 8 |
| R | 16.550 | −46.004 | 5.533 | 5.974 |
| k | −0.181 | 0.000 | −0.493 | 0.000 |
| A4 | −8.57574e−06 | 1.10987e−05 | 9.91402e−05 | 2.43443e−04 |
| A6 | −7.82249e−08 | −4.91050e−06 | −1.69454e−05 | 1.43998e−05 |
| A8 | 0.000 | 1.60547e−07 | 6.83506e−07 | −7.11208e−07 |
| A10 | 0.000 | −1.66139e−09 | −1.01924e−08 | 2.68891e−08 |

| | Surface number | |
|---|---|---|
| | 10 | 15 |
| R | 12.214 | 14.991 |
| k | −3.524 | 0.492 |
| A4 | 1.99233e−03 | −9.12405e−05 |
| A6 | 6.32258e−05 | 4.85305e−06 |
| A8 | 6.84110e−06 | −1.68891e−07 |
| A10 | −2.47957e−07 | 1.70462e−09 |

Zoom Data

| | WE | ST | TE |
|---|---|---|---|
| f | 6.88 | 14.91 | 32.74 |
| Fno | 3.50 | 4.10 | 4.65 |
| 2ω | 64.53 | 28.60 | 12.96 |
| D2 | 0.89 | 5.18 | 11.53 |
| D6 | 15.23 | 5.44 | 0.83 |
| D10 | 3.19 | 1.75 | 0.84 |
| D14 | 1.54 | 2.81 | 9.36 |
| D16 | 3.68 | 6.98 | 5.21 |

EXAMPLE 8

Figure 15A:
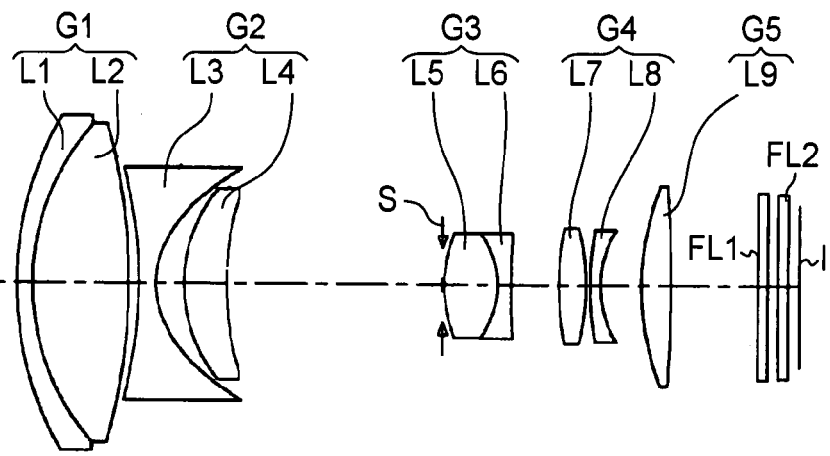
FIGS. 15A to 15C are sectional views of Example 8 of the present invention along an optical axis.
Figure 15B:
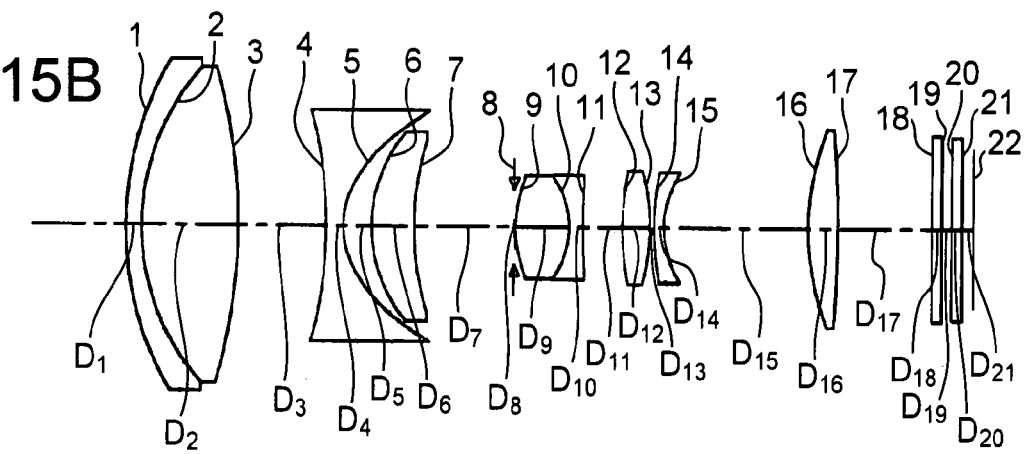
Figure 15C:
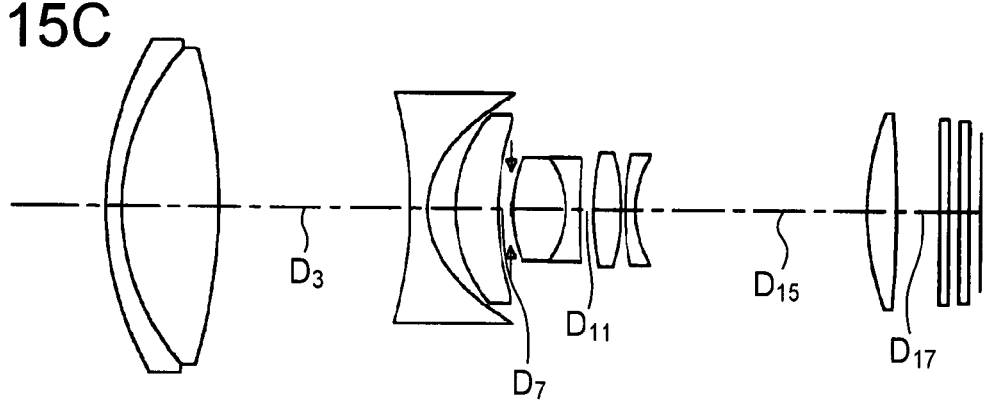

FIGS. 15A to 15C are sectional views of Example 8 of a zoom lens system according to the present invention along an optical axis, FIG. 15A is a diagram showing a state in a wide-angle end, FIG. 15B is a diagram showing an intermediate position, and FIG. 15C is a diagram showing a state in a telephoto end, respectively. A focal length increases in order of FIGS. 15A, 15B and 15C.

Figure 16A:
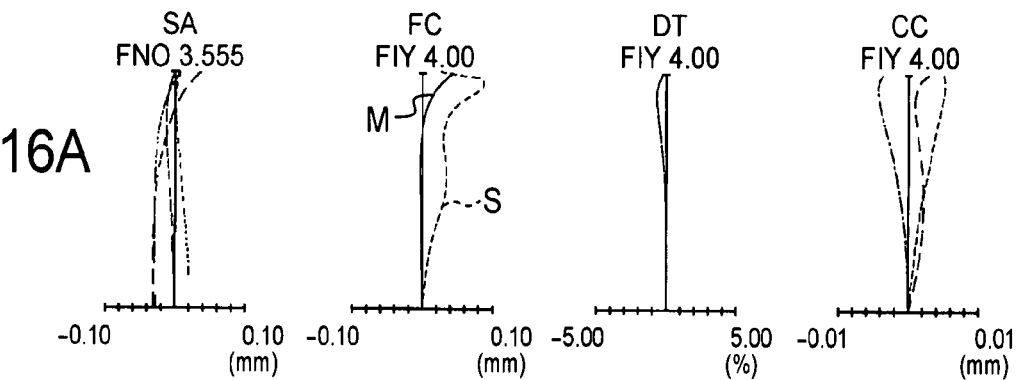
FIGS. 16A to 16C are aberration diagrams showing a spherical aberration (SA), an astigmatism (FC), a distortion (DT) and a chromatic aberration of magnification (CC) of Example 8 when focused on an infinite object.
Figure 16B:
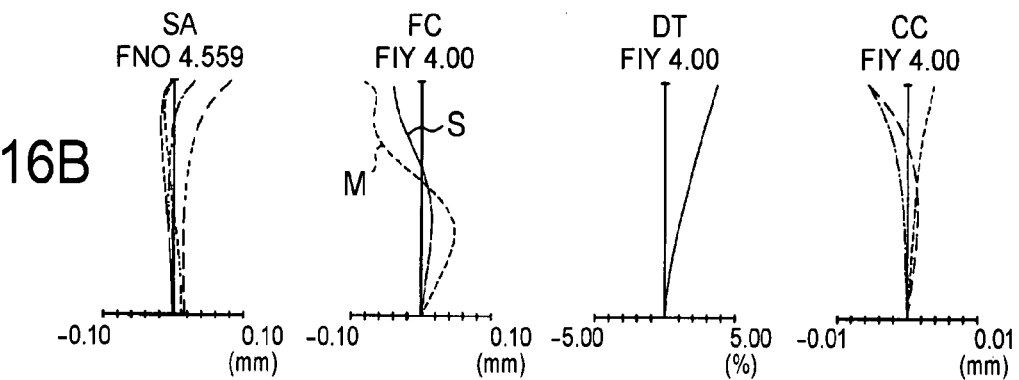
Figure 16C:
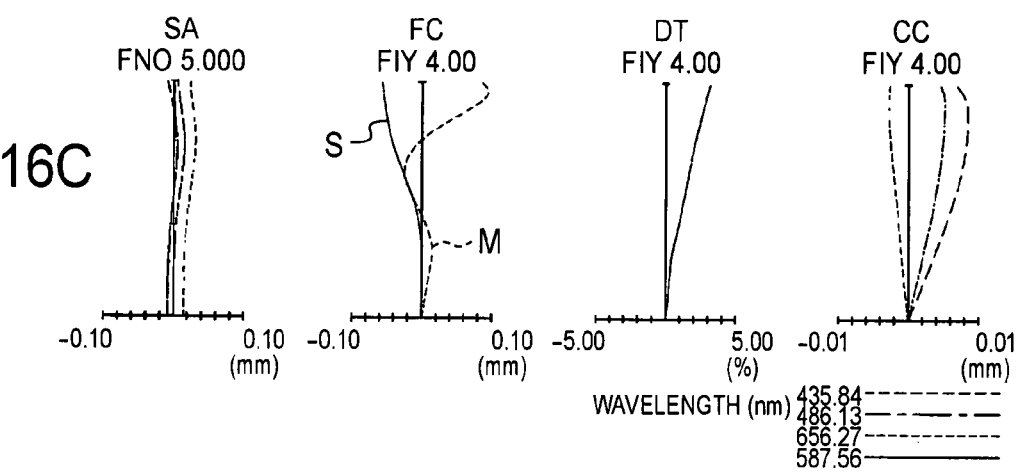

FIGS. 16A to 16C are aberration diagrams showing a spherical aberration (SA), an astigmatism (FC), a distortion (DT) and a chromatic aberration of magnification (CC) of Example 8 when focused on an infinite object, FIG. 16A is a diagram showing the state in the wide-angle end, FIG. 16B is a diagram showing the intermediate position, and FIG. 16C is a diagram showing a state in the telephoto end, respectively. In the drawings, FIY is an image height.

The zoom lens system of Example 8 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a negative meniscus lens L1 whose convex surface faces the object side and a double convex positive lens L2, and the two lenses L1 and L2 are cemented. The second lens unit G2 includes, in order from the object side, a double concave negative lens L3 and a positive meniscus lens L4 whose convex surface faces the object side. The third lens unit G3 includes a double convex positive lens L5 and a double concave negative lens L6, and these two lenses L5 and L6 are cemented. The fourth lens unit G4 includes a double convex positive lens L7 and a negative meniscus lens L8 whose convex surface faces the object side. The fifth lens unit G5 includes a double convex positive lens L9. An image-side surface 3 of the lens L2, an image-side surface 5 of the lens L3, an object-side surface 9 of the lens L5, an image-side surface 11 of the lens L6 and an object-side surface 16 of the lens L9 are aspherical surfaces. The parallel flat plate FL1 is a low pass filter coated with an infrared cut coating, and FL2 is a cover glass which protects the light receiving surface of the CCD image sensor.

In the zoom lens system of Example 8, during magnification change from the wide-angle end to the intermediate position, the first lens unit G1, the second lens unit G2, the third lens unit G3, the fourth lens unit G4 and the fifth lens unit G5 move toward the object side. In this case, the lens units move so as to enlarge a space D3 between the first lens unit G1 and the second lens unit G2, a space D15 between the fourth lens unit G4 and the fifth lens unit G5 and a space D17 between the fifth lens unit G5 and the parallel flat plate FL1. A space D7 between the second lens unit G2 and the third lens unit G3 and a space D11 between the third lens unit G3 and the fourth lens unit G4 shorten. Moreover, during the magnification change from the intermediate position to the telephoto end, the first lens unit G1, the third lens unit G3 and the fourth lens unit G4 move toward the object side. The second lens unit G2 and the fifth lens unit G5 reverse movement directions between the intermediate position and the telephoto end to move toward the image side. In this case, the space D3 between the first lens unit G1 and the second lens unit G2 and the space D15 between the fourth lens unit G4 and the fifth lens unit G5 enlarge, respectively. On the other hand, the space D7 between the second lens unit G2 and the third lens unit G3, the space D11 between the third lens unit G3 and the fourth lens unit G4 and the space D17 between the fifth lens unit G5 and the parallel flat plate FL1 shorten, respectively.

In Example 8, an image height is 4.00 mm, the focal length f is 6.72 to 14.95 to 33.14 mm, and Fno is 3.56 to 4.56 to 5.00.

| Numerical Data 8 | | | | |
|---|---|---|---|---|
| Surface number | R | D | Nd | Vd |
| 1 | 17.033 | 0.80 | 1.68893 | 31.16 |
| 2 | 11.916 | 4.87 | 1.49700 | 81.54 |
| 3 | −24.715* | D3 | | |
| 4 | −23.678 | 0.90 | 1.80610 | 40.92 |
| 5 | 4.332* | 1.44 | | |
| 6 | 7.263 | 2.15 | 1.92286 | 18.90 |
| 7 | 14.483 | D7 | | |
| 8 | aperture | 0.10 | | |
| 9 | 7.741* | 2.70 | 1.73530 | 45.54 |
| 10 | −4.396 | 0.70 | 1.70238 | 31.30 |
| 11 | 78.480* | D11 | | |
| 12 | 16.698 | 1.40 | 1.71400 | 46.56 |
| 13 | −12.452 | 0.20 | | |
| 14 | 17.167 | 0.50 | 1.90366 | 31.31 |
| 15 | 4.913 | D15 | | |
| 16 | 15.196* | 1.50 | 1.71391 | 47.42 |
| 17 | −94.286 | D17 | | |
| 18 | ∞ | 0.50 | 1.54771 | 62.84 |
| 19 | ∞ | 0.50 | | |
| 20 | ∞ | 0.50 | 1.51633 | 64.14 |
| 21 | ∞ | 0.60 | | |
| 22 | ∞ (I) | | | |

| Aspherical coefficient | | | | |
|---|---|---|---|---|
| | | Surface number | | |
| | 3 | 5 | 9 | 11 | 16 |
| R | −24.715 | 4.332 | 7.741 | 11 78.480 | 15.196 |

-continued

Numerical Data 8

| k | −11.239 | −0.768 | −0.006 | −21.383 | −31.633 |
|---|---|---|---|---|---|
| A4 | −2.47152e−06 | 1.19790e−04 | 1.44294e−04 | 1.34959e−03 | 1.06613e−03 |
| A6 | 3.12834e−07 | 6.25969e−06 | −2.03803e−06 | 3.07904e−05 | −2.41200e−05 |
| A8 | −5.41204e−09 | −9.37257e−07 | 2.01781e−06 | 0.000 | 3.76819e−07 |
| A10 | 3.70244e−11 | 2.06363e−08 | −3.15090e−07 | 0.000 | 0.000 |

Zoom Data

| | WE | ST | TE |
|---|---|---|---|
| f | 6.72 | 14.95 | 33.14 |
| Fno | 3.56 | 4.56 | 5.00 |
| 2ω | 59.28 | 27.60 | 12.71 |
| D3 | 0.50 | 4.54 | 9.73 |
| D7 | 11.05 | 5.13 | 0.70 |
| D11 | 2.45 | 2.01 | 0.70 |
| D15 | 2.10 | 7.43 | 11.81 |
| D17 | 4.50 | 4.78 | 2.19 |

EXAMPLE 9

Figure 17A:
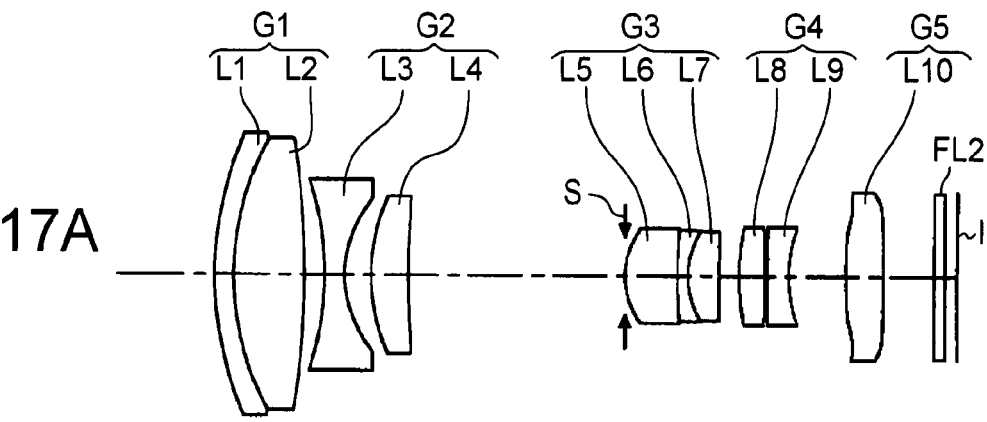
FIGS. 17A to 17C are sectional views of Example 9 of the present invention along an optical axis.
Figure 17B:
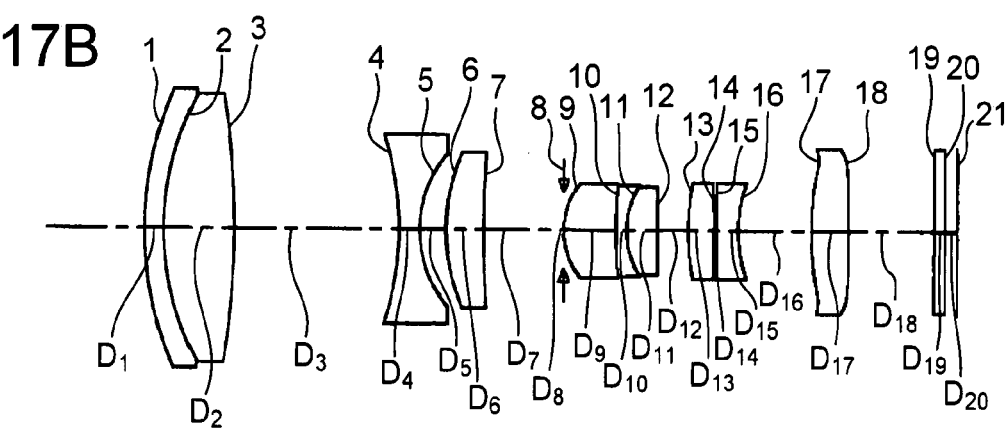
Figure 17C:
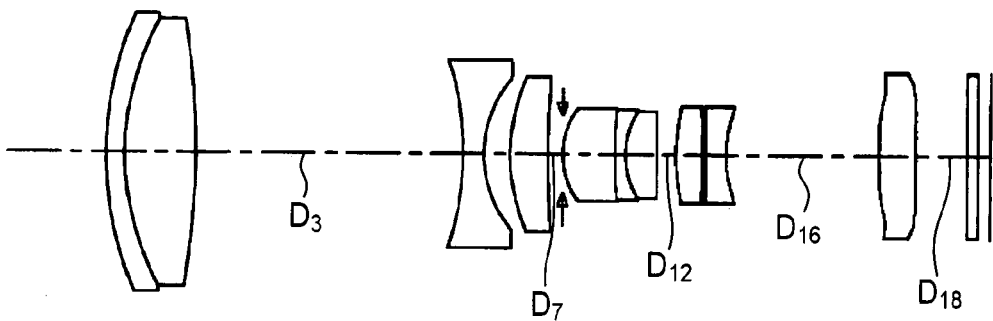

FIGS. 17A to 17C are sectional views of Example 9 of a zoom lens system according to the present invention along an optical axis, FIG. 17A is a diagram showing a state in a wide-angle end, FIG. 17B is a diagram showing an intermediate position, and FIG. 17C is a diagram showing a state in a telephoto end. A focal length increases in order of FIGS. 17A, 17B and 17C.

Figure 18A:
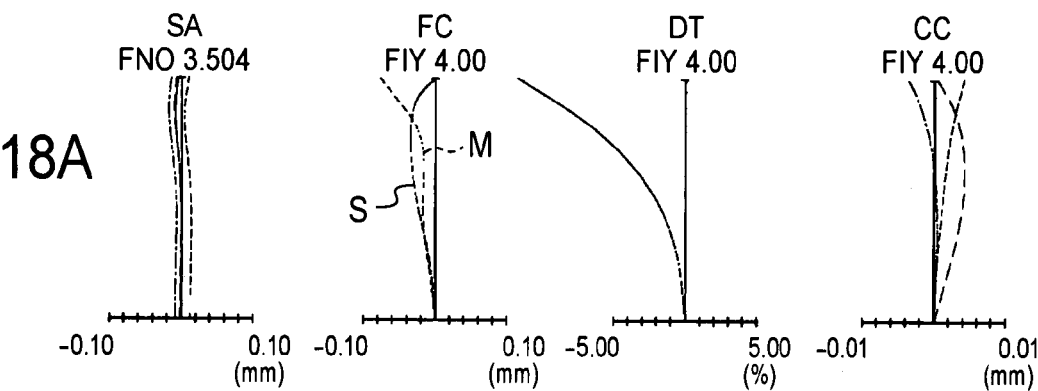
FIGS. 18A to 18C are aberration diagrams showing a spherical aberration (SA), an astigmatism (FC), a distortion (DT) and a chromatic aberration of magnification (CC) of Example 9 when focused on an infinite object.
Figure 18B:
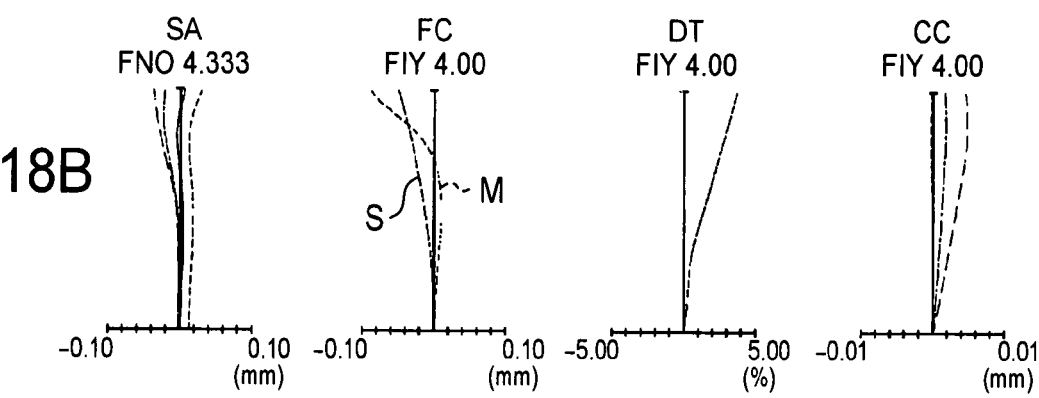
Figure 18C:
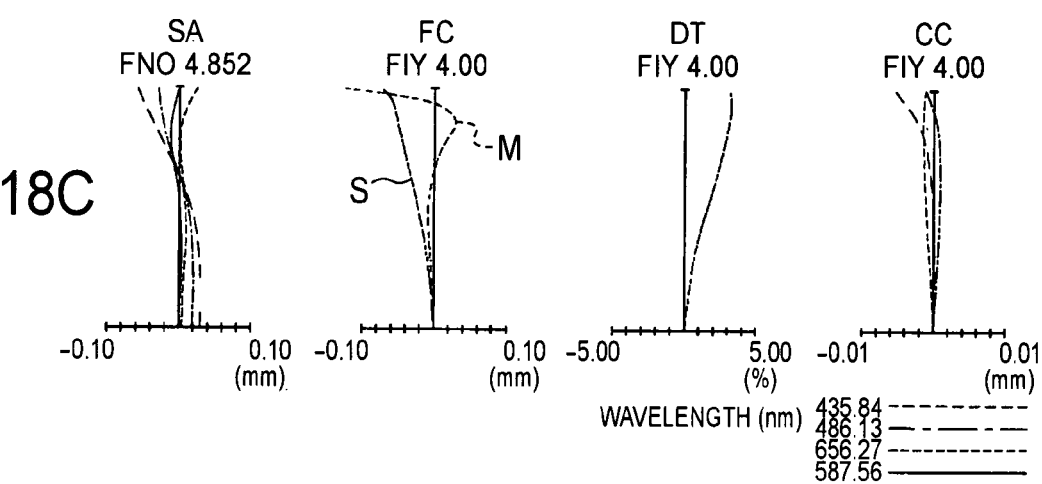

FIGS. 18A to 18C are aberration diagrams showing a spherical aberration (SA), an astigmatism (FC), a distortion (DT) and a chromatic aberration of magnification (CC) of Example 9 when focused on an infinite object, FIG. 18A is a diagram showing the state in the wide-angle end, FIG. 18B is a diagram showing the intermediate position, and FIG. 18C is a diagram showing a state in the telephoto end, respectively. In the drawings, FIY is an image height.

The zoom lens system of Example 9 includes, in order from an object side, a positive first lens unit G1, a negative second lens unit G2, an aperture stop S, a positive third lens unit G3, a negative fourth lens unit G4 and a positive fifth lens unit G5. A parallel flat plate FL2 is disposed on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a negative meniscus lens L1 whose convex surface faces the object side and a double convex positive lens L2, and the two lenses L1 and L2 are cemented. The second lens unit G2 includes, in order from the object side, a double concave negative lens L3 and a positive meniscus lens L4 whose convex surface faces the object side. The third lens unit G3 includes a positive meniscus lens L5 whose convex surface faces the object side, a negative meniscus lens L6 whose convex surface faces the object side and a positive meniscus lens L7 whose convex surface faces the object side, and these three meniscus lenses L5, L6 and L7 are cemented. The fourth lens unit G4 includes a double convex positive lens L8 and a negative meniscus lens L9 whose convex surface faces the object side. The fifth lens unit G5 includes a double convex positive lens L10. The image-side surface 4 of the lens L2 and opposite surfaces 4 and 5 of the lens L3, an object-side surface 9 of the lens L5, an image-side surface 12 of the lens L7 and opposite surfaces 17 and 18 of the lens L10 are aspherical surfaces. The parallel flat plate FL2 is a cover glass which protects the light receiving surface of the CCD image sensor, but may be a low pass filter coated with an infrared cut coating.

In the zoom lens system of Example 9, during magnification change from the wide-angle end to the intermediate position, the first lens unit G1, the third lens unit G3, the fourth lens unit G4 and the fifth lens unit G5 move toward the object side, and the second lens unit G2 moves toward the image side. In this case, a space D3 between the first lens unit G1 and the second lens unit G2, a space D12 between the third lens unit G3 and the fourth lens unit G4, a space D16 between the fourth lens unit G4 and the fifth lens unit G5 and a space D18 between the fifth lens unit G5 and the parallel flat plate FL2 enlarge, respectively. A space D7 between the second lens unit G2 and the third lens unit G3 shortens. Moreover, during the magnification change from the intermediate position to the telephoto end, the first lens unit G1, the third lens unit G3 and the fourth lens unit G4 move toward the object side, but the second lens unit G2 moves toward the image side. The fifth lens unit G5 reverses its movement direction between the intermediate position and the telephoto end to move toward the image side. In this case, the space D3 between the first lens unit G1 and the second lens unit G2 and the space D16 between the fourth lens unit G4 and the fifth lens unit G5 enlarge, respectively. On the other hand, the space D7 between the second lens unit G2 and the third lens unit G3, the space D12 between the third lens unit G3 and the fourth lens unit G4 and the space D18 between the fifth lens unit G5 and the parallel flat plate FL2 shorten, respectively.

In Example 9, an image height is 4.00 mm, the focal length f is 6.57 to 16.41 to 32.07 mm, and Fno is 3.50 to 4.33 to 4.85.

Numerical Data 9

| Surface number | R | D | Nd | Vd |
|---|---|---|---|---|
| 1 | 17.251 | 0.90 | 1.84666 | 23.78 |
| 2 | 13.327 | 3.40 | 1.49700 | 81.54 |
| 3 | −42.643* | D3 | | |
| 4 | −13.115* | 1.00 | 1.80610 | 40.92 |
| 5 | 4.791* | 1.28 | | |
| 6 | 9.519 | 1.80 | 1.92286 | 18.90 |
| 7 | 38.948 | D7 | | |
| 8 | aperture | 0.00 | | |

-continued

Numerical Data 9

| | | | | |
|---|---|---|---|---|
| 9 | 3.888* | 2.53 | 1.52943 | 62.18 |
| 10 | 39.080 | 0.50 | 1.72652 | 33.34 |
| 11 | 3.988 | 1.50 | 1.58913 | 61.14 |
| 12 | −57.212* | D12 | | |
| 13 | 11.996 | 1.30 | 1.56383 | 63.30 |
| 14 | −35.562 | 0.12 | | |
| 15 | 357.078 | 1.00 | 1.74320 | 49.34 |
| 16 | 6.248 | D16 | | |
| 17 | 14.131* | 1.80 | 1.49960 | 69.10 |
| 18 | 137.309* | D18 | | |
| 19 | ∞ | 0.50 | 1.51633 | 64.14 |
| 20 | ∞ | 0.60 | | |
| 21 | ∞ (I) | | | |

Aspherical coefficient

| | Surface number | | | |
|---|---|---|---|---|
| | 3 | 4 | 5 | 9 |
| R | −42.643 | −13.115 | 4.791 | 3.888 |
| k | −13.953 | −0.282 | −0.153 | 0.000 |
| A4 | 2.22040e−06 | 5.79412e−05 | −1.17492e−03 | −6.15530e−04 |
| A6 | 2.13142e−07 | 1.21102e−05 | −3.86799e−06 | 9.89360e−06 |
| A8 | −5.00555e−09 | −3.16947e−07 | −7.53741e−08 | −2.55834e−06 |
| A10 | 4.34307e−11 | 3.45495e−09 | −3.29813e−08 | 1.12022e−07 |

| | Surface number | | |
|---|---|---|---|
| | 12 | 17 | 18 |
| R | −57.212 | 14.131 | 137.309 |
| k | 0.000 | −5.509 | 0.000 |
| A4 | 3.36988e−03 | −4.86005e−04 | −8.04617e−04 |
| A6 | 2.09567e−04 | 2.05791e−06 | −4.65109e−05 |
| A8 | 1.80226e−05 | 6.81933e−08 | 1.78265e−06 |
| A10 | 3.39632e−06 | −1.63046e−07 | −1.49862e−07 |

Zoom Data

| | WE | ST | TE |
|---|---|---|---|
| f | 6.57 | 16.41 | 32.07 |
| Fno | 3.50 | 4.33 | 4.85 |
| 2ω | 65.59 | 25.23 | 13.09 |
| D3 | 1.00 | 8.04 | 13.09 |
| D7 | 10.59 | 3.97 | 0.70 |
| D12 | 1.00 | 1.52 | 1.00 |
| D16 | 2.80 | 3.62 | 7.45 |
| D18 | 2.50 | 4.16 | 2.50 |

EXAMPLE 10

Figure 19A:
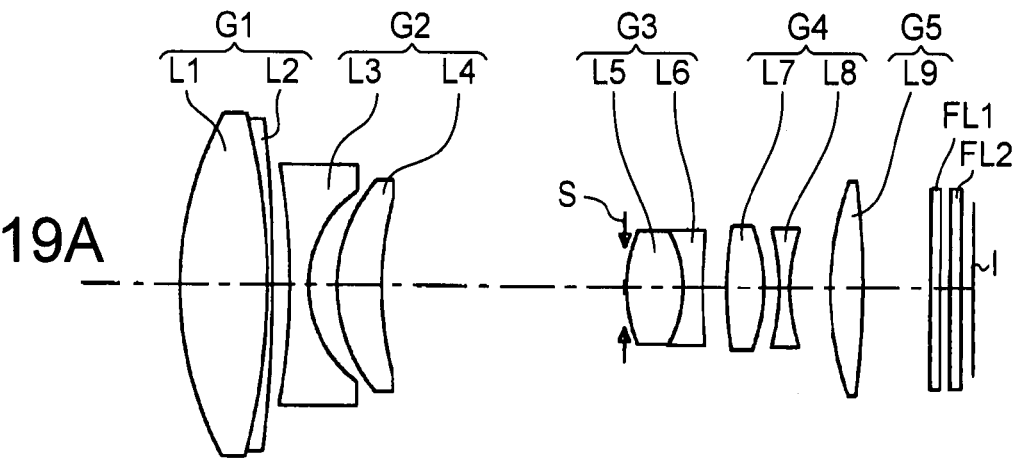
FIGS. 19A to 19C are sectional views of Example 10 of the present invention along an optical axis.
Figure 19B:
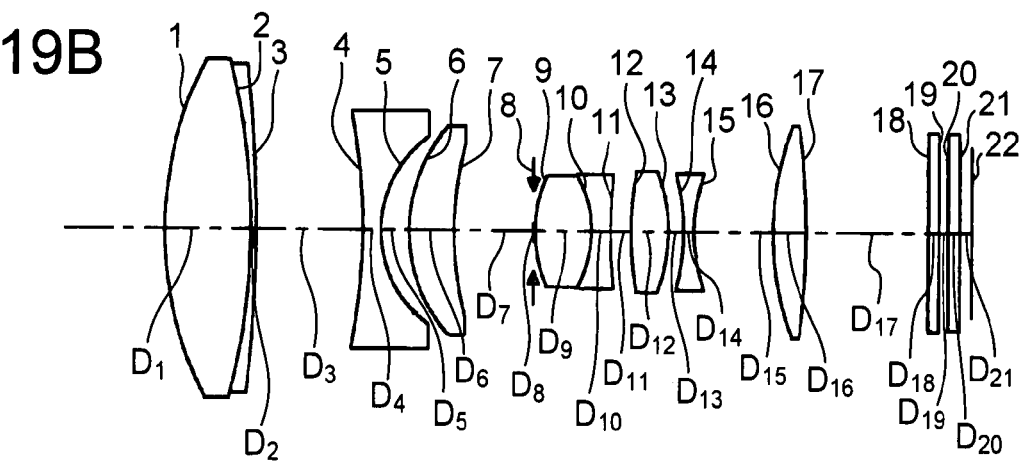
Figure 19C:
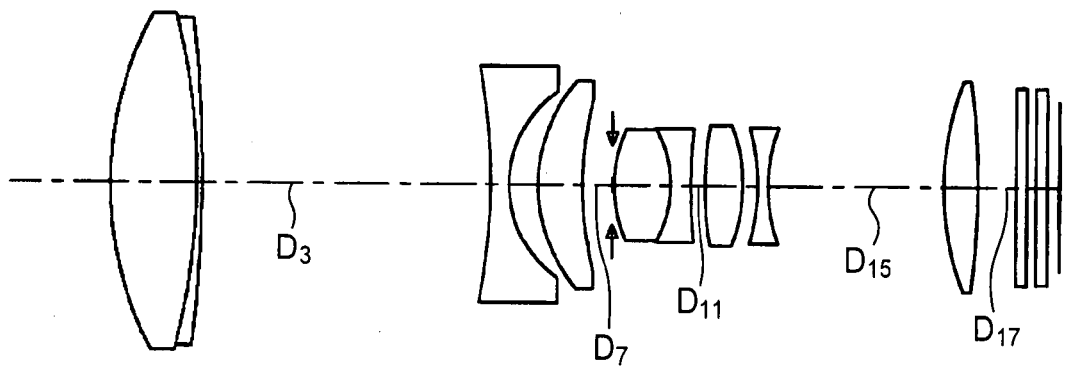

FIGS. 19A to 19C are sectional views of Example 10 of a zoom lens system according to the present invention along an optical axis, FIG. 19A is a diagram showing a state in a wide-angle end, FIG. 19B is a diagram showing an intermediate position, and FIG. 19C is a diagram showing a state in a telephoto end, respectively. A focal length increases in order of FIGS. 19A, 19B and 19C.

Figure 20A:
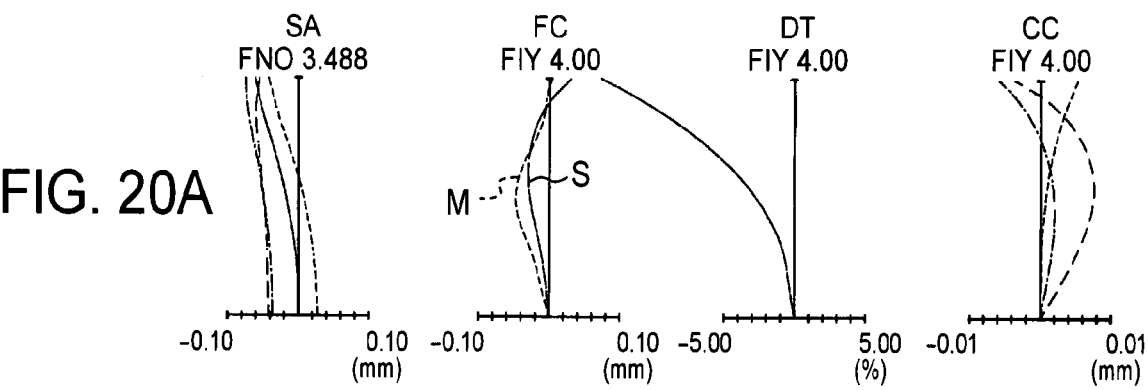
FIGS. 20A to 20C are aberration diagrams showing a spherical aberration (SA), an astigmatism (FC), a distortion (DT) and a chromatic aberration of magnification (CC) of Example 10 when focused on an infinite object.
Figure 20B:
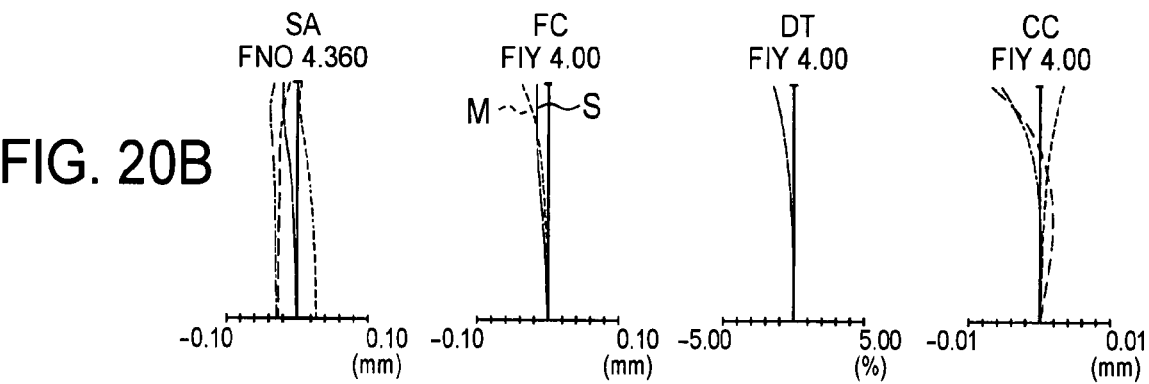
Figure 20C:
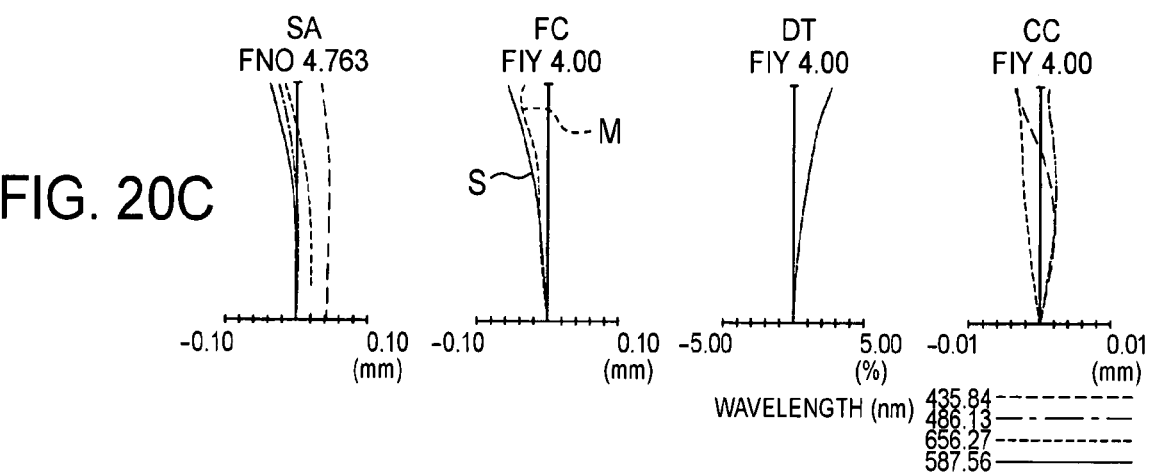

FIGS. 20A to 20C are aberration diagrams showing a spherical aberration (SA), an astigmatism (FC), a distortion (DT) and a chromatic aberration of magnification (CC) of Example 10 when focused on an infinite object, FIG. 20A is a diagram showing the state in the wide-angle end, FIG. 20B is a diagram showing the intermediate position, and FIG. 20C is a diagram showing a state in the telephoto end. In the drawings, FIY is an image height.

The zoom lens system of Example 10 includes, in order from an object side, a positive first lens unit G1, a negative second lens unit G2, an aperture stop S, a positive third lens unit G3, a negative fourth lens unit G4 and a positive fifth lens unit G5. Parallel flat plates FL1, FL2 are arranged on an image side of the fifth lens unit G5. In the drawings, I is an image surface. When this zoom lens system is used in combination with a CCD image sensor, a light receiving surface of the CCD image sensor is disposed in a position denoted with I.

The first lens unit G1 is constituted of a double convex positive lens L1 and a negative meniscus lens L2 whose concave surface faces the object side, and the two lenses L1 and L2 are cemented. The second lens unit G2 includes, in order from the object side, a double concave negative lens L3 and a positive meniscus lens L4 whose convex surface faces the object side. The third lens unit G3 includes a double convex positive lens L5 and a double concave negative lens L6, and these two lenses L5 and L6 are cemented. The fourth lens unit G4 includes a double convex positive lens L7 and a double concave negative lens L8. The fifth lens unit G5 includes a double convex positive lens L9. An object-side surface 1 of the lens L1, an image-side surface 3 of the lens L2, an image-side surface 5 of the lens L3, an object-side surface 9 of the lens L5, an image-side surface 11 of the lens L6 and an object-side surface 16 of the lens L9 are aspherical surfaces. The parallel flat plate FL1 is a low pass filter coated with an infrared cut coating, and FL2 is a cover glass which protects the light receiving surface of the CCD image sensor.

In the zoom lens system of Example 10, during magnification change from the wide-angle end to the intermediate position, the first lens unit G1, the third lens unit G3, the fourth lens unit G4 and the fifth lens unit G5 move toward the object side, but the second lens unit G2 moves toward the image side. In this case, the lens units move so that a space D2 between the first lens unit G1 and the second lens unit G2, a space D15 between the fourth lens unit G4 and the fifth lens unit G5 and a space D17 between the fifth lens unit G5 and the parallel flat plate FL1 enlarge, respectively, but a space D7 between the second lens unit G2 and the third lens unit G3 and a space D11 between the third lens unit G3 and the fourth lens unit G4 shorten, respectively. Moreover, during the magnification change from the intermediate position to the telephoto end, the first lens unit G1, the third lens unit G3 and the fourth lens unit G4 move toward the object side, but the second lens unit G2 further moves toward the image side. The fifth lens unit G5 reverses its movement direction between the intermediate position and the telephoto end to move toward the image side. In this case, the space D2 between the first lens unit G1 and the second lens unit G2 and the space D15 between the fourth lens unit G4 and the fifth lens unit G5 enlarge, respectively. On the other hand, the space D7 between the second lens unit G2 and the third lens unit G3, the space D11 between the third lens unit G3 and the fourth lens unit G4 and the space D17 between the fifth lens unit G5 and the parallel flat plate FL1 shorten, respectively.

In Example 10, an image height is 4.00 mm, the focal length f is 6.80 to 14.91 to 32.66 mm, and Fno is 3.49 to 4.36 to 4.76.

Numerical Data 10

| Surface number | R | D | Nd | Vd |
|---|---|---|---|---|
| 1 | 16.179* | 4.11 | 1.49700 | 81.54 |
| 2 | −34.040 | 0.20 | 1.63545 | 22.92 |

-continued

Numerical Data 10

| | | | | |
|---|---|---|---|---|
| 3 | −95.646* | D3 | | |
| 4 | −33.310 | 0.90 | 1.80610 | 40.92 |
| 5 | 4.647* | 1.32 | | |
| 6 | 7.649 | 2.09 | 1.92286 | 18.90 |
| 7 | 16.056 | D7 | | |
| 8 | aperture | 0.10 | | |
| 9 | 7.188* | 2.70 | 1.77377 | 47.17 |
| 10 | −5.392 | 0.91 | 1.68893 | 31.16 |
| 11 | 54.673* | D11 | | |
| 12 | 17.950 | 1.74 | 1.69680 | 55.53 |
| 13 | −8.845 | 0.72 | | |
| 14 | −10.921 | 0.50 | 1.90366 | 31.31 |
| 15 | 7.234 | D15 | | |
| 16 | 14.599* | 1.59 | 1.81474 | 37.03 |
| 17 | −40.314 | D17 | | |
| 18 | ∞ | 0.50 | 1.54771 | 62.84 |
| 19 | ∞ | 0.50 | | |
| 20 | ∞ | 0.50 | 1.51633 | 64.14 |
| 21 | ∞ | 0.60 | | |
| 22 | ∞ (I) | | | |

Aspherical coefficient

| | Surface number | | | |
|---|---|---|---|---|
| | 1 | 3 | 5 | 9 |
| R | 16.179 | −95.646 | 4.647 | 7.188 |
| k | −0.826 | 1.784 | −0.334 | 0.000 |
| A4 | 1.03379e−05 | −2.77315e−07 | −3.38011e−04 | −2.95167e−06 |
| A6 | −2.01239e−07 | −2.94961e−07 | −9.96792e−06 | 6.99688e−06 |
| A8 | 0.000 | 2.43473e−09 | 4.76829e−08 | −6.48133e−07 |
| A10 | 0.000 | −8.22779e−12 | −2.34761e−08 | −6.22402e−08 |

| | Surface number | |
|---|---|---|
| | 11 | 16 |
| R | 54.673 | 14.599 |
| k | −324.760 | 1.713 |
| A4 | 1.60885e−03 | −9.38455e−05 |
| A6 | 3.65148e−05 | 4.42581e−06 |
| A8 | 0.000 | −1.51586e−07 |
| A10 | 0.000 | 0.000 |

Zoom Data

| | WE | ST | TE |
|---|---|---|---|
| f | 6.80 | 14.91 | 32.66 |
| Fno | 3.49 | 4.36 | 4.76 |
| 2ω | 64.96 | 28.94 | 12.97 |
| D3 | 0.88 | 5.17 | 13.64 |
| D7 | 11.55 | 3.72 | 1.44 |
| D11 | 1.18 | 0.96 | 0.73 |
| D15 | 1.95 | 3.81 | 8.34 |
| D17 | 3.17 | 5.83 | 1.86 |

In a case where the zoom lens systems of Examples 1 to 10 are used as, for example, a photographing lens of an image pickup apparatus including an electronic image sensor, when generation of a distortion is permitted in the zoom lens system, a height of an incident ray upon the surface closest to an object side lowers for an angle of field. Therefore, an outer diameter of a lens positioned closest to the object side can be reduced.

Therefore, it is possible to intentionally generate a barrel type distortion in the zoom lens system, to correct the distortion by use of a function of processing image data obtained by picking up, with the electronic image sensor, an image formed through the zoom lens system in order to deform the image, and to observe an image of an object in which the distortion due to the zoom lens system is eliminated.

Especially, it is preferable that an electronic image pickup apparatus such as a camera is provided with an image processing section which electrically processes the image data picked up by the electronic image sensor to deform the image. The already corrected image data is output from the electronic image pickup apparatus. If the image data obtained by correcting the distortion in the image processing section can be output, a satisfactory image can be obtained using even a printer or a display that does not have any image processing section to electrically process the data and deform the image.

It is to be noted that it is preferable that the optical system satisfies the following condition concerning the distortion of the zoom lens system when focused on an infinite object:

$$0.75 < y_{07}/(fw \cdot \tan \omega_{07w}) < 0.96 \tag{24},$$

in which fw is a focal length of the zoom lens system in a wide-angle end, $y_{07}=0.7y_{10}$, $y_{10}$ is a distance from the center of an effective image pickup region (a region where the image can be picked up) of an image pickup surface of the electronic image sensor to the farthest point, that is, the maximum image height, and $\omega_{07w}$ is an incident angle of field (an angle with respect to an optical axis of a chief ray which enters the zoom lens system from an object side) of the chief ray upon the zoom lens system, the chief ray corresponding to an image point which is apart from the center of the effective image pickup region by $y_{07}$ in the wide-angle end. More specifically, as shown in FIG. 34, $\omega_{07w}$ is an angle formed by the chief ray CR passing through the position of the image height $y_{07}$ and the optical axis on the object side. This angle is defined as a half angle of view of an object with respect to the image height $y_{07}$.

When $y_{07}/(fw \cdot \tan \omega_{07w})$ is not above an upper limit of the above condition and the distortion is appropriately generated, an image can be taken over a broad view field angle while maintaining the miniaturization of the optical system.

In a case where the image distortion due to the distortion generated in the optical system is corrected by image processing, when a magnification in a radial direction excessively increases in a peripheral portion of the image, sharpness of the image in the peripheral portion thereof conspicuously deteriorates.

Therefore, it is preferable that $y_{07}/(fw \cdot \tan \omega_{07w})$ is not below a lower limit of the above condition and that the magnification of the image in the peripheral portion is prevented from being excessively enlarged. This is effective in achieving inconspicuous deterioration of the sharpness in the peripheral portion of the image.

It is to be noted that it is further preferable to satisfy the following condition:

$$0.880 < y_{07}/(fw \cdot \tan \omega_{07w}) < 0.960 \tag{24'}.$$

Furthermore, it is most preferable to satisfy the following condition:

$$0.910 < y_{07}/(fw \cdot \tan \omega_{07w}) < 0.950 \tag{24''}.$$

As described above, the distortion is intentionally generated in the optical system beforehand. After the photographing, the image can electrically be processed to correct the image distortion. Here, the electric correction of the distortion will be described.

For example, as shown in FIG. 33, assuming that a circle having a radius R (image height R) is on the image pickup surface whose center is at the intersection of the optical axis Lc and the image pickup surface and which is tangent to the long sides of the effective image pickup region (a region on the image pickup surface where the image pickup is possible). The magnification at each point on the circumference of the circle is fixed and the each point is regarded as a reference of the correction. Each point on the circumference of another circle having an arbitrary radius r (ω) (image height r (ω)) is moved in a substantially radial direction, and moved concentrically so as to obtain a radius r' (ω), thereby correcting the distortion of the optical image. For example, as shown in FIG. 33, a point P1 on a circumference of an arbitrary circle positioned inwardly from a circle having a radius R and having a radius r1(ω) is moved to a point P2 of a circumference of a circle to be corrected, having a radius r1'(ω), toward the center of the circle. A point $Q_1$ on a circumference of an arbitrary circle positioned externally from the circle having the radius R and having a radius r2(ω) is moved to a point $Q_2$ of a circumference of a circle having a radius r2'(ω) in a direction away from the center of the circle. Here, r'(ω) can be represented by the following:

$$r'(\omega) = \alpha \cdot f \cdot \tan \omega (0 \leq \alpha \leq 1),$$

in which f is a focal length of an image forming optical system (the zoom lens system), and ω is a half angle of view of the object.

Here, assuming that an ideal image height of the point on the circumference of the circle having the radius R (image height R) is Y, the following results:

$$\alpha = R/Y = R/(f \cdot \tan \omega).$$

The optical system is ideally rotation-symmetric with respect to the optical axis. Therefore, the distortion is also generated in a rotation symmetric manner with respect to the optical axis. Therefore, the image distortion due to optically generated distortion can be electrically corrected by fixing the magnification of the circumference of the circle having the radius R and inscribed along the long side of the effective image pickup region (the region of the image pickup surface where the image can be picked up) centering on a point corresponding to the intersection between the optical axis and the image pickup surface in an image to be reproduced and concentrically moving each point of the circumference of another circle having a radius r(ω) to a position of the radius r'(ω) substantially in the radial direction as described above. This method is considered to be advantageous in a data amount and a calculation amount.

However, when the optical image is picked up by the electronic image sensor, the image is no longer indicated with a continuous amount due to the sampling by the pixels of the image sensor. Therefore, the circle having the radius R virtually drawn on the optical image is not strictly a correct circle as long as pixels are not radially arranged on the image pickup surface of the electronic image sensor. That is, in the shape correction of an image given as a set of data obtained from discrete coordinate points (pixels of the electronic image sensor), any circle on which the magnification can be fixed as described above does not exist. Therefore, it is preferable to use a method of determining the coordinate (Xi', Yj') of the position for each pixel (which is at a point of coordinate (Xi, Yj)) to which the pixel is to be moved for shape correction. It is to be noted that when a plurality of pixels move to one coordinate (Xi', Yj') position, an average value of data of the plurality of pixels is taken. With respect to a position where there is not any moved pixel, interpolation is performed using data values of several peripheral pixels having data because the pixels have been moved. In consequence, the data of the position is prepared.

In the electronic image pickup apparatus which performs such a correction, in order to calculate a correction amount r'(ω)−r(ω), data indicating a relation between r(ω), that is, the half angle of view of the object and the image height, or a relation between an actual image height r and an ideal image height (r'/α) is recorded in a recording medium incorporated in the electronic image pickup apparatus.

It is to be noted that the correction of the distortion with respect to one image has been described above. However, in the zoom lens system, the focal length changes, and a state of the distortion included in the image changes with the change of the focal length. Therefore, the focal length range between the maximum value (telephoto end) and the minimum value (wide-angle end) of the focal length where the distortion needs to be corrected is divided into several focal length zones to correct the distortion. For example, a correction amount is set so as to obtain a correction result which substantially satisfies the equation r'(ω)=α·f·tan ω in the vicinity of the telephoto end (the position where the focal length is maximum in each zone) of each divided focal length zone, and the distortion of the image in the zone can be corrected using this correction amount. However, in this case, in the wide-angle end (the position where the focal length is minimum in each zone) in each divided focal length zone, a certain degree of barrel type distortion remains in the obtained image. To avoid this, when the number of the divided zones is increased, the amount of the data to be recorded in the recording medium for the correction increases. To solve the problem, one or several coefficients are calculated beforehand which correspond to one or several focal lengths excluding the telephoto end and the wide-angle end of each divided focal length zone. This coefficient may be determined based on simulation or measurement using an actual image pickup apparatus. Moreover, the correction amount is calculated so as to obtain the correction result which substantially satisfies the equation r'(ω)=α·f·tan ω in the vicinity of the telephoto end of each divided zone, and this correction amount may be multiplied by the coefficient for each focal length to determine the correction amount of the image obtained in that focal length state.

If there is not any distortion in the optical image of the infinite object, the following results:

$$f = y/\tan \omega,$$

in which y is a height (an image height) of an image point from the optical axis, f is a focal length of the image forming optical system (here, the zoom lens system) and ω is a half angle of view of the object.

When there is a barrel type distortion in the image forming optical system, the following results:

$$f > y/\tan \omega.$$

That is, when the focal length f of the image forming optical system, and the image height y are constant, the value of ω increases.

As described above, the distortion is intentionally generated beforehand in the optical system, and the electronic image pickup apparatus electrically processes the image after the image pickup to correct the image distortion. This constitution realizes the miniaturization of the optical system, broadens the angle of field and increases a zoom ratio. Therefore, it is important to select the optical system so that a size of the optical system itself is not useless.

It is to be noted that when the system is constituted so as to simultaneously satisfy the above conditions of the inventions, the system can favorably be miniaturized, an optical performance can be secured, and the high zoom ratio can be realized.

Moreover, in a case where a plurality of conditions are given for one parameter, new condition may be established by using an upper limit value of one condition and a lower limit value of another condition. For example, a condition shown below may be established by using the upper limit value of the condition (1A) and the lower limit value of the condition (1A'):

$$2.90 < f1/fw < 8.00 \tag{1A'''}$$

This kind of new condition is also included in the scope of the present invention.

Next, numerical data of the above conditions in each example will be described. In the following table, for example, ex1 is Example 1.

the fourth lens unit and an image surface in each example. A flare may be cut by a frame or another member in the lens barrel. The flare stop may directly be printed on an optical element or may be constituted by bonding a seal or the like may on a optical element. There is not any restriction on a shape of the flare stop. For example, any shape may be used such as a circular shape, an elliptic shape, a rectangular shape, a polygonal shape or a region surrounded with a function curve. Not only a harmful light flux but also a light flux such as coma flare in the peripheral portion of the image may be cut by the flare sop.

Moreover, each lens may be coated with an anti-reflection coating to reduce the ghost and the flare. A coating formed of a multilayered thin film is preferable because the ghost and

|         | Ex1    | Ex2    | Ex3    | Ex4    | Ex5    | Ex6    | Ex7    | Ex8    | Ex9    | Ex10   |
|---------|--------|--------|--------|--------|--------|--------|--------|--------|--------|--------|
| (1A)    | 3.686  | 3.633  | 3.702  | 3.546  | 4.040  | 3.983  | 4.106  | 3.482  | 4.446  | 4.450  |
| (2A)    | 0.768  | 0.758  | 0.771  | 0.739  | 0.842  | 0.829  | 0.863  | 0.706  | 0.911  | 0.926  |
| (3A)    | 81.540 | 81.540 | 94.930 | 81.540 | 94.930 | 94.930 | 81.540 | —      | —      | —      |
| (4A)    | −0.834 | −0.724 | −0.628 | −0.641 | −0.576 | −0.563 | −0.677 | —      | —      | —      |
| (5A)    | —      | —      | —      | —      | —      | —      | —      | 1.497  | 1.497  | 1.497  |
| (6A)    | —      | —      | —      | —      | —      | —      | —      | 81.540 | 81.540 | 81.540 |
| (7A)    | —      | —      | —      | —      | —      | —      | —      | 1.689  | 1.847  | 1.635  |
| (8A)    | —      | —      | —      | —      | —      | —      | —      | 31.159 | 23.780 | 22.920 |
| (9A)    | 0.604  | 0.610  | 0.530  | 0.754  | 0.598  | 0.636  | 0.785  | 0.691  | 0.465  | 0.755  |
| (10A)   | 1.806  | 1.806  | 1.806  | 1.806  | 1.806  | 1.883  | 1.883  | 1.806  | 1.806  | 1.806  |
| (11A)   | 40.920 | 40.920 | 40.920 | 40.920 | 40.920 | 40.760 | 40.760 | 40.920 | 40.920 | 40.920 |
| (12A)   | 1.923  | 1.923  | 1.923  | 1.923  | 1.923  | 1.923  | 1.923  | 1.923  | 1.923  | 1.923  |
| (13A)   | 18.900 | 18.900 | 18.900 | 18.900 | 18.900 | 18.900 | 20.880 | 18.900 | 18.900 | 18.900 |
| (14A)   | 5.720  | 5.727  | 5.752  | 5.745  | 5.750  | 5.753  | 6.094  | 5.951  | 5.502  | 5.548  |
| (15A)   | 1.371  | 1.373  | 1.372  | 1.373  | 1.418  | 1.416  | 1.379  | 1.343  | 1.341  | 1.378  |
| (16A)   | −1.190 | −1.122 | −1.133 | −1.117 | −1.192 | −1.172 | −1.240 | −1.046 | −1.087 | −1.206 |
| (17A)   | −0.248 | −0.234 | −0.236 | −0.233 | −0.248 | −0.244 | −0.261 | −0.212 | −0.223 | −0.251 |
| (18A)   | 1.915  | 1.842  | 1.842  | 1.806  | 1.875  | 1.876  | 1.681  | 1.582  | 1.255  | 1.324  |
| (19A)   | 0.399  | 0.384  | 0.384  | 0.376  | 0.391  | 0.390  | 0.353  | 0.321  | 0.257  | 0.276  |
| (20A)   | −6.712 | −7.112 | −6.768 | −7.246 | −6.814 | −6.850 | −4.783 | −7.897 | −3.397 | −2.211 |
| (21A)   | −1.399 | −1.484 | −1.411 | −1.509 | −1.419 | −1.425 | −1.005 | −1.600 | −0.696 | −0.460 |
| (22A)   | 2.008  | 1.898  | 1.870  | 1.845  | 1.836  | 1.842  | 2.029  | 2.745  | 4.774  | 1.961  |
| (23A)   | 0.419  | 0.396  | 0.390  | 0.384  | 0.383  | 0.383  | 0.426  | 0.556  | 0.978  | 0.408  |
| (1B)    | 5.720  | 5.727  | 5.752  | 5.745  | 5.750  | 5.753  | 6.094  | 5.951  | 5.502  | 5.548  |
| 2B)     | 1.371  | 1.373  | 1.372  | 1.373  | 1.418  | 1.416  | 1.379  | 1.343  | 1.341  | 1.378  |
| (3B)    | −1.190 | −1.122 | −1.133 | −1.117 | −1.192 | −1.172 | −1.240 | −1.046 | −1.087 | −1.206 |
| (4B)    | −0.248 | −0.234 | −0.236 | −0.233 | −0.248 | −0.244 | −0.261 | −0.212 | −0.223 | −0.251 |
| (5B)    | 1.915  | 1.842  | 1.842  | 1.806  | 1.875  | 1.876  | 1.681  | 1.582  | 1.255  | 1.324  |
| (6B)    | 0.399  | 0.384  | 0.384  | 0.376  | 0.391  | 0.390  | 0.353  | 0.321  | 0.257  | 0.276  |
| (7B)    | 81.540 | 81.540 | 94.930 | 81.540 | 94.930 | 94.930 | 81.540 | —      | —      | —      |
| (8B)    | −0.834 | −0.724 | −0.628 | −0.641 | −0.576 | −0.563 | −0.677 | —      | —      | —      |
| (9B)    | —      | —      | —      | —      | —      | —      | —      | 1.497  | 1.497  | 1.497  |
| (10B)   | —      | —      | —      | —      | —      | —      | —      | 81.540 | 81.540 | 81.540 |
| (11B)   | —      | —      | —      | —      | —      | —      | —      | 1.689  | 1.847  | 1.635  |
| (12B)   | —      | —      | —      | —      | —      | —      | —      | 31.159 | 23.780 | 22.920 |
| (13B)   | 0.604  | 0.610  | 0.530  | 0.754  | 0.598  | 0.636  | 0.785  | 0.691  | 0.465  | 0.755  |
| (14B)   | 1.806  | 1.806  | 1.806  | 1.806  | 1.806  | 1.883  | 1.883  | 1.806  | 1.806  | 1.806  |
| (15B)   | 40.920 | 40.920 | 40.920 | 40.920 | 40.920 | 40.760 | 40.760 | 40.920 | 40.920 | 40.920 |
| (16B)   | 1.923  | 1.923  | 1.923  | 1.923  | 1.923  | 1.923  | 1.923  | 1.923  | 1.923  | 1.923  |
| (17B)   | 18.900 | 18.900 | 18.900 | 18.900 | 18.900 | 18.900 | 20.880 | 18.900 | 18.900 | 18.900 |
| (18B)   | 3.686  | 3.633  | 3.702  | 3.546  | 4.040  | 3.983  | 4.106  | 3.482  | 4.446  | 4.450  |
| (2)(19B)| 0.768  | 0.758  | 0.771  | 0.739  | 0.842  | 0.829  | 0.863  | 0.706  | 0.911  | 0.926  |
| (20B)   | −6.712 | −7.112 | −6.768 | −7.246 | −6.814 | −6.850 | −4.783 | −7.897 | −3.397 | −2.211 |
| (21B)   | −1.399 | −1.484 | −1.411 | −1.509 | −1.419 | −1.425 | −1.005 | −1.600 | −0.696 | −0.460 |
| (22B)   | 2.008  | 1.898  | 1.870  | 1.845  | 1.836  | 1.842  | 2.029  | 2.745  | 4.774  | 1.961  |
| (23B)   | 0.419  | 0.396  | 0.390  | 0.384  | 0.383  | 0.383  | 0.426  | 0.556  | 0.978  | 0.408  |
| fw/ft   | 4.79   | 4.79   | 4.79   | 4.80   | 4.80   | 4.80   | 4.76   | 4.93   | 4.88   | 4.80   |
| fw/y10  | 1.64   | 1.64   | 1.64   | 1.64   | 1.64   | 1.64   | 1.72   | 1.68   | 1.64   | 1.70   |
| (24)    | 0.923  | 0.926  | 0.924  | 0.943  | 0.928  | 0.929  | 0.948  | 0.997  | 0.959  | 0.948  |

To cut unnecessary light such as ghost and flare in the above examples, a flare stop may be disposed in addition to an aperture stop. The flare stop may be disposed on an object side of the first lens unit, between the first lens unit and the second lens unit, between the second lens unit and the third lens unit, between the third lens unit and the fourth lens unit or between the flare can effectively be reduced. A lens surface, a cover glass or the like may be coated with an infrared cut coating.

Furthermore, it is preferable that focusing is performed by a fourth lens unit, but first, second and third lens units may perform the focusing. A plurality of lens units may be moved to perform the focusing. The whole lens system may be moved to perform the focusing. A part of lenses may be moved to perform the focusing.

Moreover, decrease of brightness in a peripheral portion of an image may be reduced by shifting a micro lens of a CCD image sensor. For example, design of the micro lens of the CCD image sensor may be changed in accordance with an incidence angle of a ray at each image height.

Furthermore, decrease of brightness in the peripheral portion of the image may be corrected by image processing.

In addition, as described above, a distortion is intentionally generated beforehand in the optical system, and the image may electrically be processed to correct an image distortion after photographing.

Next, another zoom lens system according to the present invention will be described.

As described above, a zoom lens system according to the present invention comprises, in order from an object side, a first lens unit having a positive refractive power; a second lens unit having a negative refractive power; a third lens unit having a positive refractive power; a fourth lens unit having a negative refractive power; and a fifth lens unit having a positive refractive power. During magnification change from a wide-angle end to a telephoto end, each of the space between the respective lens units changes. This is a basic constitution. In addition, according to a third aspect of the present invention, the first lens unit moves so as to be positioned closer to the object side in the telephoto end than in the wide-angle end. The fifth lens unit moves so as to be positioned closer to an image side in the telephoto end than in the wide-angle end. An axial space between the third lens unit and the fourth lens unit increases during magnification change from the wide-angle end to an intermediate position, and decreases during magnification change from the intermediate position to the telephoto end.

When the above constitution is adopted, the burden of magnification change function can be shared by a plurality of lens units. Therefore, reduction of the total length can be realized, and it is easy to constitute a lens barrel to be compact. Since a position of an exit pupil can be kept to be appropriate, an angle of an incident ray upon an electronic image sensor such as the CCD image sensor can be controlled into an appropriate range, and a ray is allowed to efficiently enter a light receiving surface of the electronic image sensor. Furthermore, aberration fluctuations during magnification change are suppressed, and a satisfactory optical performance can be obtained in the whole magnification change region.

During the magnification change from the wide-angle end to the telephoto end, the first lens unit may be moved so as to be positioned closer to the object side in the telephoto end than in the wide-angle end. In this case, an angle of field of the zoom lens system can be broadened while keeping a small outer diameter of a lens disposed closest to the object side. Therefore, it is easy to achieve miniaturization of the lens barrel in an outer diameter direction.

The fifth lens unit may move so as to be positioned closer to the image side in the telephoto end than in the wide-angle end, and the axial space between the third lens unit and the fourth lens unit may increase during magnification change from the wide-angle end to the intermediate position, and may decrease during magnification change from the intermediate position to the telephoto end. In general, in the zoom lens system including the positive first lens unit, the negative second lens unit, the positive third lens unit, the negative fourth lens unit and the positive fifth lens unit, the second and third lens units are easily largely burdened with the magnification change function. Therefore, the aberration fluctuations during the magnification change easily increase. When the fifth lens unit is moved so as to be positioned closer to the image side in the telephoto end than in the wide-angle end, the fifth lens unit can be burdened with the magnification change function. Therefore, the burdens of the magnification change functions on the other lens units can be reduced, and the aberration fluctuations during the magnification change can further be reduced.

However, when the fifth lens unit is moved in such a manner, a field curvature in an off-axial region easily indicates a plus value in the wide-angle end and the telephoto end, and easily indicates a minus value in the vicinity of the intermediate position. To solve the problem, when the axial space between the third lens unit and the fourth lens unit increases during magnification change from the wide-angle end to the intermediate position and decreases during magnification change from the intermediate position to the telephoto end, a position of the image surface in the off-axial region can satisfactorily be corrected in the whole magnification change region. Here, the intermediate position is any state between the wide-angle end and the telephoto end.

Furthermore, to provide the zoom lens system which has the satisfactory optical performance and which is suitable for the compact constitution, various devises are preferably added. This respect will hereinafter be described in detail.

The second lens unit may be moved so as to be positioned closer to the image side in the telephoto end than in the wide-angle end, and the third lens unit may be moved so as to be positioned closer to the object side in the telephoto end than in the wide-angle end. According to such a constitution, the burdens of the magnification change function on the lens units can be reduced, and the aberration fluctuations during the magnification change can be minimized.

Moreover, it is more preferable to satisfy one or both of the following conditions:

$$4.00 < Lw/fw < 9.00 \quad (1C); \text{ and}$$

$$1.00 < Lt/ft < 1.80 \quad (2C),$$

in which Lw is the total length of the zoom lens system in the wide-angle end, Lt is the total lengths of the zoom lens system in the telephoto end, respectively, fw is a focal length of the zoom lens system in the wide-angle end, and ft is a focal length of the zoom lens system in the telephoto end.

These are conditions concerning the miniaturization of the zoom lens system and the securing of the optical performance. If Lw/fw exceeds an upper limit of 9.00 in the condition (1C) and Lt/ft exceeds an upper limit of 1.80 in the condition (2C), the total length of the lens system excessively increases. Therefore, it is difficult to constitute the lens barrel to be compact when collapsed. If Lw/fw is smaller than a lower limit of 4.00 in the condition (1C) and Lt/ft is smaller than a lower limit of 1.00 in the condition (2C), the powers of the lens units tend to strengthen, the aberration fluctuations during the magnification change increase, and it is difficult to obtain the satisfactory optical performance in the whole magnification change region.

In the condition (1C), it is more preferable to satisfy the following condition:

$$4.70 < Lw/fw < 7.70 \quad (1C').$$

Moreover, it is further preferable to satisfy the following condition:

$$5.30 < Lw/fw < 6.30 \quad (1C'').$$

In the condition (2C), it is more preferable to satisfy the following condition:

$$1.10 < Lt/ft < 1.75 \quad (2C').$$

Moreover, it is further preferable to satisfy the following condition:

$$1.20 < Lt/ft < 1.65 \quad (2C'').$$

Furthermore, it is preferable that the first lens unit is constituted of one positive lens. Since the first lens unit has the largest height of an off-axial ray, an axial thickness easily increases in order to secure a necessary edge thickness of the lens. Furthermore, when the number of the lenses of the first lens unit increases, a position of an entrance pupil comes away from the object side. Therefore, the height of the ray passing through the first lens unit further increases, and the axial thickness needs to increase in order to secure the edge thickness. When the number of the lenses increases, the axial thickness increases. Therefore, as the number of the lens units in the first lens unit increases, the size in a diametric direction and the axial thickness of the first lens unit become larger than necessary. As a result, even when the zoom lens system is brought into a collapsible state, the lens barrel cannot be constituted to be sufficiently compact. From this viewpoint, the constitution in which the first lens unit is constituted of one lens component largely contributes to the compact lens barrel.

However, when the first lens unit is constituted of only one positive lens, the aberrations generated in this lens cannot be cancelled. Therefore, the aberration fluctuations during the magnification change increase, and the optical performance easily deteriorates. To solve the problem, the aberration generation in the first lens unit needs to be inhibited to such a realistic extent that the photographed image can be appreciated.

It is preferable that the positive lens of the first lens unit satisfies the following condition:

$$75.0 < vd1p < 105.0 \quad (3C),$$

in which $vd1p$ is the Abbe number of the positive lens of the first lens unit.

If $vd1p$ exceeds an upper limit of 105.0 in the condition (3C), availability and mass productivity of a vitreous material deteriorate, and costs increase. If $vd1p$ is smaller than a lower limit of 75.0 in the condition (3C), an excessively large chromatic aberration is generated in the first lens unit, and color blur is generated in the photographed image.

Furthermore, it is more preferable to satisfy the following:

$$75.0 < vd1p < 101.0 \quad (3C').$$

In addition, it is further preferable to satisfy the following:

$$80.0 < vd1p < 97.0 \quad (3C'').$$

Moreover, it is preferable that the positive lens of the first lens unit satisfies the following condition:

$$-1.50 < SF1p < -0.20 \quad (4C),$$

in which $SF1p$ is defined by $SF1p=(R1pf+R1pr)/(R1pf-R1pr)$ and in which $R1pf$ and $R1pr$ are paraxial radii of curvatures of an object-side surface and an image-side surface of the positive lens of the first lens unit, respectively.

If $SF1p$ exceeds an upper limit of −0.20 in the condition (4C), excessively large astigmatism and spherical aberration are generated in the wide-angle end. If $SF1p$ is smaller than a lower limit of −1.50 in the condition (4C), an excessively large distortion is generated in the wide-angle end. In any case, it is difficult to obtain the satisfactory optical performance.

Furthermore, it is more preferable to satisfy the following:

$$-1.10 < SF1p < -0.32 \quad (4C').$$

In addition, it is further preferable to satisfy the following:

$$-0.70 < SF1p < -0.54 \quad (4C'').$$

Moreover, it is preferable that the positive lens of the first lens unit has two aspherical surfaces. The generations of the distortion, the astigmatism and a coma can effectively be inhibited.

Furthermore, it is preferable that the second lens unit includes, in order from the object side, a negative lens L2, a negative lens L3 and a positive lens L4. In this case, since a rear principal point of the second lens unit is positioned closer to the image side, a movement amount during the magnification change can be reduced. As described later, an aperture stop may be disposed behind the second lens unit. At this time, an entrance pupil can be positioned closer to the object side. Therefore, a front lens diameter can be reduced, and this realizes a compact lens system.

Furthermore, the negative lens L2 of the second lens unit has a concave surface which faces the image side, the negative lens L3 has a concave surface which faces the object side, and the negative lens L3 and the positive lens L4 may be cemented. Since the second lens unit is a lens unit burdened with the magnification change function, a strong negative power is required. On the other hand, a large aberration is easily generated. In a case where the negative lens L2 is formed so that the concave surface faces the image side and the negative lens L3 is formed so that the concave surface faces the object side, off-axial aberrations such as the astigmatism and the coma generated in the second lens unit can be cancelled and minimized. Since the off-axial ray passing through the second lens unit has a small angle with respect to the optical axis, the aberration fluctuations due to the movement of the second lens unit during the magnification change can be minimized. Furthermore, the negative lens L3 and the positive lens L4 can be cemented to correct the chromatic aberration.

Moreover, it is preferable that the negative lens L2 of the second lens unit satisfies the following condition:

$$1.70 < Nd21 < 2.20 \quad (5C),$$

in which $Nd21$ is a refractive index of the negative lens L2 for the d-line.

If $Nd21$ exceeds an upper limit of 2.20 in the condition (5C), the availability and mass productivity of the vitreous material deteriorate, and the costs increase. If $Nd21$ is smaller than a lower limit of 1.70 in the condition (5C), the curvature of the lens surface needs to be enlarged in order to obtain a desired refractive power, and large astigmatism and coma are easily generated.

Furthermore, it is more preferable to satisfy the following:

$$1.75 < Nd21 < 2.05 \quad (5C').$$

In addition, it is further preferable to satisfy the following:

$$1.80 < Nd21 < 1.90 \quad (5C'').$$

It is preferable that the positive lens L4 of the second lens unit satisfies the following conditions:

$$1.780 < Nd23 < 2.100 \quad (6C); \text{ and}$$

$$13.0 < vd23 < 32.0 \quad (7C),$$

in which Nd23 and vd23 are a refractive index and the Abbe number of the positive lens L4 of the second lens unit for the d-line.

If Nd23 exceeds an upper limit of 2.100 in the condition (6C), the availability and mass productivity of the vitreous material deteriorate, and the costs increase. If Nd23 is smaller than a lower limit of 1.780 in the condition (6C), the curvature of the lens surface needs to be enlarged in order to obtain the desired refractive power, and the large astigmatism and coma are easily generated.

If vd23 exceeds an upper limit of 32.0 in the condition (7C), the chromatic aberration is insufficiently corrected. If vd23 is smaller than a lower limit of 13.0 in the condition (7C), a secondary spectrum cannot be corrected, and the color blur is easily generated in the photographed image.

In the condition (6C), it is more preferable to satisfy the following:

$$1.840 < Nd23 < 2.020 \quad (6C').$$

In addition, it is further preferable to satisfy the following:

$$1.900 < Nd23 < 1.950 \quad (6C'').$$

In the condition (7C), it is more preferable to satisfy the following:

$$15.0 < vd23 < 26.0 \quad (7C').$$

In addition, it is further preferable to satisfy the following:

$$17.0 < vd23 < 23.5 \quad (7C'').$$

It is preferable that the third lens unit includes a positive lens and a negative lens in order from the object side. According to such a constitution, since a front principal point of the third lens unit is positioned closer to the object side, the movement amount during the magnification change can be minimized, and this results in miniaturization of the lens system. When these lenses are cemented, an axial chromatic aberration can be corrected. When an aspherical surface is disposed closest to the object side in the third lens unit, the spherical aberration is effectively corrected.

It is preferable that the fourth lens unit is constituted of, in order from the object side, a positive lens and a negative lens whose concave surface faces the image side. According to such a constitution, since the front principal point of the fourth lens unit can be positioned closer to the object side, the movement amount during the magnification change can be minimized, and the lens system is miniaturized. When these lenses are cemented to constitute a cemented lens, the chromatic aberration can be corrected. The surface of the fourth lens unit closest to the image side may be formed as a concave surface which faces the image side. According to such a constitution, the off-axial ray emitted from the fourth lens unit is kicked up to set the incidence angle of the ray upon an electronic image sensor such as the CCD image sensor to an appropriate angle, and the ray is efficiently allowed to enter the light receiving surface.

At this time, it is preferable that the negative lens of the fourth lens unit satisfies the following conditions:

$$1.830 < Nd4n < 2.100 \quad (8C); \text{ and}$$

$$20.0 < vd4n < 38.0 \quad (9C),$$

in which Nd4n and vd4n are a refractive index and the Abbe number of the negative lens of the fourth lens unit for the d-line.

If Nd4n exceeds an upper limit of 2.100 in the condition (8C), the availability and mass productivity of the vitreous material deteriorate, and the costs increase. If Nd4n is smaller than a lower limit of 1.830 in the condition (8C), the curvature of the lens surface needs to be enlarged in order to obtain the desired refractive power, and the large astigmatism and coma are easily generated.

If vd4n exceeds an upper limit of 38.0 in the condition (9C), the chromatic aberration is insufficiently corrected. If vd4n is smaller than a lower limit of 20.0 in the condition (9C), an excessively large chromatic aberration on a short wavelength region is generated in this lens, the secondary spectrum cannot be corrected, and the color blur is easily generated in the photographed image.

In the condition (8C), it is more preferable to satisfy the following:

$$1.890 < Nd4n < 2.060 \quad (8C').$$

In addition, it is further preferable to satisfy the following:

$$1.970 < Nd4n < 2.020 \quad (8C'').$$

In the condition (9C), it is more preferable to satisfy the following:

$$23.0 < vd4n < 32.0 \quad (9C').$$

In addition, it is further preferable to satisfy the following:

$$25.0 < vd4n < 30.0 \quad (9C'').$$

It is preferable that the fifth lens unit includes only one positive lens. Since the fifth lens unit mainly performs a function of disposing an exit pupil away from an image surface, only one positive lens is enough to perform the function. At this time, it is preferable that the positive lens of the fifth lens unit satisfies the following condition:

$$1.750 < Nd5p < 2.100 \quad (10C); \text{ and}$$

$$22.0 < vd5p < 38.0 \quad (11C),$$

in which Nd5p and vd5p are a refractive index and the Abbe number of the positive lens of the fifth lens unit for the d-line, respectively.

The condition (10C) is a condition for suppressing the off-axial aberration generated in this lens in an appropriate range, and the condition (11C) is a condition concerning correction of a chromatic aberration of magnification. When the first lens unit is constituted of a small number of the lenses, the chromatic aberration of magnification generated in the first lens unit easily remains. However, since the off-axial ray passing through the fifth lens unit has a large ray height, the chromatic aberration of magnification remaining in the first lens unit is conveniently corrected.

If Nd5p exceeds an upper limit of 2.100 in the condition (10C), the availability and mass productivity of the vitreous material deteriorate, and the costs increase. If Nd5p is smaller than a lower limit of 1.750 in the condition (10C), the curvature of the surface needs to be enlarged in order to obtain the desired refractive power, and the large astigmatism and coma are easily generated.

If vd5p exceeds an upper limit of 38.0 in the condition (11C), the chromatic aberration of magnification is insufficiently corrected. If vd5p is smaller than a lower limit of 22.0 in the condition (11C), the excessively large chromatic aberration in the short wavelength region is generated in this lens, the secondary spectrum cannot be corrected, and the color blur is easily generated in the photographed image.

In the condition (10C), it is more preferable to satisfy the following:

$$1.780 < Nd5p < 2.060 \quad (10C').$$

In addition, it is further preferable to satisfy the following:

$$1.800 < Nd5p < 2.020 \quad (10C'')$$

In the condition (11C), it is more preferable to satisfy the following:

$$23.0 < vd5p < 32.0 \quad (11C')$$

In addition, it is further preferable to satisfy the following:

$$24.0 < vd5p < 29.0 \quad (11C'')$$

Next, powers of the lens units constituting the zoom lens system will be described.

It is preferable that the first lens unit satisfies the following condition:

$$2.50 < f1/fw < 8.00 \quad (12C)$$

in which f1 is a focal length of the first lens unit, and fw is a focal length of the zoom lens system in the wide-angle end.

If the focal length of the first lens unit exceeds an upper limit of 8.00 in the condition (12C), the power of the first lens unit excessively weakens, the total length of the lens system easily increases, and it is difficult to constitute the lens barrel to be compact. If the focal length of the first lens unit is smaller than a lower limit of 2.50, the power excessively strengthens, and a large aberration is generated. Especially, a large chromatic aberration is generated, and the color blur is remarkably generated in the photographed image.

Furthermore, it is more preferable to satisfy the following:

$$3.00 < f1/fw < 5.00 \quad (12C')$$

In addition, it is further preferable to satisfy the following:

$$3.50 < f1/fw < 4.20 \quad (12C'')$$

It is preferable that the second lens unit satisfies the following condition:

$$-2.10 < f2/fw < -0.05 \quad (13C)$$

in which f2 is a focal length of the second lens unit, and fw is a focal length of the zoom lens system in the wide-angle end.

If the focal length of the second lens unit is smaller than a lower limit of −2.10 in the condition (13C), the power of the second lens unit excessively weakens, the movement amount during the magnification change increases, and it is difficult to constitute the lens barrel to be compact. If the focal length of the second lens unit exceeds an upper limit of −0.05, a paraxial image forming magnification of the second lens unit decreases, the movement amount during the magnification change increases, and it is difficult to correct the aberration.

Furthermore, it is more preferable to satisfy the following:

$$-1.70 < f2/fw < -0.07 \quad (13C')$$

In addition, it is further preferable to satisfy the following:

$$-1.30 < f2/fw < -0.09 \quad (13C'')$$

It is preferable that the third lens unit satisfies the following condition:

$$1.40 < f3/fw < 2.80 \quad (14C)$$

in which f3 is a focal length of the third lens unit, and fw is a focal length of the whole system in the wide-angle end.

If the focal length of the third lens unit exceeds an upper limit of 2.80 in the condition (14C), the power of the third lens unit excessively weakens, the movement amount during the magnification change increases, and it is difficult to constitute the lens barrel to be compact. If the focal length of the third lens unit is smaller than a lower limit of 1.40 in the condition (14C), the paraxial image forming magnification of the third lens unit decreases, the movement amount during the magnification change increases, and it is difficult to correct the aberrations.

Furthermore, it is more preferable to satisfy the following:

$$1.60 < f3/fw < 2.30 \quad (14C')$$

In addition, it is further preferable to satisfy the following:

$$1.78 < f3/fw < 1.93 \quad (14C'')$$

It is preferable that the fourth lens unit satisfies the following condition:

$$-9.00 < f4/fw < -5.80 \quad (15C),$$

in which f4: a focal length of the fourth lens unit, and fw: a focal length of the zoom lens system in the wide-angle end.

If the focal length of the fourth lens unit is smaller than a lower limit of −9.00 in the condition (15C), the power of the fourth lens unit excessively weakens, and the incidence angle of the ray upon an electronic image sensor such as the CCD image sensor increases. Then, shading is unfavorably easily generated in a peripheral portion of an image. If the focal length exceeds an upper limit of −5.80, the power of the fourth lens unit excessively strengthens, and a large aberration is easily generated.

Furthermore, it is more preferable to satisfy the following:

$$-8.00 < f4/fw < -6.20 \quad (15C')$$

In addition, it is further preferable to satisfy the following:

$$-7.30 < f4/fw < -6.60 \quad (15C'')$$

It is preferable that the fifth lens unit satisfies the following condition:

$$1.10 < f5/fw < 3.00 \quad (16C),$$

in which f5 is a focal length of the fifth lens unit, and fw is a focal length of the zoom lens system in the wide-angle end.

If the focal length of the fifth lens unit exceeds an upper limit of 3.00 in the condition (16C), the power of the fifth lens unit excessively weakens, the incidence angle of the ray upon an electronic image sensor such as the CCD image sensor increases. Then, the shading is unfavorably easily generated in a peripheral portion of an image. If the focal length is smaller than a lower limit of 1.10, the power of the fifth lens unit excessively strengthens, the aberration fluctuations during the focusing performed by the fifth lens unit increase, and it is difficult to obtain a satisfactory optical performance in photographing an object at a minimum focus distance.

Furthermore, it is more preferable to satisfy the following:

$$1.40 < f5/fw < 2.55 \quad (16C')$$

In addition, it is further preferable to satisfy the following:

$$1.70 < f5/fw < 2.05 \quad (16C'')$$

When the zoom lens system described above is applied to an electronic camera or the like including an aperture stop and a shutter, the aperture stop and the shutter may be disposed between the second lens unit and the third lens unit. In this case, the height of the off-axial ray passing through the third lens unit and the subsequent lens unit does not increase more than necessary. Therefore, fluctuations of off-axial aberrations at a time when the third lens unit and the subsequent lens units move during the magnification change can be minimized. During the magnification change, the aperture stop and the shutter may be moved integrally with the third lens unit. In this case, the entrance pupil can be constituted to be shallow as viewed from the object side, and the exit pupil can be disposed away from the image surface. Furthermore, since the height of the off-axial ray decreases, a shutter unit does not have to be enlarged. An only small dead space is required for moving the aperture stop and the shutter.

A focusing system may be an inner focusing system performed by the fourth lens unit or the fifth lens unit. As compared with a focusing system performed by moving the whole lens system or a front focusing system performed by moving the first lens unit, the inner focusing system is advantageous for miniaturization because the movable lens unit is light in weight, load to be applied to a motor may be reduced, the total length does not increase, and a size of the lens frame in the diametric direction does not increase since a driving motor can be disposed in a lens frame. Especially, when the focusing is performed by the fifth lens unit, fluctuation of an image surface in an off-axial region may be reduced. Therefore, the satisfactory optical performance can be secured even in a peripheral portion of the image when photographing an object at the minimum focus distance.

When the generation of the distortion is permitted in the above zoom lens system, the height of the incident ray upon the surface of the zoom lens system closest to the object side lowers for the angle of field. Therefore, the outer diameter of the lens positioned closest to the object side can be reduced. Therefore, it is possible to intentionally generate a barrel type distortion in the zoom lens system, to correct the distortion by use of a function of processing image data obtained by picking up, with the electronic image sensor, an image formed through the zoom lens system in order to deform the image, and to observe an image of an object in which the distortion due to the zoom lens system is eliminated. Especially, it is ideal that an electronic image pickup apparatus such as a camera outputs the already corrected image data. It is to be noted that it is preferable that the optical system satisfies the following condition concerning the distortion of the zoom lens system when focused on a substantially infinite object:

$$0.850 < y_{07}/(f w \cdot \tan \omega_{07w}) < 0.970 \qquad (17C),$$

in which fw is a focal length of the zoom lens system in a wide-angle end, $y_{07}=0.7 y_{10}$, $y_{10}$ is a distance from the center of an effective image pickup surface (a region where the image can be picked up) of the electronic image sensor to the farthest point, that is, the maximum image height and $\omega_{07w}$ is an incident angle of field (an angle with respect to an optical axis of a chief ray which enters the zoom lens system from an object side) of the chief ray upon the zoom lens system, the chief ray corresponding to an image point which is apart from the center of the effective image pickup region by $y_{07}$ in the wide-angle end.

If $y_{07}/(f w \cdot \tan \omega_{07})$ exceeds an upper limit of 0.970 in the condition (17C) and indicates a value around 1 (This means that the distortion is optically satisfactorily corrected.), it is difficult to take an image over a large angle of field while maintaining the miniaturization of the optical system. In a case where $y_{07}/(f w \cdot \tan \omega_{07w})$ is smaller than a lower limit of 0.850 in the condition (17C), if the image distortion due to the distortion of the optical system is corrected by image processing, deterioration of sharpness in the peripheral portion of the image becomes conspicuous. This is because a magnification for correcting image distortion in the peripheral portion of the image excessively increases in a radial direction It is to be noted that it is further preferable to satisfy the following condition:

$$0.880 < y_{07}/(f w \cdot \tan \omega_{07w}) < 0.960 \qquad (17C').$$

Furthermore, it is most preferable to satisfy the following:

$$0.910 < y_{07}/(f w \cdot \tan \omega_{07w}) < 0.950 \qquad (17C'').$$

A plurality of constitutions described above may arbitrarily be satisfied at the same time. In consequence, a more satisfactory effect can be obtained.

Moreover, when the conditions are arbitrarily combined and satisfied, a more satisfactory effect can be obtained.

The above zoom lens system can be applied to an electronic image pickup apparatus. In this case, it is preferable that the electronic image pickup apparatus includes the zoom lens system according to the present invention; and an image sensor disposed in a position where an object image formed by the zoom lens system is received.

Moreover, the above zoom lens system can be applied to an information processing apparatus including an image sensor disposed in a position where an object image formed by the zoom lens system is received; a CPU which processes an electric signal photoelectrically converted by the image sensor; an input section for an operator to input an information signal to be input into the CPU; display processing means for displaying an output from the CPU in a display device (e.g., an LCD); and a recording medium which records the output from the CPU. The CPU is configured to allow the display device to display the object image formed by the zoom lens system and received by the image sensor.

Examples of the information processing apparatus include a portable terminal device (e.g., a cellular phone, a PDA or the like).

Furthermore, the above zoom lens system can be applied to an electronic camera. In this case, the electronic camera includes an image sensor disposed in a position where an object image formed by the zoom lens system is received; a CPU which processes an electric signal photoelectrically converted by the image sensor; a display unit which observably displays the object image received by the image sensor; a recording processing section which records the object image received by the image sensor in a recording medium; and the recording medium (e.g., a memory card or a DVD±RW or the like) which is incorporated in the electronic camera and/or detachably attached to the electronic camera in order to record image information of the object image received by the image sensor. The CPU is configured to execute control so as to display the object image received by the image sensor in the display unit and record the object image received by the image sensor in the recording medium.

Next, Examples 11 to 16 of a zoom lens system according to the present invention will be described.

Figure 21A:
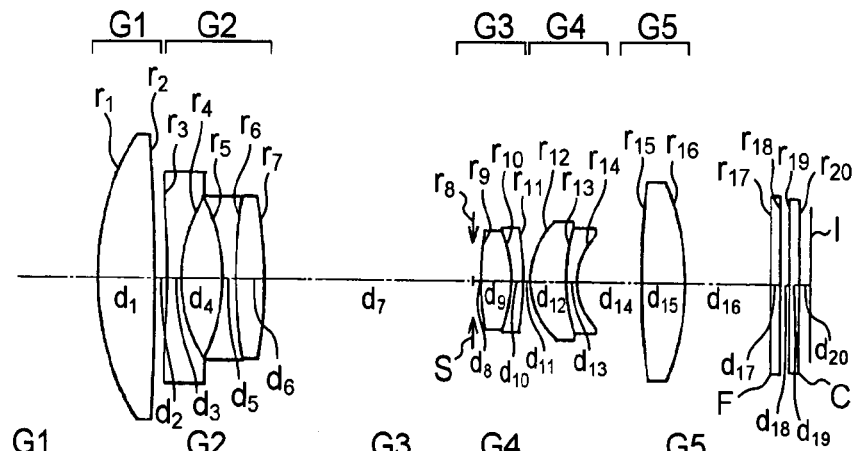
FIGS. 21A to 21C are sectional views of Example 11 of the present invention along an optical axis.
Figure 21B:
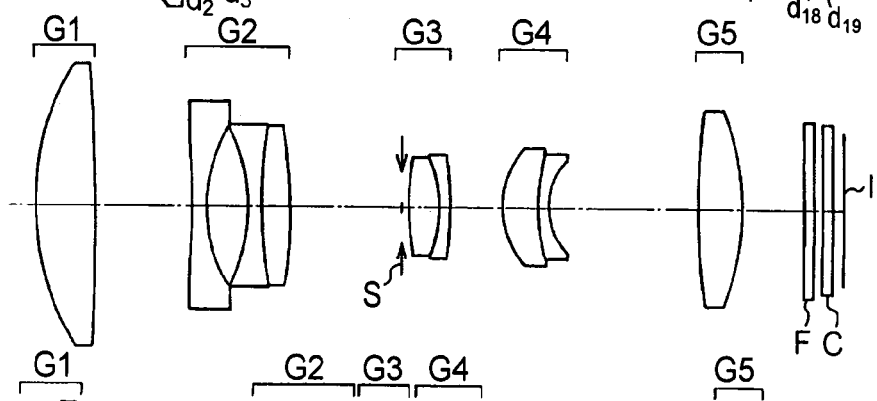
Figure 21C:
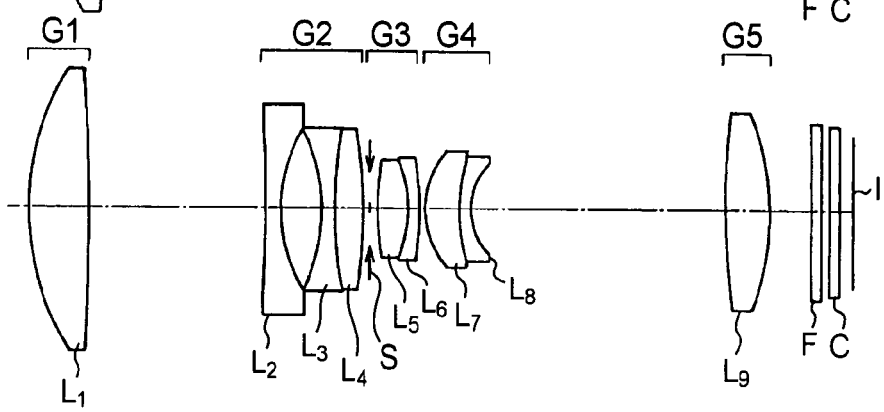
Figure 22A:
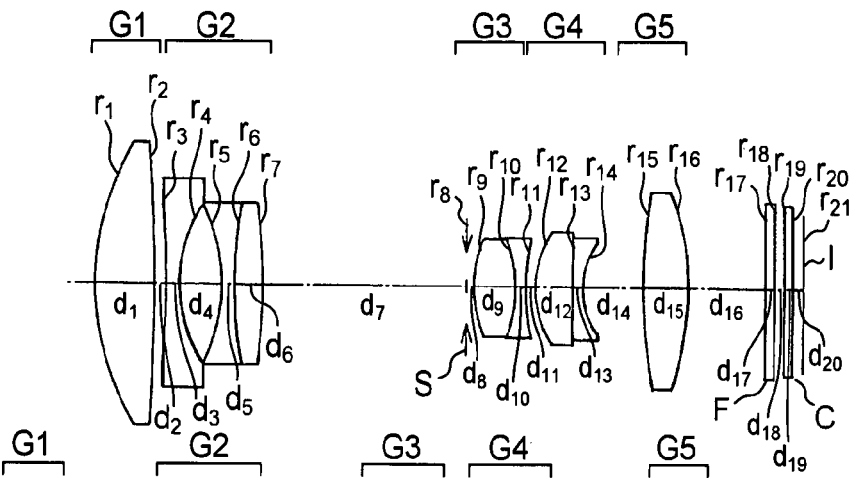
FIGS. 22A to 22C are sectional views of Example 12 of the present invention along an optical axis.
Figure 22B:
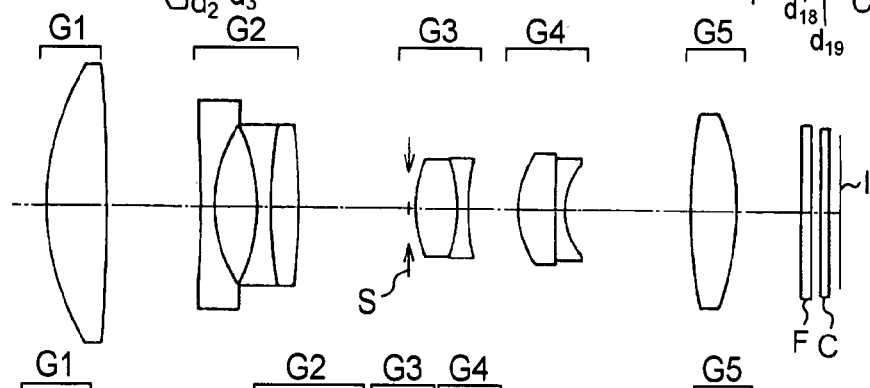
Figure 22C:
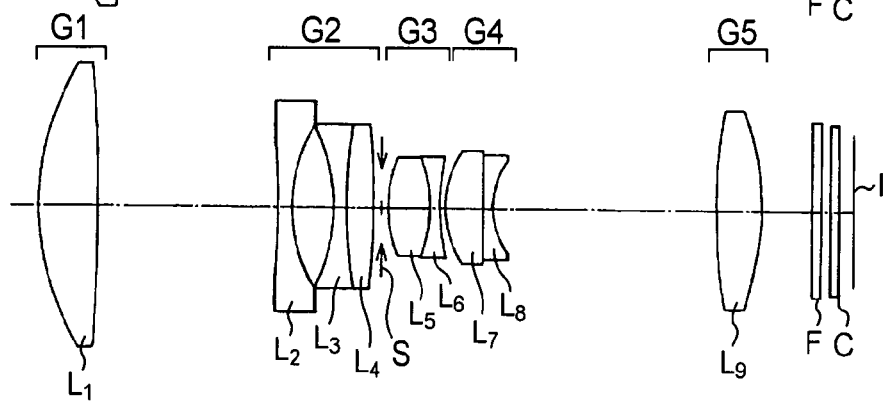

FIGS. 21A to 26C are sectional views of Examples 11 to 16 when focused on an infinite object along an optical axis, FIGS. 21A, 22A, are sectional views in a wide-angle end, FIGS. 21B, 22B, are sectional views in an intermediate position, and FIGS. 21C, 22C, are sectional views in a telephoto end. In the drawings, a first lens unit is denoted with G1, a second lens unit is denoted with G2, an aperture stop is denoted with S, a third lens unit is denoted with G3, a fourth lens unit is denoted with G4, a fifth lens unit is denoted with G5, a parallel flat plate constituting a low pass filter or the like coated with an IR cut coating is denoted with F, a parallel flat plate which is a cover glass of an electronic image sensor (a CCD image sensor, a CMOS type image sensor or the like) is denoted with C, and an image surface (a light receiving surface of the electronic image sensor) is denoted with I. It is to be noted that the surface of the cover glass C may be coated with a multilayered thin film for limiting a wavelength band. The cover glass C may have a low pass filter function.

As shown in FIGS. 21A to 21C, Example 11 includes, in order from an object side, a positive first lens unit G1, a negative second lens unit G2, an aperture stop S, a positive third lens unit G3, a negative fourth lens unit G4 and a positive fifth lens unit G5. During magnification change from a wide-angle end to a telephoto end, the first lens unit G1 moves toward the object side. The second lens unit G2 slightly moves toward the object side from the wide-angle end to an intermediate position, moves toward an image side from the intermediate position to the telephoto end, and is positioned closer to the image side in the telephoto end than in the wide-angle end. An aperture stop S and the third lens unit G3 integrally monotonously move toward the object side while reducing a space between the third lens unit and the second lens unit G2. The fourth lens unit G4 moves toward the object side while enlarging a space between the fourth lens unit and the third lens unit G3 from the wide-angle end to the intermediate position and reducing the space from the intermediate position to the telephoto end. The fifth lens unit G5 moves toward the image side.

The first lens unit G1 is constituted of a double convex positive lens. The second lens unit G2 includes, in order from the object side, a double concave negative lens, and a cemented lens of a double concave negative lens and a double convex positive lens. The third lens unit G3 is constituted of a cemented lens including a double convex positive lens and a negative meniscus lens whose convex surface faces the image side in order from the object side. The fourth lens unit G4 is constituted of a cemented lens including a positive meniscus lens whose convex surface faces the object side and a negative meniscus lens whose convex surface faces the object side in order from the object side. The fifth lens unit G5 is constituted of a double convex positive lens. The aperture stop S is positioned on the object side of the third lens unit G3 integrally with the third lens unit.

Aspherical surfaces are used on six surfaces including opposite surfaces of the double convex positive lens of the first lens unit G1, opposite surfaces of the double concave negative lens of the second lens unit G2, the surface of the cemented lens of the third lens unit G3 closest to the object side and the surface of the cemented lens of the fourth lens unit G4 closest to the object side.

As shown in FIGS. 22A to 22C, Example 12 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During magnification change from a wide-angle end to a telephoto end, the first lens unit G1 moves toward the object side. The second lens unit G2 slightly moves toward the object side from the wide-angle end to an intermediate position, moves toward an image side from the intermediate position to the telephoto end, and is positioned closer to the image side in the telephoto end than in the wide-angle end. An aperture stop S and the third lens unit G3 integrally monotonously move toward the object side while reducing a space between the third lens unit and the second lens unit G2. The fourth lens unit G4 moves toward the object side while enlarging a space between the fourth lens unit and the third lens unit G3 from the wide-angle end to the intermediate position and reducing the space from the intermediate position to the telephoto end. The fifth lens unit G5 moves toward the image side.

The first lens unit G1 is constituted of a double convex positive lens. The second lens unit G2 includes, in order from the object side, a double concave negative lens, and a cemented lens of a double concave negative lens and a double convex positive lens. The third lens unit G3 is constituted of a cemented lens including a double convex positive lens and a double concave negative lens in order from the object side. The fourth lens unit G4 is constituted of a cemented lens including a double convex positive lens and a double concave negative lens in order from the object side. The fifth lens unit G5 is constituted of a double convex positive lens. The aperture stop S is positioned on the object side of the third lens unit G3 integrally with the third lens unit.

Aspherical surfaces are used on six surfaces including opposite surfaces of the double convex positive lens of the first lens unit G1, opposite surfaces of the double concave negative lens of the second lens unit G2 and the surfaces of the cemented lens of the third lens unit G3 closest to the object side and the image side.

Figure 23A:
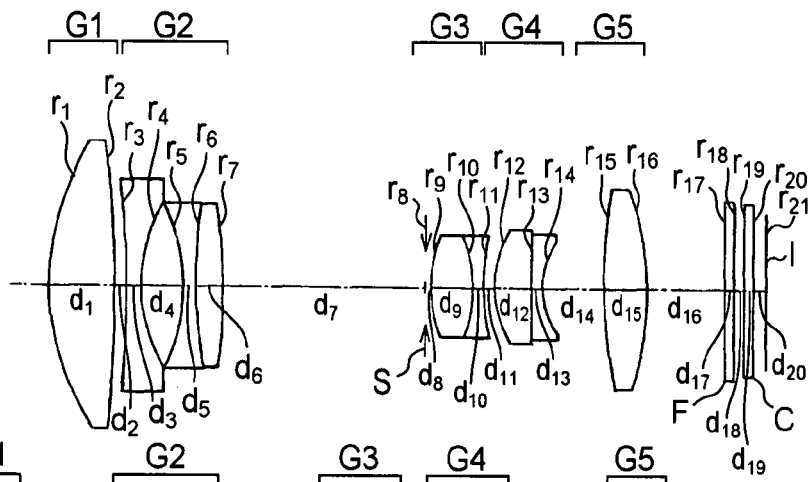
FIGS. 23A to 23C are sectional views of Example 13 of the present invention along an optical axis.
Figure 23B:
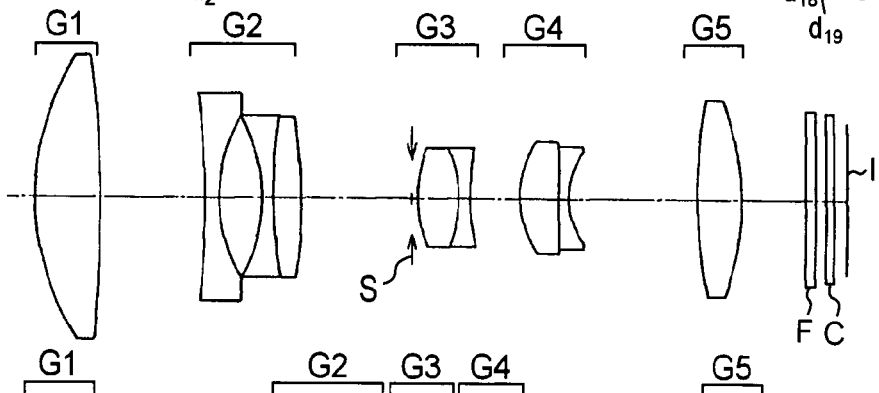
Figure 23C:
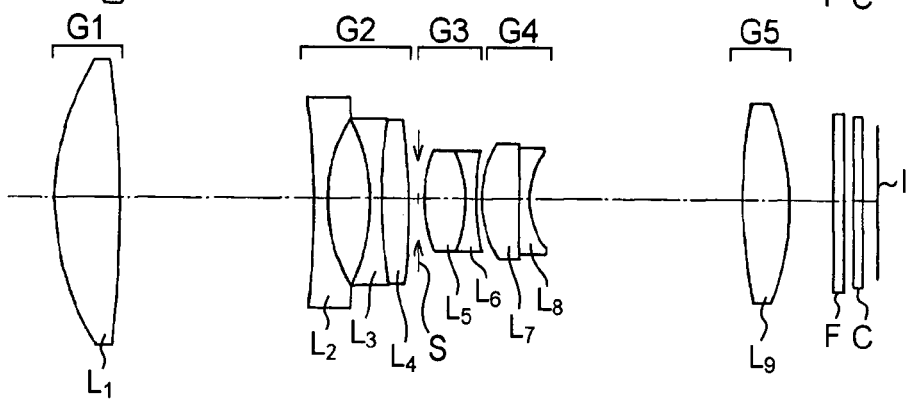

As shown in FIGS. 23A to 23C, a zoom lens system of Example 13 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During magnification change from a wide-angle end to a telephoto end, the first lens unit G1 moves toward the object side. The second lens unit G2 slightly moves toward the object side from the wide-angle end to an intermediate position, moves toward an image side from the intermediate position to the telephoto end, and is positioned closer to the image side in the telephoto end than in the wide-angle end. An aperture stop S and the third lens unit G3 integrally monotonously move toward the object side while reducing a space between the third lens unit and the second lens unit G2. The fourth lens unit G4 moves toward the object side while enlarging a space between the fourth lens unit and the third lens unit G3 from the wide-angle end to the intermediate position and reducing the space from the intermediate position to the telephoto end. The fifth lens unit G5 moves toward the image side.

The first lens unit G1 is constituted of a double convex positive lens. The second lens unit G2 includes, in order from the object side, a double concave negative lens, and a cemented lens of a double concave negative lens and a double convex positive lens. The third lens unit G3 is constituted of a cemented lens including a double convex positive lens and a double concave negative lens in order from the object side. The fourth lens unit G4 is constituted of a cemented lens including a double convex positive lens and a double concave negative lens in order from the object side. The fifth lens unit G5 is constituted of a double convex positive lens. The aperture stop S is positioned on the object side of the third lens unit G3 integrally with the third lens unit.

Aspherical surfaces are used on six surfaces including opposite surfaces of the double convex positive lens of the first lens unit G1, opposite surfaces of the double concave negative lens of the second lens unit G2 and the surfaces of the cemented lens of the third lens unit G3 closest to the object side and the image side.

Figure 24A:
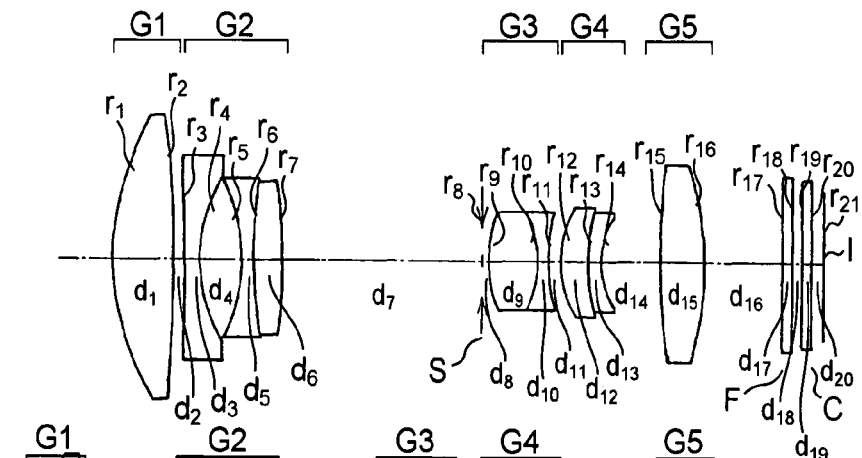
FIGS. 24A to 24C are sectional views of Example 14 of the present invention along an optical axis.
Figure 24B:
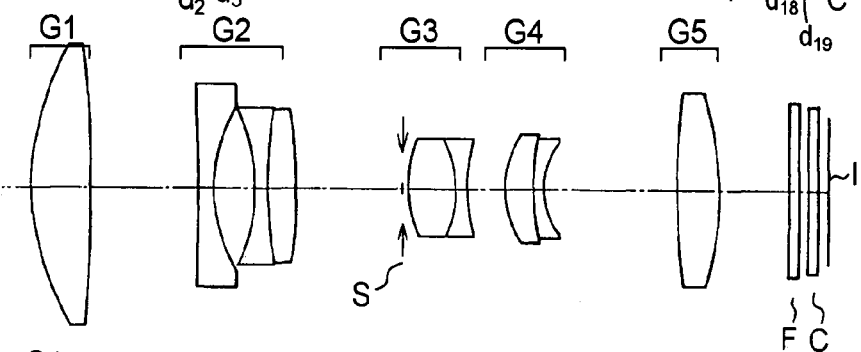
Figure 24C:
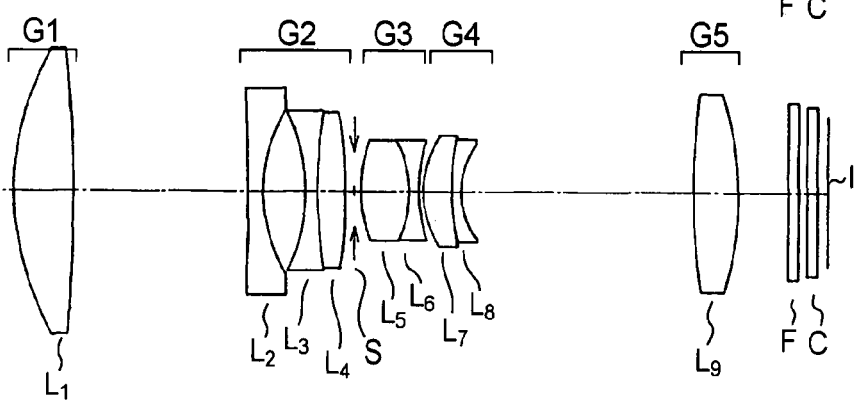

As shown in FIGS. 24A to 24C, a zoom lens system of Example 14 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During magnification change from a wide-angle end to a telephoto end, the first lens unit G1 moves toward the object side. The second lens unit G2 moves toward the image side. An aperture stop S and the third lens unit G3 integrally monotonously move toward the object side while reducing a space between the third lens unit and the second lens unit G2. The fourth lens unit G4 moves toward the object side while enlarging a space between the fourth lens unit and the third lens unit G3 from the wide-angle end to an intermediate position and reducing the space from the intermediate position to the telephoto end. The fifth lens unit G5 moves toward the image side.

The first lens unit G1 is constituted of a double convex positive lens. The second lens unit G2 includes, in order from the object side, a double concave negative lens, and a cemented lens of a double concave negative lens and a double convex positive lens. The third lens unit G3 is constituted of a cemented lens including a double convex positive lens and a double concave negative lens in order from the object side. The fourth lens unit G4 is constituted of a cemented lens including a positive meniscus lens whose convex surface faces the object side and a negative meniscus lens whose convex surface faces the object side. The fifth lens unit G5 is constituted of a double convex positive lens. The aperture stop S is positioned on the object side of the third lens unit G3 integrally with the third lens unit.

Aspherical surfaces are used on six surfaces including opposite surfaces of the double convex positive lens of the first lens unit G1, opposite surfaces of the double concave negative lens of the second lens unit G2 and the surfaces of the cemented lens of the third lens unit G3 closest to the object side and the image side.

Figure 25A:
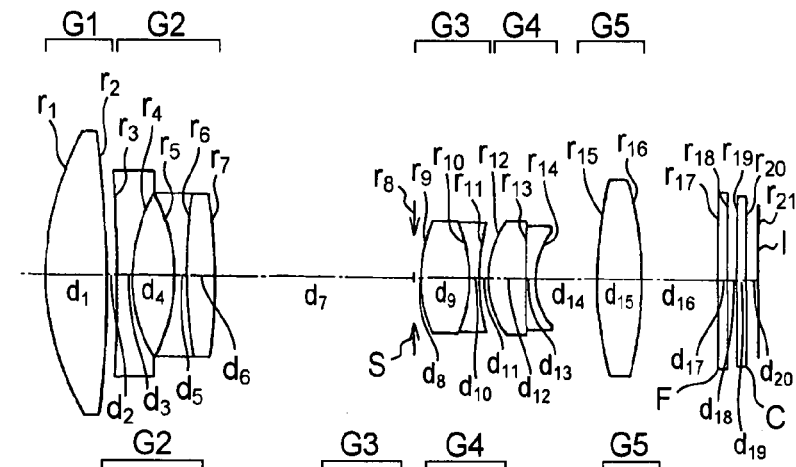
FIGS. 25A to 25C are sectional views of Example 15 of the present invention along an optical axis.
Figure 25B:
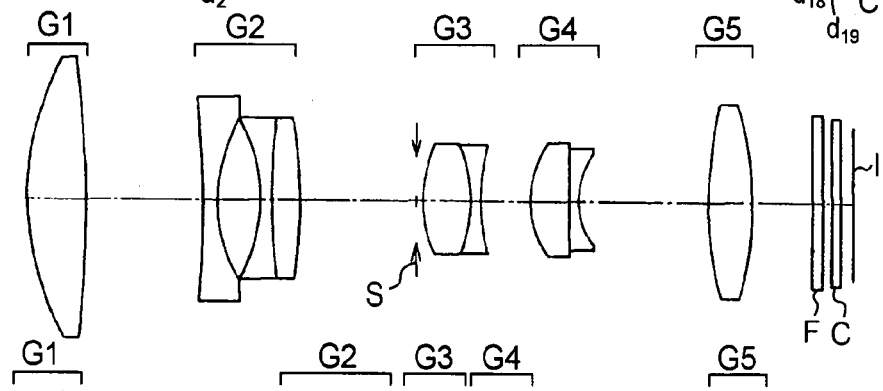
Figure 25C:
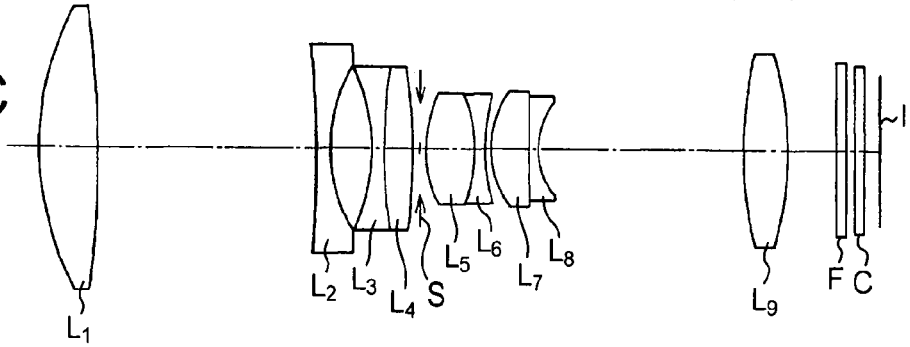

As shown in FIGS. 25A to 25C, a zoom lens system of Example 15 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During magnification change from a wide-angle end to a telephoto end, the first lens unit G1 moves toward the object side. The second lens unit G2 slightly moves toward the object side from the wide-angle end to an intermediate position, moves toward an image side from the intermediate position to the telephoto end, and is positioned closer to the image side in the telephoto end than in the wide-angle end. An aperture stop S and the third lens unit G3 integrally monotonously move toward the object side while reducing a space between the third lens unit and the second lens unit G2. The fourth lens unit G4 moves toward the object side while enlarging a space between the fourth lens unit and the third lens unit G3 from the wide-angle end to the intermediate position and reducing the space from the intermediate position to the telephoto end. The fifth lens unit G5 moves toward the image side.

The first lens unit G1 is constituted of a double convex positive lens. The second lens unit G2 includes, in order from the object side, a double concave negative lens, and a cemented lens of a double concave negative lens and a double convex positive lens. The third lens unit G3 is constituted of a cemented lens including a double convex positive lens and a double concave negative lens in order from the object side. The fourth lens unit G4 is constituted of a cemented lens including a double convex positive lens and a double concave negative lens in order from the object side. The fifth lens unit G5 is constituted of a double convex positive lens. The aperture stop S is positioned on the object side of the third lens unit G3 integrally with the third lens unit.

Aspherical surfaces are used on six surfaces including opposite surfaces of the double convex positive lens of the first lens unit G1, opposite surfaces of the double concave negative lens of the second lens unit G2 and the surfaces of the cemented lens of the third lens unit G3 closest to the object side and the image side.

Figure 26A:
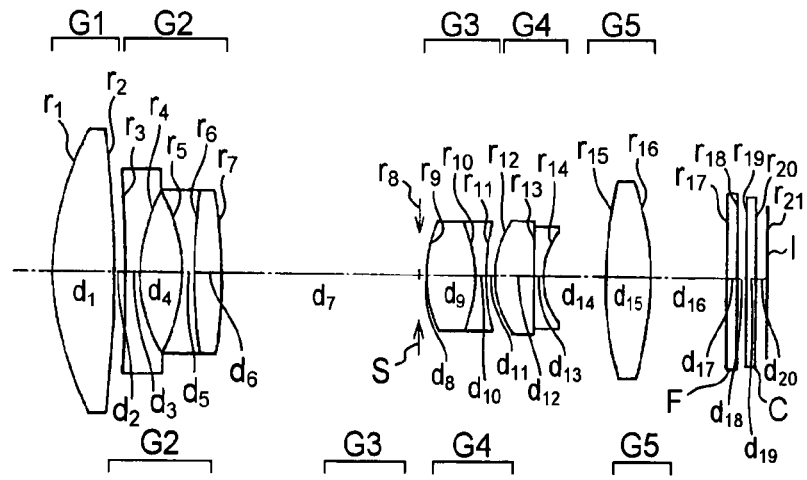
FIGS. 26A to 26C are sectional views of Example 16 of the present invention along an optical axis.
Figure 26B:
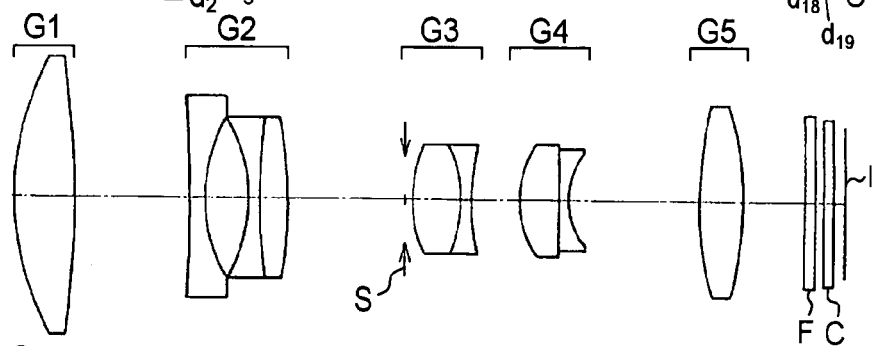
Figure 26C:
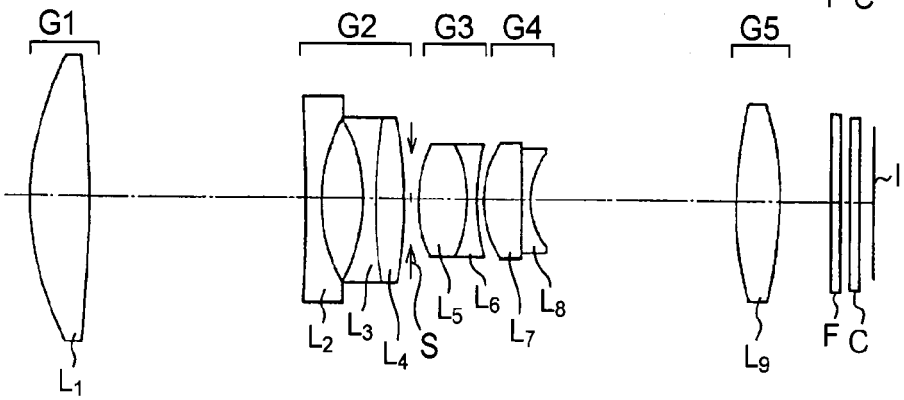

As shown in FIGS. 26A to 26C, a zoom lens system of Example 16 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During magnification change from a wide-angle end to a telephoto end, the first lens unit G1 moves toward the object side. The second lens unit G2 slightly moves toward the object side from the wide-angle end to an intermediate position, moves toward an image side from the intermediate position to the telephoto end, and is positioned closer to the image side in the telephoto end than in the wide-angle end. An aperture stop S and the third lens unit G3 integrally monotonously move toward the object side while reducing a space between the third lens unit and the second lens unit G2. The fourth lens unit G4 moves toward the object side while enlarging a space between the fourth lens unit and the third lens unit G3 from the wide-angle end to the intermediate position and reducing the space from the intermediate position to the telephoto end. The fifth lens unit G5 moves toward the image side.

The first lens unit G1 is constituted of a double convex positive lens. The second lens unit G2 includes, in order from the object side, a double concave negative lens, and a cemented lens of a double concave negative lens and a double convex positive lens. The third lens unit G3 is constituted of a cemented lens including a double convex positive lens and a double concave negative lens in order from the object side. The fourth lens unit G4 is constituted of a cemented lens including a double convex positive lens and a double concave negative lens in order from the object side. The fifth lens unit G5 is constituted of a double convex positive lens. The aperture stop S is positioned on the object side of the third lens unit G3 integrally with the third lens unit.

Aspherical surfaces are used on six surfaces including opposite surfaces of the double convex positive lens of the first lens unit G1, opposite surfaces of the double concave negative lens of the second lens unit G2 and the surfaces of the cemented lens of the third lens unit G3 closest to the object side and the image side.

Next, numerical data of Examples 11 to 16 will be described.

In these numerical data, $r_1, r_2 \ldots$ are radii of curvatures of lens surfaces; $d_1, d_2 \ldots$ are spaces between the lens surfaces; $n_{d1}, n_{d2} \ldots$ are refractive indices of the lenses for the d-line; and $v_{d1}, v_{d2} \ldots$ are the Abbe numbers of the lenses. Furthermore, Fno is the F-number, f is a focal length of the zoom lens system, and $2\omega$ is an angle of field ($\omega$ is a half angle of field). Moreover, WE is a wide-angle end, ST is an intermediate position and TE is a telephoto end. It is to be noted that a symbol * attached to a value of the radius of curvature indicates that the surface is an aspherical surface. The symbol (S) indicates that the surface is an aperture stop and the symbol (I) indicates that the surface is an image surface. A shape of the aspherical surface is represented by the following equation in a coordinate system in which an optical axis a z-axis, an intersection between the surface and the optical axis is an origin, and a y-axis is a direction passing through the origin and crossing the optical axis at right angles:

$$z=(y^2/R)/[1+\{1-(1+k)(y/R)^2\}^{1/2}]+A_4 y^4+A_6 y^6+A_8 y^8+A_{10} y^{10},$$

in which R is a paraxial radius of curvature, k is a conic constant, and $A_4, A_6, A_8$ and $A_{10}$ are 4-th, 6-th, 8-th and 10-th order aspherical coefficients. It is to be noted that these symbols are common to numerical data of the other examples described later.

EXAMPLE 11

| | | | |
|---|---|---|---|
| $r_1 = 13.131*$ | $d_1 = 3.17$ | $n_{d1} = 1.49700$ | $v_{d1} = 81.54$ |
| $r_2 = -145.288*$ | $d_2 =$ variable | | |
| $r_3 = -37.836*$ | $d_3 = 0.80$ | $n_{d2} = 1.80610$ | $v_{d2} = 40.92$ |
| $r_4 = 9.350*$ | $d_4 = 2.19$ | | |
| $r_5 = -8.965$ | $d_5 = 0.70$ | $n_{d3} = 1.58913$ | $v_{d3} = 61.14$ |
| $r_6 = 29.209$ | $d_6 = 1.48$ | $n_{d4} = 1.92286$ | $v_{d4} = 18.90$ |
| $r_7 = -28.126$ | $d_7 =$ variable | | |
| $r_8 = \infty$ (S) | $d_8 = 0.37$ | | |
| $r_9 = 17.925*$ | $d_9 = 1.59$ | $n_{d5} = 1.77377$ | $v_{d5} = 47.17$ |
| $r_{10} = -6.800$ | $d_{10} = 0.61$ | $n_{d6} = 1.78472$ | $v_{d6} = 25.68$ |
| $r_{11} = -19.935$ | $d_{11} =$ variable | | |
| $r_{12} = 4.410*$ | $d_{12} = 1.97$ | $n_{d7} = 1.76802$ | $v_{d7} = 49.24$ |
| $r_{13} = 11.157$ | $d_{13} = 0.51$ | $n_{d8} = 2.00069$ | $v_{d8} = 25.46$ |
| $r_{14} = 3.550$ | $d_{14} =$ variable | | |
| $r_{15} = 41.001$ | $d_{15} = 2.35$ | $n_{d9} = 1.80518$ | $v_{d9} = 25.42$ |
| $r_{16} = -14.105$ | $d_{16} =$ variable | | |
| $r_{17} = \infty$ | $d_{17} = 0.50$ | $n_{d10} = 1.54771$ | $v_{d10} = 62.84$ |
| $r_{18} = \infty$ | $d_{18} = 0.50$ | | |
| $r_{19} = \infty$ | $d_{19} = 0.50$ | $n_{d11} = 1.51633$ | $v_{d11} = 64.14$ |
| $r_{20} = \infty$ | $d_{20} = 0.60$ | | |
| $r_{21} = \infty$ (I) | | | |

Aspherical coefficient

| | 1st surface | 2nd surface | 3rd surface | 4th surface |
|---|---|---|---|---|
| K | 0.000 | 0.000 | 0.000 | −1.061 |
| $A_4$ | $-2.41125 \times 10^{-5}$ | $-6.80953 \times 10^{-6}$ | $3.50640 \times 10^{-4}$ | $3.44906 \times 10^{-4}$ |
| $A_6$ | $-3.21539 \times 10^{-7}$ | $-3.70482 \times 10^{-8}$ | $-4.49378 \times 10^{-6}$ | $1.17809 \times 10^{-5}$ |
| $A_8$ | 0 | 0 | $1.59282 \times 10^{-7}$ | $-2.58210 \times 10^{-7}$ |
| $A_{10}$ | 0 | 0 | $-2.37981 \times 10^{-9}$ | $2.30813 \times 10^{-8}$ |

| | 9th surface | 12th surface |
|---|---|---|
| K | 0.748 | −0.044 |
| $A_4$ | $-6.22558 \times 10^{-5}$ | $-1.42650 \times 10^{-4}$ |
| $A_6$ | $2.61058 \times 10^{-7}$ | $1.82011 \times 10^{-6}$ |
| $A_8$ | $2.30167 \times 10^{-7}$ | 0 |
| $A_{10}$ | $-1.23545 \times 10^{-7}$ | 0 |

Zoom Data ($\infty$)

| | WE | ST | TE |
|---|---|---|---|
| f (mm) | 6.62 | 14.58 | 31.74 |
| $F_{NO}$ | 3.31 | 4.38 | 5.16 |
| $2\omega$ (°) | 68.01 | 29.91 | 13.95 |
| $d_2$ | 0.57 | 5.03 | 9.28 |
| $d_7$ | 11.18 | 6.03 | 0.43 |
| $d_{11}$ | 0.38 | 2.69 | 0.22 |
| $d_{14}$ | 3.34 | 7.88 | 13.49 |
| $d_{16}$ | 4.54 | 3.23 | 2.28 |

EXAMPLE 12

| | | | |
|---|---|---|---|
| $r_1 = 13.726*$ | $d_1 = 3.17$ | $n_{d1} = 1.49700$ | $v_{d1} = 81.54$ |
| $r_2 = -85.837*$ | $d_2 =$ variable | | |
| $r_3 = -38.043*$ | $d_3 = 0.80$ | $n_{d2} = 1.80610$ | $v_{d2} = 40.92$ |
| $r_4 = 9.226*$ | $d_4 = 2.19$ | | |
| $r_5 = -9.230$ | $d_5 = 0.70$ | $n_{d3} = 1.58913$ | $v_{d3} = 61.14$ |
| $r_6 = 25.936$ | $d_6 = 1.48$ | $n_{d4} = 1.92286$ | $v_{d4} = 18.90$ |
| $r_7 = -36.175$ | $d_7 =$ variable | | |
| $r_8 = \infty$ (S) | $d_8 = 0.37$ | | |
| $r_9 = 7.800*$ | $d_9 = 2.22$ | $n_{d5} = 1.77377$ | $v_{d5} = 47.17$ |
| $r_{10} = -6.800$ | $d_{10} = 0.61$ | $n_{d6} = 1.68893$ | $v_{d6} = 31.16$ |
| $r_{11} = 20.470*$ | $d_{11} =$ variable | | |
| $r_{12} = 5.311$ | $d_{12} = 2.07$ | $n_{d7} = 1.88300$ | $v_{d7} = 40.76$ |
| $r_{13} = -1158.189$ | $d_{13} = 0.51$ | $n_{d8} = 2.00069$ | $v_{d8} = 25.46$ |
| $r_{14} = 4.141$ | $d_{14} =$ variable | | |

-continued

| | | | |
|---|---|---|---|
| $r_{15} = 30.007$ | $d_{15} = 2.35$ | $n_{d9} = 1.80518$ | $\nu_{d9} = 25.42$ |
| $r_{16} = -14.743$ | $d_{16}$ = variable | | |
| $r_{17} = \infty$ | $d_{17} = 0.50$ | $n_{d10} = 1.54771$ | $\nu_{d10} = 62.84$ |
| $r_{18} = \infty$ | $d_{18} = 0.50$ | | |
| $r_{19} = \infty$ | $d_{19} = 0.50$ | $n_{d11} = 1.51633$ | $\nu_{d11} = 64.14$ |
| $r_{20} = \infty$ | $d_{20} = 0.60$ | | |
| $r_{21} = \infty$ (I) | | | |

Aspherical coefficient

| | 1st surface | 2nd surface | 3rd surface | 4th surface |
|---|---|---|---|---|
| K | 0.000 | 0.000 | 0.000 | −1.570 |
| $A_4$ | $-1.82405 \times 10^{-5}$ | $6.18637 \times 10^{-6}$ | $3.72444 \times 10^{-4}$ | $5.05344 \times 10^{-4}$ |
| $A_6$ | $-2.53266 \times 10^{-7}$ | $-6.21578 \times 10^{-8}$ | $-4.17444 \times 10^{-6}$ | $1.07045 \times 10^{-5}$ |
| $A_8$ | 0 | 0 | $8.99176 \times 10^{-8}$ | $8.83402 \times 10^{-9}$ |
| $A_{10}$ | 0 | 0 | $-1.56083 \times 10^{-9}$ | $8.19063 \times 10^{-9}$ |

| | 9th surface | 11th surface |
|---|---|---|
| K | −0.939 | 0.000 |
| $A_4$ | $7.47118 \times 10^{-4}$ | $1.47264 \times 10^{-3}$ |
| $A_6$ | $1.87059 \times 10^{-5}$ | $4.28950 \times 10^{-5}$ |
| $A_8$ | $-5.14211 \times 10^{-7}$ | 0 |
| $A_{10}$ | $-8.51175 \times 10^{-8}$ | 0 |

Zoom Data ($\infty$)

| | WE | ST | TE |
|---|---|---|---|
| f (mm) | 6.62 | 14.22 | 31.73 |
| $F_{NO}$ | 3.41 | 4.35 | 5.02 |
| 2ω (°) | 67.57 | 30.38 | 13.84 |
| $d_2$ | 0.57 | 5.04 | 9.51 |
| $d_7$ | 11.02 | 6.00 | 0.43 |
| $d_{11}$ | 0.40 | 2.60 | 0.22 |
| $d_{14}$ | 3.33 | 6.79 | 11.99 |
| $d_{16}$ | 4.05 | 3.45 | 2.87 |

EXAMPLE 13

| | | | |
|---|---|---|---|
| $r_1 = 12.998^*$ | $d_1 = 3.45$ | $n_{d1} = 1.43875$ | $\nu_{d1} = 94.93$ |
| $r_2 = -56.964^*$ | $d_2$ = variable | | |
| $r_3 = -29.930^*$ | $d_3 = 0.80$ | $n_{d2} = 1.80610$ | $\nu_{d2} = 40.92$ |
| $r_4 = 9.186^*$ | $d_4 = 2.19$ | | |
| $r_5 = -9.158$ | $d_5 = 0.70$ | $n_{d3} = 1.58913$ | $\nu_{d3} = 61.14$ |
| $r_6 = 27.313$ | $d_6 = 1.48$ | $n_{d4} = 1.92286$ | $\nu_{d4} = 18.90$ |
| $r_7 = -29.143$ | $d_7$ = variable | | |
| $r_8 = \infty$ (S) | $d_8 = 0.37$ | | |
| $r_9 = 7.800^*$ | $d_9 = 2.20$ | $n_{d5} = 1.77377$ | $\nu_{d5} = 47.17$ |
| $r_{10} = -6.800$ | $d_{10} = 0.61$ | $n_{d6} = 1.68893$ | $\nu_{d6} = 31.16$ |
| $r_{11} = 20.540^*$ | $d_{11}$ = variable | | |
| $r_{12} = 5.367$ | $d_{12} = 2.08$ | $n_{d7} = 1.88300$ | $\nu_{d7} = 40.76$ |
| $r_{13} = -114.106$ | $d_{13} = 0.51$ | $n_{d8} = 2.00069$ | $\nu_{d8} = 25.46$ |
| $r_{14} = 4.180$ | $d_{14}$ = variable | | |
| $r_{15} = 28.481$ | $d_{15} = 2.35$ | $n_{d9} = 1.80518$ | $\nu_{d9} = 25.42$ |
| $r_{16} = -14.752$ | $d_{16}$ = variable | | |
| $r_{17} = \infty$ | $d_{17} = 0.50$ | $n_{d10} = 1.54771$ | $\nu_{d10} = 62.84$ |
| $r_{18} = \infty$ | $d_{18} = 0.50$ | | |
| $r_{19} = \infty$ | $d_{19} = 0.50$ | $n_{d11} = 1.51633$ | $\nu_{d11} = 64.14$ |
| $r_{20} = \infty$ | $d_{20} = 0.62$ | | |
| $r_{21} = \infty$ (I) | | | |

Aspherical coefficient

| | 1st surface | 2nd surface | 3rd surface | 4th surface |
|---|---|---|---|---|
| K | 0.000 | 0.000 | 0.000 | −0.854 |
| $A_4$ | $-2.35458 \times 10^{-5}$ | $1.27194 \times 10^{-5}$ | $3.93377 \times 10^{-4}$ | $3.85073 \times 10^{-4}$ |
| $A_6$ | $-2.41873 \times 10^{-7}$ | $-1.28219 \times 10^{-8}$ | $-4.71194 \times 10^{-6}$ | $1.09184 \times 10^{-5}$ |
| $A_8$ | 0 | 0 | $7.44028 \times 10^{-8}$ | $-6.06903 \times 10^{-9}$ |
| $A_{10}$ | 0 | 0 | $-1.26789 \times 10^{-9}$ | $3.00577 \times 10^{-9}$ |

-continued

|  | 9th surface | 11th surface |
|---|---|---|
| K | −0.890 | 0.000 |
| $A_4$ | $7.37916 \times 10^{-4}$ | $1.45721 \times 10^{-3}$ |
| $A_6$ | $1.63555 \times 10^{-5}$ | $4.23048 \times 10^{-5}$ |
| $A_8$ | $-1.04707 \times 10^{-7}$ | 0 |
| $A_{10}$ | $-1.09038 \times 10^{-7}$ | 0 |

Zoom Data (∞)

|  | WE | ST | TE |
|---|---|---|---|
| f (mm) | 6.62 | 14.42 | 31.74 |
| $F_{NO}$ | 3.41 | 4.35 | 4.88 |
| 2ω (°) | 67.98 | 30.01 | 13.77 |
| $d_2$ | 0.57 | 5.41 | 10.11 |
| $d_7$ | 10.77 | 5.89 | 0.43 |
| $d_{11}$ | 0.47 | 2.62 | 0.25 |
| $d_{14}$ | 3.35 | 6.91 | 11.39 |
| $d_{16}$ | 4.04 | 3.32 | 2.52 |

EXAMPLE 14

| | | | |
|---|---|---|---|
| $r_1 = 14.006*$ | $d_1 = 3.21$ | $n_{d1} = 1.49700$ | $v_{d1} = 81.54$ |
| $r_2 = -63.961*$ | $d_2$ = variable | | |
| $r_3 = -62.128*$ | $d_3 = 0.80$ | $n_{d2} = 1.80610$ | $v_{d2} = 40.92$ |
| $r_4 = 8.732*$ | $d_4 = 2.19$ | | |
| $r_5 = -9.634$ | $d_5 = 0.71$ | $n_{d3} = 1.69680$ | $v_{d3} = 55.53$ |
| $r_6 = 27.040$ | $d_6 = 1.51$ | $n_{d4} = 1.92286$ | $v_{d4} = 18.90$ |
| $r_7 = -27.632$ | $d_7$ = variable | | |
| $r_8 = \infty$ (S) | $d_8 = 0.37$ | | |
| $r_9 = 7.059*$ | $d_9 = 2.61$ | $n_{d5} = 1.77377$ | $v_{d5} = 47.17$ |
| $r_{10} = -5.168$ | $d_{10} = 0.60$ | $n_{d6} = 1.68893$ | $v_{d6} = 31.16$ |
| $r_{11} = 13.827*$ | $d_{11}$ = variable | | |
| $r_{12} = 5.051$ | $d_{12} = 1.62$ | $n_{d7} = 1.81600$ | $v_{d7} = 46.62$ |
| $r_{13} = 12.402$ | $d_{13} = 0.50$ | $n_{d8} = 2.00069$ | $v_{d8} = 25.46$ |
| $r_{14} = 4.165$ | $d_{14}$ = variable | | |
| $r_{15} = 38.360$ | $d_{15} = 2.35$ | $n_{d9} = 2.00069$ | $v_{d9} = 25.46$ |
| $r_{16} = -17.347$ | $d_{16}$ = variable | | |
| $r_{17} = \infty$ | $d_{17} = 0.50$ | $n_{d10} = 1.54771$ | $v_{d10} = 62.84$ |
| $r_{18} = \infty$ | $d_{18} = 0.50$ | | |
| $r_{19} = \infty$ | $d_{19} = 0.50$ | $n_{d11} = 1.51633$ | $v_{d11} = 64.14$ |
| $r_{20} = \infty$ | $d_{20} = 0.61$ | | |
| $r_{21} = \infty$ (I) | | | |

Aspherical coefficient

|  | 1st surface | 2nd surface | 3rd surface | 4th surface |
|---|---|---|---|---|
| K | 0.000 | 0.000 | 0.000 | −1.404 |
| $A_4$ | $-1.80006 \times 10^{-5}$ | $1.72341 \times 10^{-5}$ | $3.30809 \times 10^{-4}$ | $5.12084 \times 10^{-4}$ |
| $A_6$ | $-1.32046 \times 10^{-7}$ | $-4.04260 \times 10^{-8}$ | $-6.93335 \times 10^{-6}$ | $2.34364 \times 10^{-6}$ |
| $A_8$ | 0 | 0 | $1.83679 \times 10^{-7}$ | $2.19326 \times 10^{-7}$ |
| $A_{10}$ | 0 | 0 | $-2.54736 \times 10^{-9}$ | $1.22205 \times 10^{-9}$ |

|  | 9th surface | 11th surface |
|---|---|---|
| K | −3.142 | 0.000 |
| $A_4$ | $1.44837 \times 10^{-3}$ | $1.60777 \times 10^{-3}$ |
| $A_6$ | $-1.26704 \times 10^{-5}$ | $4.12926 \times 10^{-5}$ |
| $A_8$ | $5.36646 \times 10^{-7}$ | 0 |
| $A_{10}$ | $-1.42543 \times 10^{-7}$ | 0 |

Zoom Data (∞)

|  | WE | ST | TE |
|---|---|---|---|
| f (mm) | 6.61 | 14.94 | 31.74 |
| $F_{NO}$ | 3.37 | 4.23 | 5.00 |
| 2ω (°) | 65.48 | 28.47 | 13.73 |
| $d_2$ | 0.57 | 5.62 | 9.27 |
| $d_7$ | 10.77 | 5.68 | 0.43 |

-continued

|  |  |  |  |
|---|---|---|---|
| $d_{11}$ | 0.48 | 1.92 | 0.15 |
| $d_{14}$ | 3.35 | 7.18 | 12.47 |
| $d_{16}$ | 4.23 | 3.63 | 2.68 |

EXAMPLE 15

| | | | |
|---|---|---|---|
| $r_1 = 14.666*$ | $d_1 = 3.20$ | $n_{d1} = 1.43875$ | $v_{d1} = 94.93$ |
| $r_2 = -54.521*$ | $d_2 = $ variable | | |
| $r_3 = -38.229*$ | $d_3 = 0.80$ | $n_{d2} = 1.80610$ | $v_{d2} = 40.92$ |
| $r_4 = 9.630*$ | $d_4 = 2.19$ | | |
| $r_5 = -8.740$ | $d_5 = 0.70$ | $n_{d3} = 1.58913$ | $v_{d3} = 61.14$ |
| $r_6 = 32.581$ | $d_6 = 1.48$ | $n_{d4} = 1.92286$ | $v_{d4} = 18.90$ |
| $r_7 = -27.615$ | $d_7 = $ variable | | |
| $r_8 = \infty$ (S) | $d_8 = 0.37$ | | |
| $r_9 = 7.800*$ | $d_9 = 2.57$ | $n_{d5} = 1.77377$ | $v_{d5} = 47.17$ |
| $r_{10} = -6.800$ | $d_{10} = 0.61$ | $n_{d6} = 1.68893$ | $v_{d6} = 31.16$ |
| $r_{11} = 19.246*$ | $d_{11} = $ variable | | |
| $r_{12} = 5.370$ | $d_{12} = 2.06$ | $n_{d7} = 1.88300$ | $v_{d7} = 40.76$ |
| $r_{13} = -129.784$ | $d_{13} = 0.51$ | $n_{d8} = 2.00069$ | $v_{d8} = 25.46$ |
| $r_{14} = 4.191$ | $d_{14} = $ variable | | |
| $r_{15} = 20.499$ | $d_{15} = 2.35$ | $n_{d9} = 1.80518$ | $v_{d9} = 25.42$ |
| $r_{16} = -17.739$ | $d_{16} = $ variable | | |
| $r_{17} = \infty$ | $d_{17} = 0.50$ | $n_{d10} = 1.54771$ | $v_{d10} = 62.84$ |
| $r_{18} = \infty$ | $d_{18} = 0.50$ | | |
| $r_{19} = \infty$ | $d_{19} = 0.50$ | $n_{d11} = 1.51633$ | $v_{d11} = 64.14$ |
| $r_{20} = \infty$ | $d_{20} = 0.61$ | | |
| $r_{21} = \infty$ (I) | | | |

| Aspherical coefficient | | | |
|---|---|---|---|
| | 1st surface | 2nd surface | 3rd surface | 4th surface |
| K | 0.000 | 0.000 | 0.000 | −0.584 |
| $A_4$ | $-1.81359 \times 10^{-5}$ | $1.01441 \times 10^{-5}$ | $2.78275 \times 10^{-4}$ | $2.50636 \times 10^{-4}$ |
| $A_6$ | $-1.31494 \times 10^{-7}$ | $-3.08880 \times 10^{-9}$ | $-3.87019 \times 10^{-6}$ | $2.47399 \times 10^{-6}$ |
| $A_8$ | 0 | 0 | $1.47604 \times 10^{-7}$ | $2.47163 \times 10^{-7}$ |
| $A_{10}$ | 0 | 0 | $-2.32474 \times 10^{-9}$ | $4.96916 \times 10^{-9}$ |

| | 9th surface | 11th surface |
|---|---|---|
| K | −0.811 | 0.000 |
| $A_4$ | $5.56562 \times 10^{-4}$ | $1.25468 \times 10^{-3}$ |
| $A_6$ | $1.18629 \times 10^{-5}$ | $3.36566 \times 10^{-5}$ |
| $A_8$ | $-2.52008 \times 10^{-7}$ | 0 |
| $A_{10}$ | $-2.82755 \times 10^{-8}$ | 0 |

| Zoom Data ($\infty$) | | | |
|---|---|---|---|
| | WE | ST | TE |
| f (mm) | 6.61 | 14.27 | 31.75 |
| $F_{NO}$ | 2.80 | 3.58 | 3.91 |
| $2\omega$ (°) | 67.73 | 29.93 | 13.57 |
| $d_2$ | 0.57 | 6.16 | 11.61 |
| $d_7$ | 10.77 | 6.27 | 0.43 |
| $d_{11}$ | 0.38 | 2.63 | 0.28 |
| $d_{14}$ | 3.32 | 6.97 | 11.00 |
| $d_{16}$ | 4.04 | 3.21 | 2.75 |

EXAMPLE 16

| | | | |
|---|---|---|---|
| $r_1 = 14.558*$ | $d_1 = 3.24$ | $n_{d1} = 1.43875$ | $v_{d1} = 94.93$ |
| $r_2 = -52.051*$ | $d_2 = $ variable | | |
| $r_3 = -44.850*$ | $d_3 = 0.80$ | $n_{d2} = 1.88300$ | $v_{d2} = 40.76$ |
| $r_4 = 9.992*$ | $d_4 = 2.19$ | | |
| $r_5 = -8.538$ | $d_5 = 0.70$ | $n_{d3} = 1.58913$ | $v_{d3} = 61.14$ |

-continued

| | | | |
|---|---|---|---|
| $r_6 = 35.581$ | $d_6 = 1.47$ | $n_{d4} = 1.92286$ | $v_{d4} = 18.90$ |
| $r_7 = -25.525$ | $d_7 = $ variable | | |
| $r_8 = \infty$ (S) | $d_8 = 0.37$ | | |
| $r_9 = 7.800^*$ | $d_9 = 2.60$ | $n_{d5} = 1.77377$ | $v_{d5} = 47.17$ |
| $r_{10} = -6.800$ | $d_{10} = 0.60$ | $n_{d6} = 1.68893$ | $v_{d6} = 31.16$ |
| $r_{11} = 19.250^*$ | $d_{11} = $ variable | | |
| $r_{12} = 5.360$ | $d_{12} = 2.10$ | $n_{d7} = 1.88300$ | $v_{d7} = 40.76$ |
| $r_{13} = -93.009$ | $d_{13} = 0.50$ | $n_{d8} = 2.00069$ | $v_{d8} = 25.46$ |
| $r_{14} = 4.176$ | $d_{14} = $ variable | | |
| $r_{15} = 20.185$ | $d_{15} = 2.35$ | $n_{d9} = 1.80518$ | $v_{d9} = 25.42$ |
| $r_{16} = -18.062$ | $d_{16} = $ variable | | |
| $r_{17} = \infty$ | $d_{17} = 0.50$ | $n_{d10} = 1.54771$ | $v_{d10} = 62.84$ |
| $r_{18} = \infty$ | $d_{18} = 0.50$ | | |
| $r_{19} = \infty$ | $d_{19} = 0.50$ | $n_{d11} = 1.51633$ | $v_{d11} = 64.14$ |
| $r_{20} = \infty$ | $d_{20} = 0.60$ | | |
| $r_{21} = \infty$ (I) | | | |

Aspherical coefficient

| | 1st surface | 2nd surface | 3rd surface | 4th surface |
|---|---|---|---|---|
| K | 0.000 | 0.000 | 0.000 | −0.619 |
| $A_4$ | $-1.83244 \times 10^{-5}$ | $1.21730 \times 10^{-5}$ | $2.39553 \times 10^{-4}$ | $2.24098 \times 10^{-4}$ |
| $A_6$ | $-1.28024 \times 10^{-7}$ | $-3.83119 \times 10^{-9}$ | $-2.82074 \times 10^{-6}$ | $1.75073 \times 10^{-6}$ |
| $A_8$ | 0 | 0 | $1.20596 \times 10^{-7}$ | $3.08030 \times 10^{-7}$ |
| $A_{10}$ | 0 | 0 | $-2.14299 \times 10^{-9}$ | $-6.71731 \times 10^{-10}$ |

| | 9th surface | 11th surface |
|---|---|---|
| K | −0.785 | 0.000 |
| $A_4$ | $5.49617 \times 10^{-4}$ | $1.25458 \times 10^{-3}$ |
| $A_6$ | $1.15403 \times 10^{-5}$ | $3.33752 \times 10^{-5}$ |
| $A_8$ | $-2.60160 \times 10^{-7}$ | 0 |
| $A_{10}$ | $-2.62162 \times 10^{-8}$ | 0 |

Zoom Data (∞)

| | WE | ST | TE |
|---|---|---|---|
| f (mm) | 6.61 | 14.22 | 31.76 |
| $F_{NO}$ | 2.80 | 3.57 | 3.89 |
| 2ω (°) | 67.64 | 29.95 | 13.54 |
| $d_2$ | 0.57 | 6.12 | 11.47 |
| $d_7$ | 10.66 | 6.30 | 0.43 |
| $d_{11}$ | 0.39 | 2.63 | 0.29 |
| $d_{14}$ | 3.32 | 6.96 | 10.94 |
| $d_{16}$ | 4.06 | 3.22 | 2.83 |

Figure 27A:
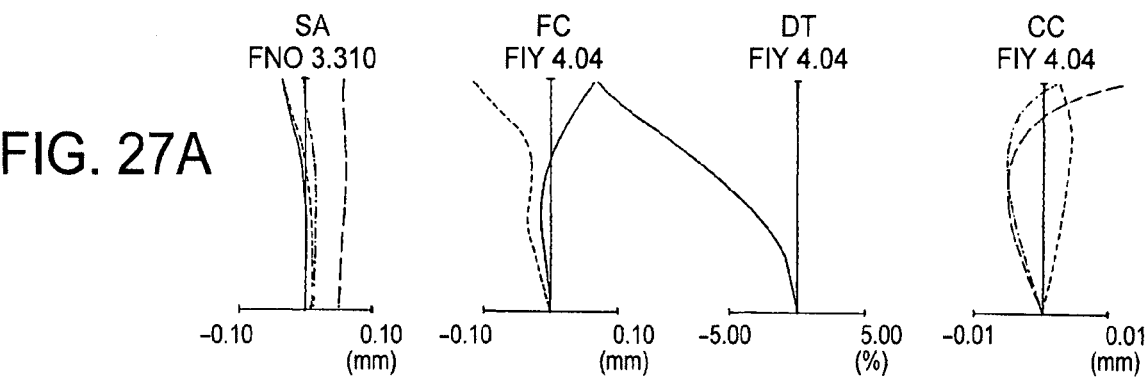
FIGS. 27A to 27C are aberration diagrams showing a spherical aberration (SA), an astigmatism (FC), a distortion (DT) and a chromatic aberration of magnification (CC) of Example 11 when focused on an infinite object.
Figure 27B:
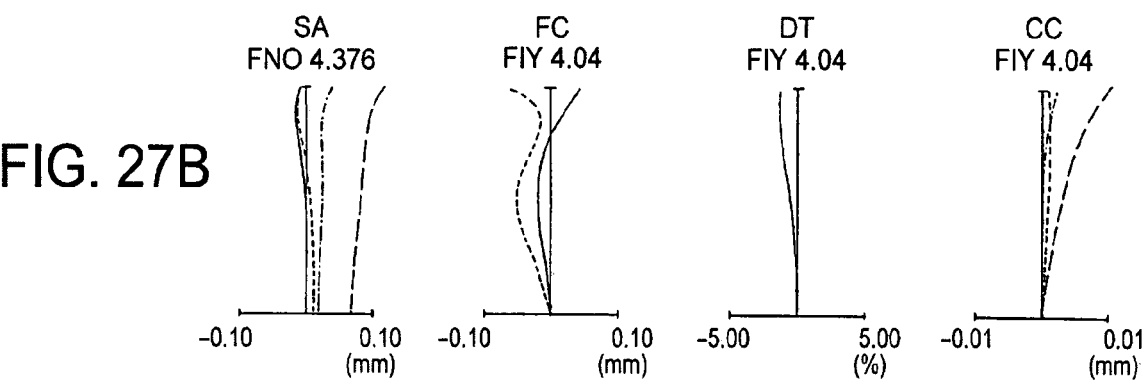
Figure 27C:
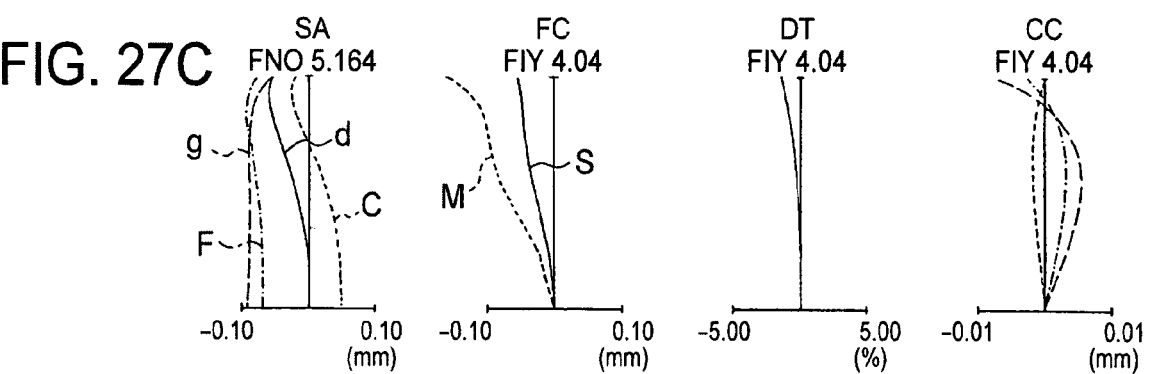
Figure 28A:
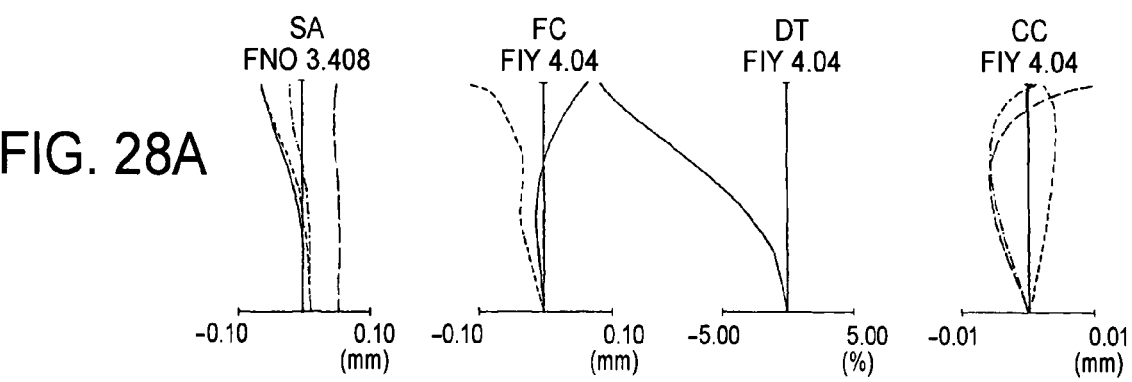
FIGS. 28A to 28C are aberration diagrams showing a spherical aberration (SA), an astigmatism (FC), a distortion (DT) and a chromatic aberration of magnification (CC) of Example 12 when focused on an infinite object.
Figure 28B:
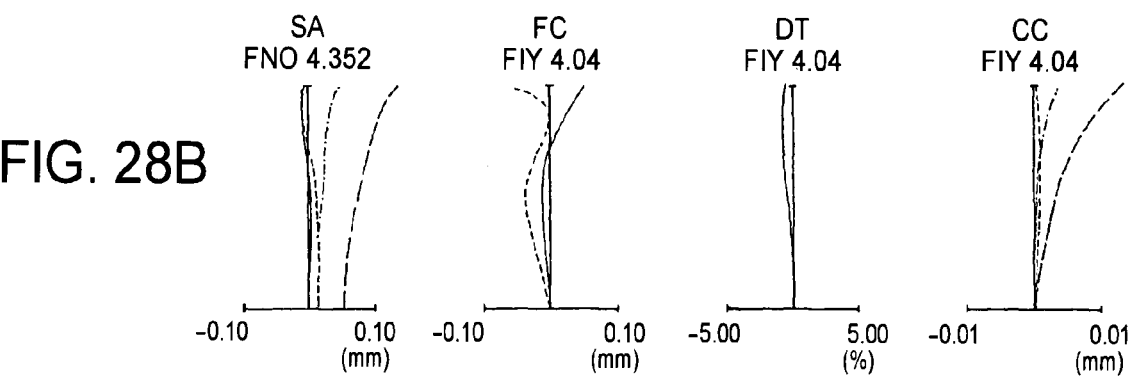
Figure 28C:
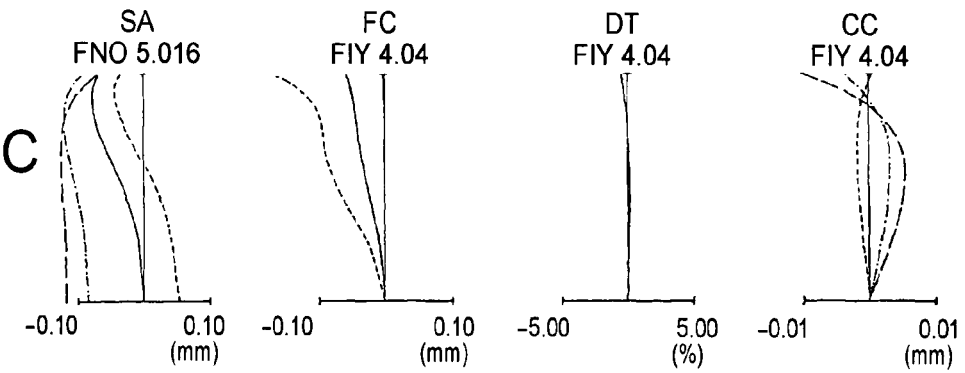
Figure 29A:
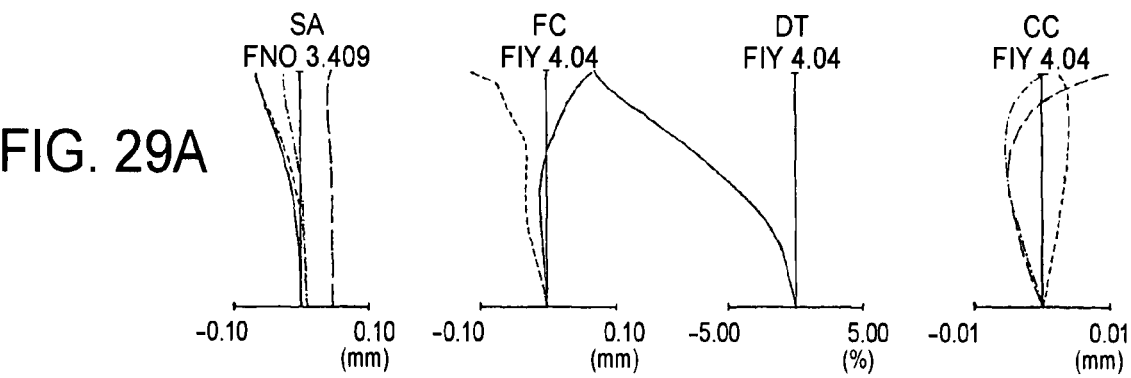
FIGS. 29A to 29C are aberration diagrams showing a spherical aberration (SA), an astigmatism (FC), a distortion (DT) and a chromatic aberration of magnification (CC) of Example 13 when focused on an infinite object.
Figure 29B:
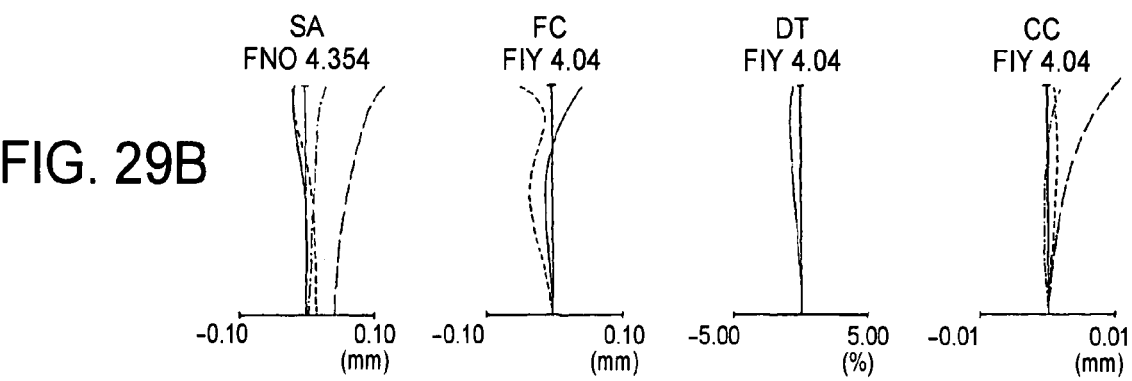
Figure 29C:
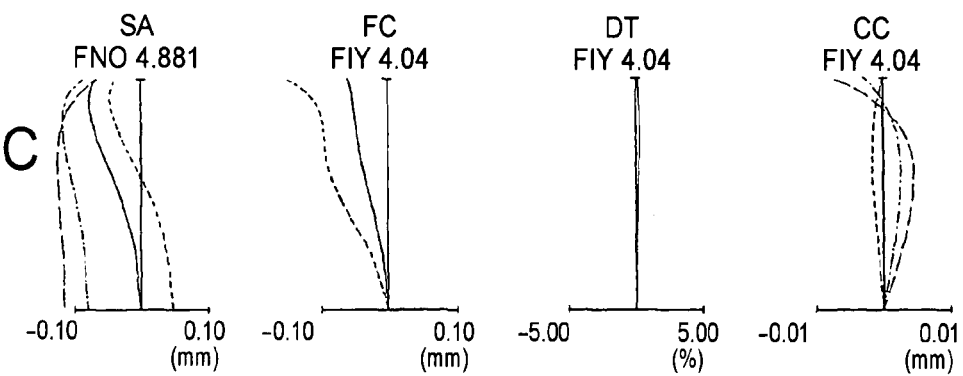
Figure 30A:
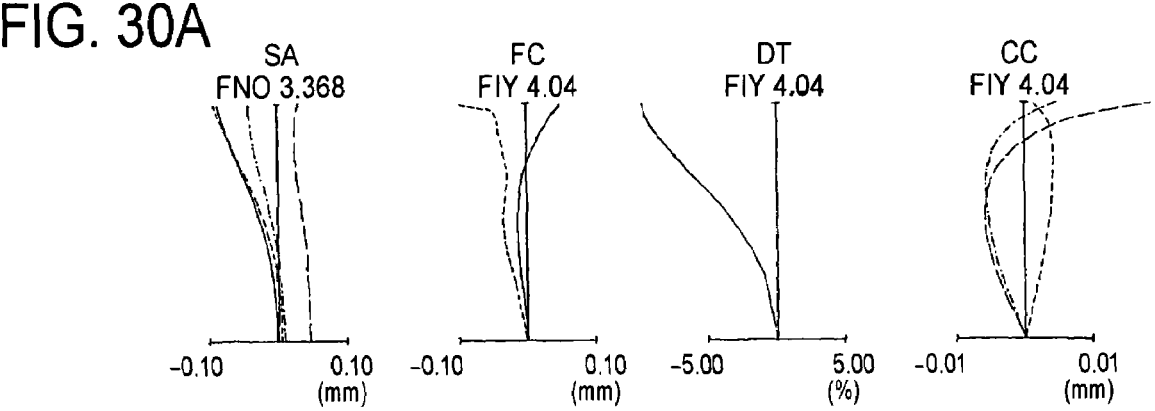
FIGS. 30A to 30C are aberration diagrams showing a spherical aberration (SA), an astigmatism (FC), a distortion (DT) and a chromatic aberration of magnification (CC) of Example 14 when focused on an infinite object.
Figure 30B:
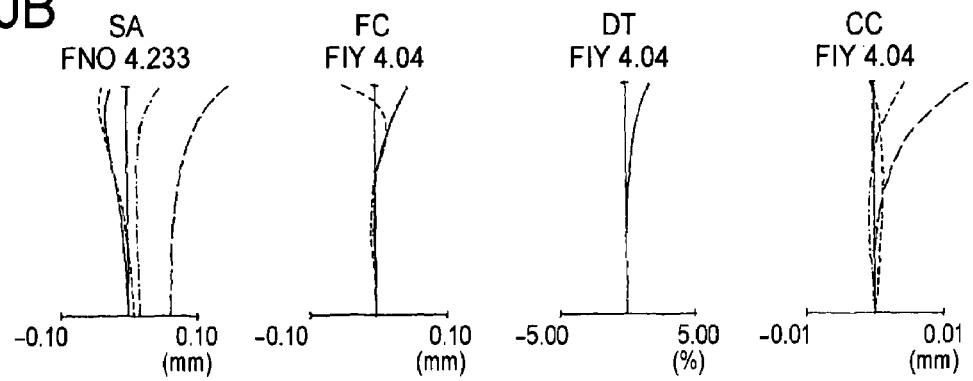
Figure 30C:
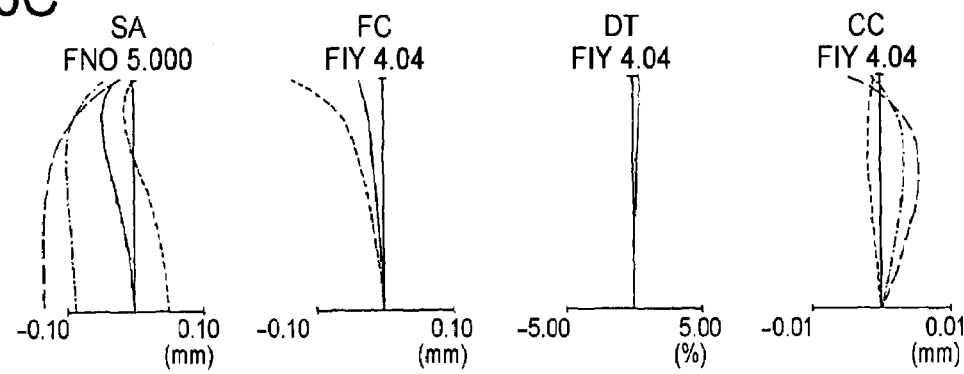
Figure 31A:
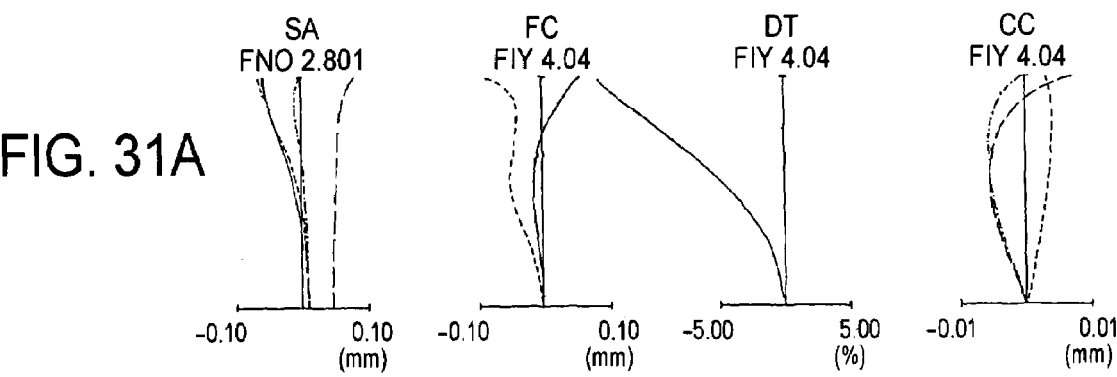
FIGS. 31A to 31C are aberration diagrams showing a spherical aberration (SA), an astigmatism (FC), a distortion (DT) and a chromatic aberration of magnification (CC) of Example 15 when focused on an infinite object.
Figure 31B:
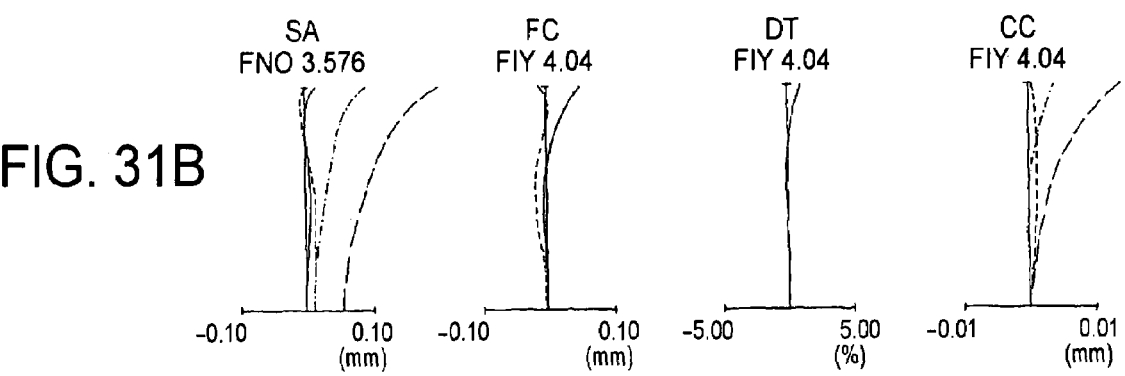
Figure 31C:
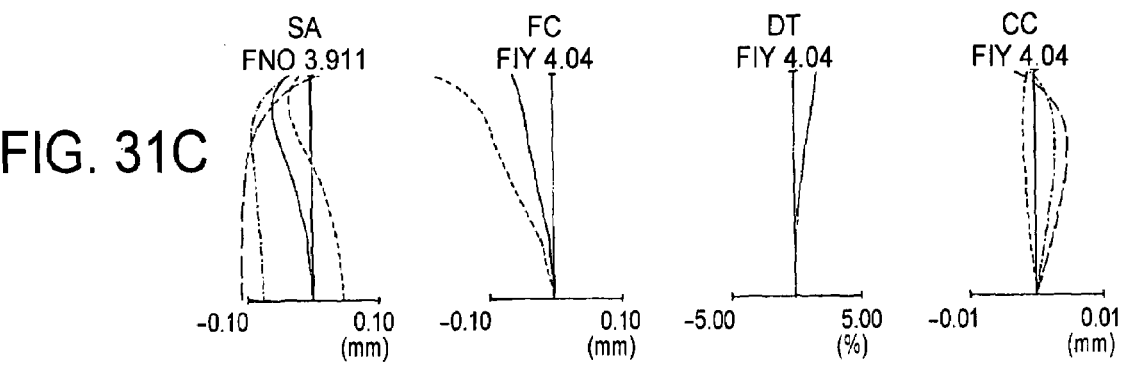
Figure 32A:
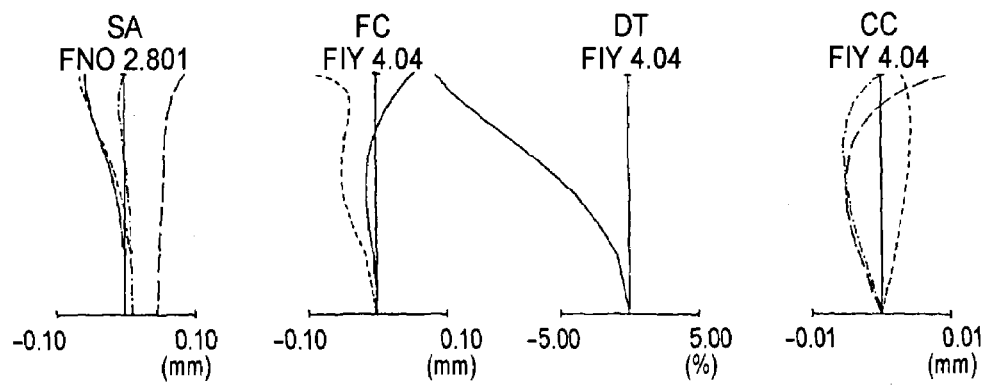
FIGS. 32A to 32C are aberration diagrams showing a spherical aberration (SA), an astigmatism (FC), a distortion (DT) and a chromatic aberration of magnification (CC) of Example 16 when focused on an infinite object.
Figure 32B:
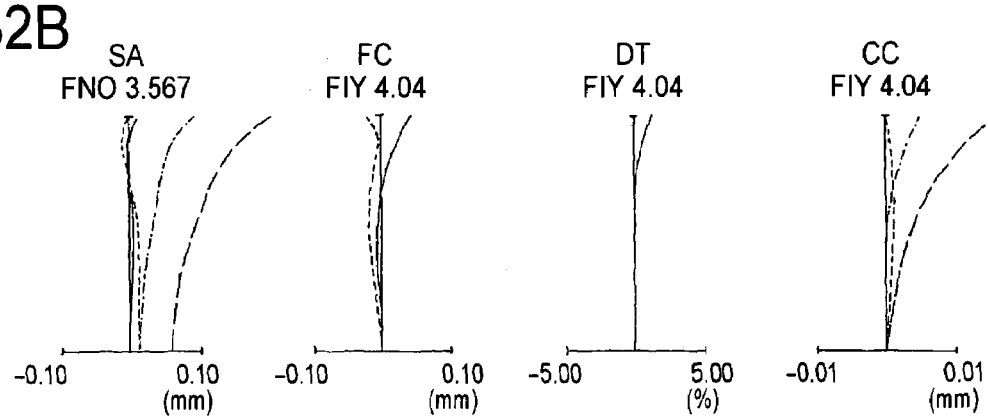
Figure 32C:
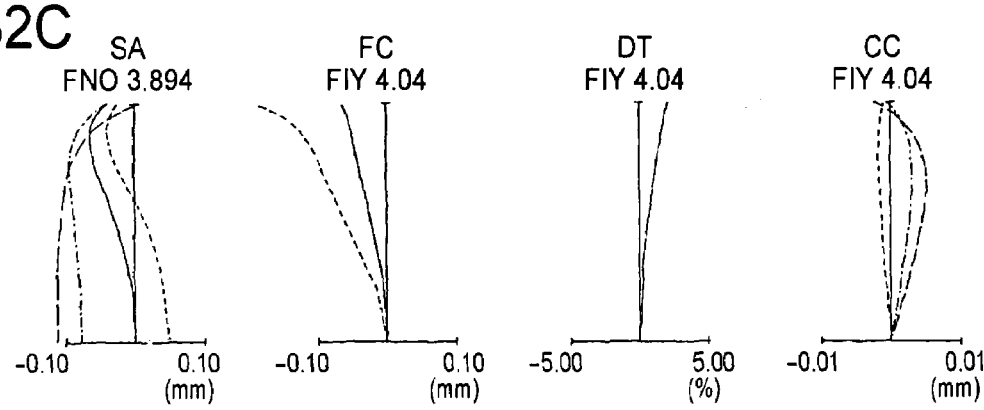

Aberration diagrams of Examples 11 to 16 when focused on the infinite object as described above are shown in FIGS. 27A to 32C. Among these aberration diagrams, FIGS. 27A, 28A, . . . show a spherical aberration (SA), an astigmatism (FC), a distortion (DT) and a chromatic aberration of magnification (CC) in a wide-angle end, FIGS. 27B, 28B, . . . show the aberrations in an intermediate position and FIGS. 27C, 28C, . . . show the aberrations in a telephoto end. In the drawings, "FIY" is a maximum image height.

Next, values of the conditions (1C) to (17C) in the above examples will be described.

| Condition | Ex11 | Ex12 | Ex13 | Ex14 | Ex15 | Ex16 |
|---|---|---|---|---|---|---|
| (1C) | 5.720 | 5.727 | 5.752 | 5.745 | 5.750 | 5.753 |
| (2C) | 1.371 | 1.373 | 1.372 | 1.373 | 1.418 | 1.416 |
| (3C) | 81.540 | 81.540 | 94.930 | 81.540 | 94.930 | 94.930 |
| (4C) | −0.834 | −0.724 | −0.628 | −0.641 | −0.576 | −0.563 |
| (5C) | 1.806 | 1.806 | 1.806 | 1.806 | 1.806 | 1.883 |
| (6C) | 1.923 | 1.923 | 1.923 | 1.923 | 1.923 | 1.923 |
| (7C) | 40.920 | 40.920 | 40.920 | 40.920 | 40.920 | 40.760 |
| (8C) | 2.001 | 2.001 | 2.001 | 2.001 | 2.001 | 2.001 |
| (9C) | 25.458 | 25.458 | 25.458 | 25.458 | 25.458 | 25.458 |
| (10C) | 1.805 | 1.805 | 1.805 | 2.001 | 1.805 | 1.805 |
| (11C) | 25.420 | 25.420 | 25.420 | 25.458 | 25.420 | 25.420 |
| (12C) | 3.686 | 3.633 | 3.702 | 3.546 | 4.040 | 3.983 |
| (13C) | −1.190 | −1.122 | −1.133 | −1.117 | −1.192 | −1.172 |
| (14C) | 1.915 | 1.842 | 1.842 | 1.806 | 1.875 | 1.876 |
| (15C) | −6.712 | −7.112 | −6.768 | −7.246 | −6.814 | −6.850 |
| (16C) | 2.008 | 1.898 | 1.870 | 1.845 | 1.836 | 1.842 |
| (17C) | 0.923 | 0.926 | 0.924 | 0.943 | 0.928 | 0.929 |

The zoom lens system described in the examples has a large zoom ratio and a large angle of field in the wide-angle end, and is suitable for use with an electronic image sensor. The system has a satisfactory optical performance, and is suitable for miniaturizing a lens barrel, and cost reduction can be realized.

The above zoom lens system can be used in an image pickup apparatus in which the object image is formed by the zoom lens system and received by the image sensor to photograph the object. Specific examples of the image pickup apparatus include an electronic camera such as a digital camera; and information processing units such as a personal computer in which a camera is incorporated and portable terminal devices, for example, a cellular phone in which a camera is incorporated and a personal digital assistant (PDA) in which a camera is incorporated.

FIGS. 35 to 38 are conceptual diagrams showing a constitution of a digital camera in which the zoom lens system according to the present invention is incorporated as a photographing optical system. FIG. 35 is a front perspective view showing an appearance of a digital camera; FIG. 36 is a rear view of the camera; FIG. 37 is a schematic sectional view showing an inner constitution of the digital camera of FIG. 35; and FIG. 38 is a block diagram showing a constitution of a part of an inner circuit of the digital camera. In FIGS. 35 and 37, a non-collapsed state of the photographing optical system is shown.

In this example, the digital camera 40 includes the photographing optical system 41 positioned along an optical path 42 for photographing; a finder optical system 43 positioned along an optical path 44 for a finder; a shutter button 45; a flash lamp 46; a liquid crystal display monitor 47; a focal length change button 61; a setting change switch 62 and the like. In a case where the photographing optical system 41 is collapsed, when a cover 60 is slid, the photographing optical system 41, the finder optical system 43 and the flash lamp 46 are covered with the cover 60. Moreover, when the cover 60 is opened to bring the camera 40 into a photographing state, the photographing optical system 41 is brought into the non-collapsed state shown in FIG. 37. When the shutter button 45 disposed at an upper portion of the camera 40 is pressed, the photographing is performed through the photographing optical system 41, for example, the zoom lens system of Example 1, in response to the pressed button. An object image is formed by the photographing optical system 41 on an image pickup surface (a photoelectric conversion surface) of a CCD image sensor 49 via a low pass filter FL and a cover glass CG provided with a wavelength band restrictive coating. The object image received by the CCD image sensor 49 is displayed as an electronic image in the liquid crystal display monitor 47 disposed in a rear surface of the camera via a processing section 51. The processing section 51 is connected to a recording section 52, and the photographed electronic image can be recorded. It is to be noted that the recording section 52 may be integrated with the processing section 51, or the sections may separately be arranged. As a medium in which the electronic image is recorded, a hard disk drive (HDD), a memory card, an optical disk such as a DVD±RW or the like is usable. A film camera may be constituted in which a silver halide film is disposed instead of the CCD image sensor 49.

Furthermore, an objective optical system 53 for the finder is disposed along the optical path 44 for the finder. The objective optical system 53 for the finder is constituted of a zoom optical system including a plurality of lens units (three lens units in the drawing) and an image erecting prism system 55. In the system, a focal length changes in conjunction with the zoom lens system of the photographing optical system 41. The object image is formed by the objective optical system 53 for the finder on a view field frame 57 of the image erecting prism system 55. Behind the image erecting prism system 55, an eyepiece optical system 59 is disposed which guides an erected image into an observer's eyeball E. It is to be noted that a cover member 50 is disposed on an emission side of the eyepiece optical system 59.

FIG. 38 is a block diagram of a major part of the electronic circuit of the digital camera 40. It is to be noted that in the following description, the above processing section 51 includes a part constituted of a CDS/ADC section 24, a temporary storage memory 17 and an image processing section 18, and the recording section 52 includes a recording medium control section 19.

As shown in FIG. 38, the digital camera 40 includes: an operating section 12; a control section 13 connected to the operating section 12; and an image sensor driving circuit 16, the temporary storage memory 17, the image processing section 18, the recording medium control section 19, a display section 20 and a setting information storage memory section 21 connected to control signal output ports of the control section 13 via buses 14 and 15.

The above temporary storage memory 17, the image processing section 18, the recording medium control section 19, the display section 20 and the setting information storage memory section 21 are constituted so that data can be input or output mutually via a bus 22. The image sensor driving circuit 16 is connected to the CCD 49 and the CDS/ADC section 24.

The operating section 12 includes various input buttons and switches, and is a circuit which notifies a control section of event information input from the outside (camera user) via these input buttons and switches (e.g., the shutter button 45 and the setting change switch 62). The control section 13 includes a central processing unit, and is a circuit in which a program memory (not shown) is incorporated. In accordance with a program stored in the program memory, the circuit receives an instruction or a command input from the camera user via the operating section 12 to control the operation of the digital camera 40.

The CCD 49 receives the object image formed by the photographing optical system 41' constituted using the image forming optical system of the present invention. The CCD 49 is an image sensor driven and controlled by the image sensor driving circuit 16 to convert a quantity of light of each pixel of the object image into an electric signal and output the signal to the CDS/ADC section 24.

The CDS/ADC section 24 is a circuit which amplifies the electric signal output from the CCD 49 to perform analog/digital conversion. The circuit outputs, to the temporary storage memory 17, video bare data (hereinafter referred to as the raw data) subjected to only the above mentioned amplification and analog/digital conversion.

The temporary storage memory 17 is a buffer constituted of, for example, an SDRAM, and is a memory unit in which the raw data output from the CDS/ADC section 24 is temporarily stored. The image processing section 18 is a circuit which reads out the raw data stored in the temporary storage memory 17 or the recording medium control section 19 to electrically perform various types of image processing including distortion correction based on an image quality parameter designated from the control section 13.

The recording medium control section 19 is a control circuit for controlling a device to which a card or stick type recording medium including, for example, a flash memory and the like is detachably attached. In the device, the raw data transferred from the temporary storage memory 17 and/or the image data obtained by processing the image by the image processing section 18 are stored and retained in the card or stick type flash memory. It is to be noted that as the recording medium, besides a semiconductor memory, a hard disk drive, a DVD±RW or the like is usable.

The display section 20 includes the liquid crystal display monitor 47 and a circuit for displaying an image or an operation menu in the liquid crystal display monitor 47. The setting information storage memory section 21 includes: an ROM portion in which various types of image quality parameters are stored beforehand; and an RAM portion for storing the image quality parameter selected from the image quality parameters stored in the ROM portion, by an input operation of the operating section 12. The setting information storage memory section 21 also includes a circuit which controls input/output with respect to the ROM portion and the RAM portion.

In the camera 40 constituted in this manner, since the photographing optical system has a high zoom ratio and a satisfactory aberration, a high performance can be realized. The photographing optical system can be constituted of a small number of optical members. Since the system can be collapsed and stored, miniaturization, thinning and cost reduction can be realized.

FIG. 39 shows a schematic block diagram of a main part of a control system of the digital camera 40. It is to be noted that an input section typified by the shutter button 45 is denoted with reference numeral 500. A CPU 51 corresponds to the processing section of FIG. 37. A recording section includes a memory card 521 and an external storage device (an optical disk, an HDD or the like) 522. A display processing section 80 is omitted from FIG. 37. The section performs display processing to display an image or information in the display section 47 by use of an output from the CPU 51. In a case where the CPU 51 judges that the shutter button 45 of the input section 500 is pressed, appropriate control values such as a shutter speed and a aperture diameter are calculated using information obtained from a photometry system (not shown). After the calculation, a shutter and an aperture stop are controlled based on the control values.

The digital camera is an example of an electronic camera including the zoom lens system according to the present invention; an image sensor disposed at a position where an object image formed by the zoom lens system is received; a CPU which processes an electric signal photoelectrically converted by the image sensor; a display unit which displays the object image received by the image sensor so as to observe the image; a recording processing section which records the object image received by the image sensor in a recording medium; and the recording medium incorporated in the electronic camera and/or constituted so as to be detachably attached to the electronic camera in order to record image information of the object image received by the image sensor. The CPU performs control so as to displays the object image received by the image sensor in the display unit, and also performs control so as to record the object image received by the image sensor in the recording medium.

Next, a cellular phone provided with a camera using the zoom lens system according to the present invention will be described with reference to FIGS. 40 to 43. FIG. 40 is a front view of the cellular phone; FIG. 41 is a side view of the cellular phone; FIG. 42 is a sectional view of a photographing optical system incorporated in the cellular phone; and FIG. 43 is a schematic block diagram showing a main part of a control system related to photographing, image recording and image display of the cellular phone.

As shown in FIGS. 40 to 42, a cellular phone 400 has a microphone 401 which inputs operator's voice as information; a speaker 402 which outputs partner's voice; input keys 403 via which an operator inputs information; a monitor 404 which displays an image obtained by photographing the operator, the partner or the like, or information such as telephone numbers; a photographing optical system 405; an antenna 406 which transmits and receives a communication radio wave; a processing section which processes image information, communication information, an input signal and the like; and a recording section which records the image. Here, the monitor 404 is a liquid crystal displayed element. Here, the monitor 404 may be a transmission type liquid crystal display which illuminates a back surface by a backlight (not shown), a reflective type liquid crystal display which reflects light entering the element from a front surface to display the information or the like.

The photographing optical system 405 has a photographing lens system 410 including the zoom lens system according to the present invention disposed along a photographing optical path 407; and an image sensor chip 411 which receives an object image formed by the photographing lens system 410. A cover glass C is attached on the image sensor chip 411. These components are incorporated in the cellular phone 400.

Here, the image sensor chip 411 is fitted into a rear end of a lens barrel 412 of the photographing lens system 410 through a one-touch operation and integrated into an imaging unit 450 with the lens barrel and the photographing lens system. Therefore, centering of the photographing lens system 410 and the image sensor chip 411 need not be adjusted, an interval between the image sensor chip 411 and the photographing lens system need not be adjusted, and assembling is facilitated. A cover glass 413 for protecting the photographing lens system 410 is disposed on a tip end of the lens barrel 412. It is to be noted that a driving mechanism of the zoom lens system in the lens barrel 412 is omitted from the drawing.

The object image received by the image sensor chip 411 is input into the processing section via a terminal (not shown), and displayed as an electronic image in the monitor 404 and/or a partner's monitor. In a case where the image is transmitted to the partner, a signal processing function of converting information of the object image received by the image sensor chip 411 into a transmittable signal is included in the processing section.

FIG. 43 shows a schematic block diagram of the main part of the control system related to the photographing, image recording and image display of the cellular phone 400. It is to be noted that an input section such as the input keys 403 is denoted with reference numeral 500. A CPU 415 corresponds to the above processing section, and a memory card 521 and an external storage device (the HDD or the like) 522 correspond to the recording section. A display processing section 480 performs display processing to display an image or information in a display section 404 by use of an output from the CPU 415. In a case where the CPU 415 judges that information corresponding to a photographing instruction is input from the input section 500, appropriate control values such as a shutter speed and an aperture diameter are calculated using information obtained from a photometry system (not shown). After the calculation, a shutter and an aperture stop are controlled based on the control values. It is to be noted that to simplify the constitution, one or both of the shutter speed control and the aperture value control can be omitted.

This cellular phone provided with the camera is an example of an information processing device including the zoom lens system according to the present invention; an image sensor disposed at a position where an object image formed by this zoom lens system is received; a CPU which processes an electric signal photoelectrically converted by the image sensor; an input section which inputs an information signal to be input into the CPU by an operator; a display processing section which displays an output from the CPU in a display unit (e.g., an LCD); and a recording medium which records the output from the CPU. The CPU is configured to perform control so as to display the object image received by the image sensor in the display unit.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
    a first lens unit having a positive refractive power;
    a second lens unit having a negative refractive power;
    a third lens unit having a positive refractive power;
    a fourth lens unit having a negative refractive power; and
    a fifth lens unit having a positive refractive power,
    wherein during magnification change from a wide-angle end to a telephoto end,
    each of spaces between the respective lens units changes;
    in the telephoto end as compared with the wide-angle end, the space between the first lens unit and the second lens unit increases, and
    the space between the second lens unit and the third lens unit decreases; and
    the first lens unit includes one lens component;
    the second lens unit includes a positive lens and a negative lens; and
    the total number of lenses constituting the first lens unit and the second lens unit is four or less,
    wherein the lens component is defined as a single lens or a combination of lenses which has only two air contact surfaces including an object-side surface and an image-side surface in an effective diameter; and
    wherein the first lens unit satisfies the following conditions:

$2.40 < f1/fw < 8.00$; and $0.45 < f1/ft < 2.00$, in which f1 is a focal length of the first lens unit, fw is a focal length of the zoom lens system in the wide-angle end, and ft is a focal length of the zoom lens system in the telephoto end.

2. An image pickup apparatus comprising:
    the zoom lens system according to claim 1; and
    an electronic image sensor which is disposed on an image side of the zoom lens system and which picks up an image formed by the zoom lens system and converts the image into an electric signal.

3. A zoom lens system comprising, in order from an object side:
    a first lens unit having a positive refractive power;
    a second lens unit having a negative refractive power;
    a third lens unit having a positive refractive power;
    a fourth lens unit having a negative refractive power; and
    a fifth lens unit having a positive refractive power,
    wherein during magnification change from a wide-angle end to a telephoto end,
    each of the space between the respective lens units changes,
    the first lens unit moves so as to be disposed closer to the object side in the telephoto end than in the wide-angle end;
    the fifth lens unit moves so as to be disposed closer to an image side in the telephoto end than in the wide-angle end; and
    an axial space between the third lens unit and the fourth lens unit increases from the wide-angle end to an intermediate position, and decreases from the intermediate position to the telephoto end; and wherein the intermediate position means any position between the wide-angle end and the telephoto end.

4. The zoom lens system according to claim 3, wherein the following condition is satisfied:

$4.00 < Lw/fw < 9.00$, in which Lw is a total length of the zoom lens system in the wide-angle end, and fw is a focal length of the zoom lens system in the wide-angle end.

5. The zoom lens system according to claim 3, wherein the following condition is satisfied:

$1.00 < Lt/ft < 1.80$, in which Lt is a total length of the zoom lens system in the telephoto end, and ft is a focal length of the zoom lens system in the telephoto end.

6. The zoom lens system according to claim 3, wherein the first lens unit includes one positive lens.

7. The zoom lens system according to claim 6, wherein the positive lens of the first lens unit satisfies the following condition:

$75.0 < vd1p < 105.0$, in which vd1p is the Abbe number of the positive lens of the first lens unit.

8. The zoom lens system according to claim 6, wherein the positive lens of the first lens unit satisfies the following condition:

$-1.50 < SF1p < -0.20$, in which SF1p is defined by $SF1p=(R1pf+R1pr)/R1pf-R1pr)$ and in which R1pf and R1pr are paraxial radii of curvatures of an object-side surface and an image-side surface of the positive lens of the first lens unit, respectively.

9. The zoom lens system according to claim 3, wherein the second lens unit includes, in order from the object side, a first negative lens, a second negative lens and a positive lens.

10. The zoom lens system according to claim 9, wherein a concave surface of the first negative lens faces the image side;
    a concave surface of the second negative lens faces the object side; and
    the second negative lens and the positive lens are cemented with each other.

11. An image pickup apparatus comprising:
    the zoom lens system according to claim 3;
    an electronic image sensor; and
    image processing unit for processing image data obtained by picking up, with the electronic image sensor, an image formed by the zoom lens system and outputting an deformed image data,
    wherein the zoom lens system satisfies the following condition when focused on an infinite object:

$0.850 < y_{07}/(fw \cdot \tan \omega_{07w}) < 0.970$, in which fw is a focal length of the zoom lens system in a wide-angle end, $y_{07}=0.7y_{10}$, $y_{10}$ is a distance from the center of an effective image pickup region of an image pickup surface of the electronic image sensor to the farthest point, that is, the maximum image height, and $\omega_{07w}$ is an angle with respect to an optical axis of a chief ray which enters the zoom lens system from an object side, the chief ray corresponding to an image point which is apart from the center of the effective image pickup region by $y_{07}$ in the wide-angle end.

12. An electronic image pickup apparatus comprising:
    the zoom lens system according to claim 3; and
    an image sensor disposed in a position where an object image formed by the zoom lens system is received.

13. An information processing apparatus comprising:
the zoom lens system according to claim 3;
an image sensor disposed in a position where an object image formed by the zoom lens system is received;
a CPU which processes an electric signal photoelectrically converted by the image sensor;
an input section for an operator to input an information signal to be input into the CPU;
a display processing section for displaying an output from the CPU in a display device; and
a recording medium which records the output from the CPU,
wherein the CPU is configured to perform control so as to display the object image received by the image sensor in the display unit.

14. The information processing apparatus according to claim 13, which is a portable terminal device.

15. An electronic camera device comprising:
the zoom lens system according to claim 3;
an image sensor disposed in a position where an object image formed by the zoom lens system is received;
a CPU which processes an electric signal photoelectrically converted by the image sensor;
a display unit which observably displays the object image received by the image sensor;
a recording processing section which records the object image received by the image sensor in a recording medium; and
the recording medium which is incorporated in the electronic camera and/or detachably attached to the electronic camera in order to record image information of the object image received by the image sensor,
the CPU being configured to execute control so as to display the object image received by the image sensor in the display unit and record the object image received by the image sensor in the recording medium.

* * * * *